US010841350B2

(12) United States Patent
Kitahara et al.

(10) Patent No.: US 10,841,350 B2
(45) Date of Patent: *Nov. 17, 2020

(54) RECEPTION DEVICE, RECEPTION METHOD, TRANSMISSION DEVICE, AND TRANSMISSION METHOD

(71) Applicant: Saturn Licensing LLC, New York, NY (US)

(72) Inventors: Jun Kitahara, Shizuoka (JP); Naohisa Kitazato, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,803

(22) Filed: Apr. 22, 2019

(65) Prior Publication Data

US 2019/0297128 A1 Sep. 26, 2019

Related U.S. Application Data

(63) Continuation of application No. 15/032,409, filed as application No. PCT/JP2015/077244 on Sep. 28, 2015, now Pat. No. 10,305,949.

(30) Foreign Application Priority Data

Oct. 10, 2014 (JP) .................................. 2014-209501

(51) Int. Cl.
*H04L 29/06* (2006.01)
*H04H 60/73* (2008.01)
(Continued)

(52) U.S. Cl.
CPC ......... *H04L 65/4076* (2013.01); *H04H 20/26* (2013.01); *H04H 20/423* (2013.01);
(Continued)

(58) Field of Classification Search
CPC ............. H04L 65/4076; H04L 65/1069; H04L 65/608; H04L 29/06; H04H 60/73;
(Continued)

(56) References Cited

U.S. PATENT DOCUMENTS

2010/0134701 A1* 6/2010 Eyer .................... H04N 21/235
  348/731
2010/0235537 A1* 9/2010 Kitazato ................ H04H 20/40
  709/233

(Continued)

FOREIGN PATENT DOCUMENTS

| CN | 102868937 A | 1/2013 |
| CN | 103503443 A | 1/2014 |

(Continued)

OTHER PUBLICATIONS

International Search Report dated Dec. 22, 2015 in PCT/JP2015/077244 Filed Sep. 28, 2015.

(Continued)

*Primary Examiner* — Benjamin M Thieu
(74) *Attorney, Agent, or Firm* — Oblon, McClelland, Maier & Neustadt, L.L.P.

(57) ABSTRACT

Disclosed is a reception device configured to acquire second metadata including a flag, the flag indicating whether or not there is a component stream transmitted from a server via the Internet for a service. The reception device is also configured to acquire first metadata based on the second metadata, the first metadata including information related to a component stream for the service transmitted in a broadcast signal using an Internet Protocol (IP) transmission scheme. Finally, the reception device is configured to access the component stream transmitted in the broadcast signal based on the first metadata, and control reproduction of the component stream transmitted in the broadcast signal.

18 Claims, 51 Drawing Sheets

(51) Int. Cl.
*H04H 20/26* (2008.01)
*H04H 20/42* (2008.01)
*H04H 20/93* (2008.01)

(52) U.S. Cl.
CPC ............ *H04H 20/93* (2013.01); *H04H 60/73* (2013.01); *H04L 65/1069* (2013.01); *H04L 65/60* (2013.01); *H04L 65/608* (2013.01); *H04H 2201/40* (2013.01)

(58) Field of Classification Search
CPC ...... H04H 20/26; H04H 20/426; H04H 20/93; H04H 2201/40; H04H 60/27; H04N 21/647; H04N 21/433; H04N 21/2362
See application file for complete search history.

(56) References Cited

U.S. PATENT DOCUMENTS

| | | | | |
|---|---|---|---|---|
| 2010/0299702 A1* | 11/2010 | Lo | ........................ | G06Q 20/123 725/39 |
| 2010/0330900 A1* | 12/2010 | Arad | ...................... | H04H 60/73 455/3.06 |
| 2011/0055415 A1* | 3/2011 | Cuesta | ................... | H04H 60/12 709/231 |
| 2012/0331508 A1* | 12/2012 | Vare | .................... | H04L 65/4076 725/50 |
| 2013/0014202 A1* | 1/2013 | Suh | ........................ | H04H 20/93 725/131 |
| 2013/0191860 A1* | 7/2013 | Kitazato | ............ | H04N 21/4622 725/32 |
| 2013/0211567 A1* | 8/2013 | Oganesyan | ......... | H04L 65/4076 700/94 |
| 2014/0096173 A1* | 4/2014 | Song | ................... | H04N 21/4335 725/110 |
| 2014/0109128 A1 | 4/2014 | Lee et al. | | |
| 2014/0130112 A1 | 5/2014 | Bendiab-Dallah et al. | | |
| 2014/0208380 A1* | 7/2014 | Fay | .................... | H04N 21/4622 725/134 |
| 2014/0240478 A1 | 8/2014 | Suh et al. | | |
| 2014/0250478 A1* | 9/2014 | Suh | ....................... | H04N 21/235 725/110 |
| 2014/0270006 A1* | 9/2014 | Bi | .......................... | H04H 20/59 375/340 |
| 2015/0327025 A1 | 11/2015 | Yamagishi | | |

FOREIGN PATENT DOCUMENTS

| | | |
|---|---|---|
| JP | 2008-263616 A | 10/2008 |
| WO | 2014/132821 A1 | 9/2014 |

OTHER PUBLICATIONS

Extended European Search Report dated Apr. 19, 2018 in corresponding European Patent Application No. 15848219.0.
Combined Chinese Office Action and Search Report dated Jul. 2, 2019, in Patent Application No. 201580002942.6 (with English translation), 15 pages.

* cited by examiner

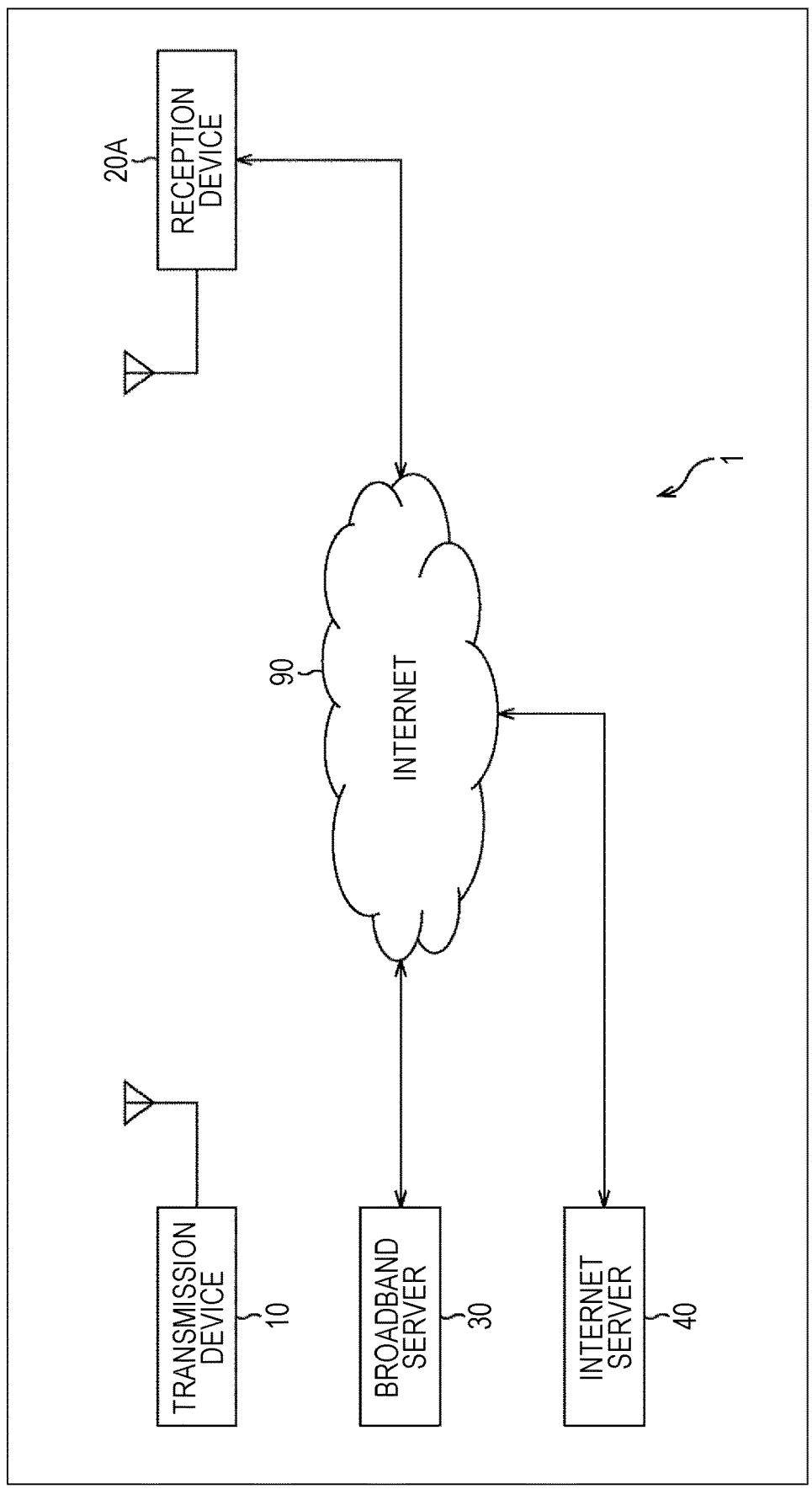

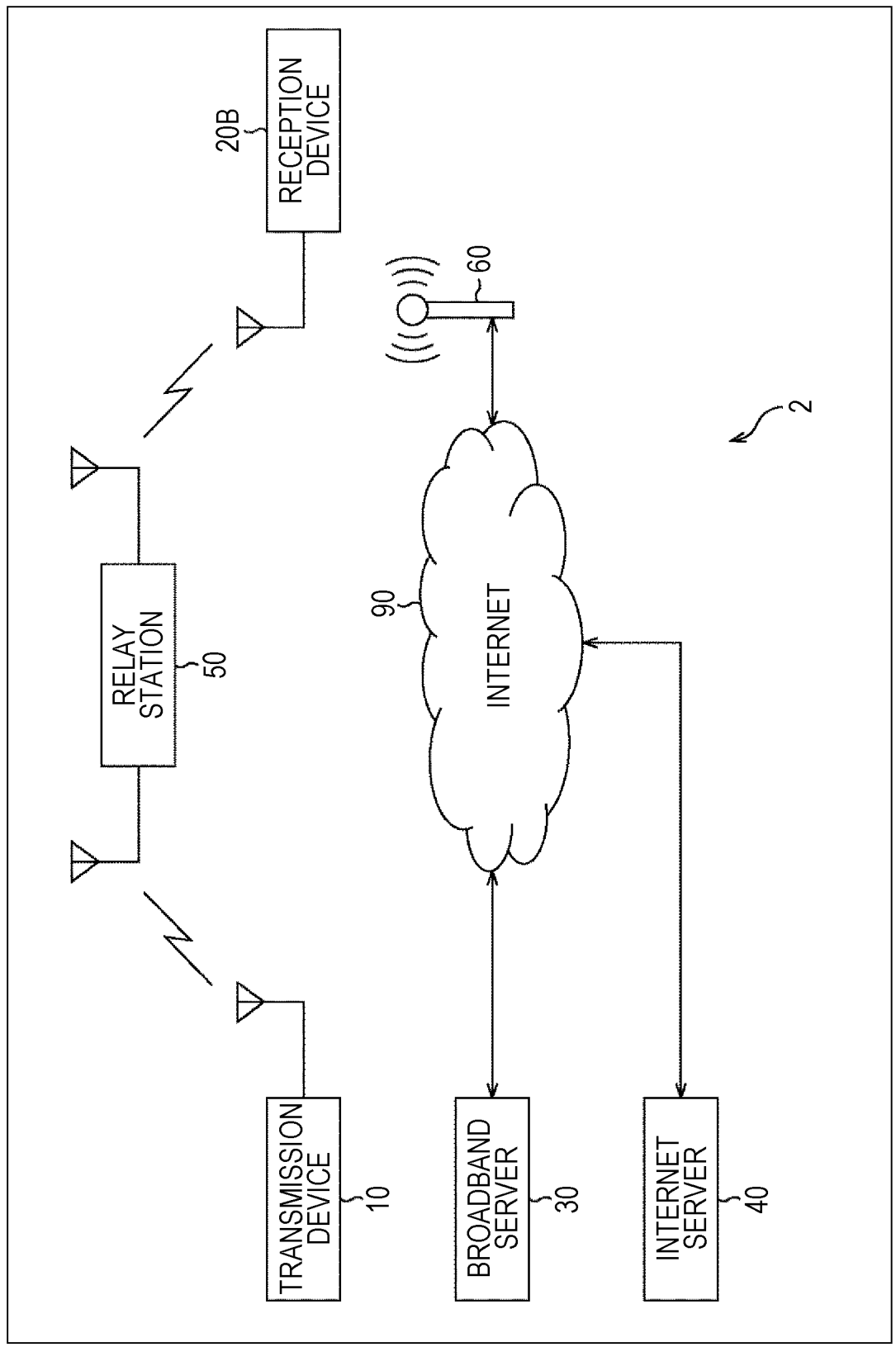

FIG. 3

| SIGNALING DATA | | METADATA | DESCRIPTION |
|---|---|---|---|
| LLS | SCD | Service Configuration Description | CONFIGURATION INFORMATION OF STREAM OR SERVICE AND LIKE |
| | EAD | Emergency Alert Description | EMERGENCY ALERT INFORMATION |
| | RRD | Rating Region Description | RATING INFORMATION |
| | DCD | Default Component Description | INFORMATION FOR PRIOR ACQUISITION |
| SCS | USBD | User Service Bundle Description | REFERENCE INFORMATION OF METADATA |
| | USD | User Service Description | REFERENCE INFORMATION OF METADATA |
| | SDP | Session Description Protocol | CONFIGURATION INFORMATION OF STREAM AND LIKE |
| | MPD | Media Presentation Description | REPRODUCTION MANAGEMENT INFORMATION OF STREAM |
| | IS | Initialization Segment | INITIALIZATION SEGMENT |
| | LSID | LCT Session Instance Description | MANAGEMENT INFORMATION TRANSMITTED FOR EACH ROUTE SESSION |
| | ESGc | Electric Service Guide Current | ESG CURRENT |
| | SPD | Service Parameter Description | PARAMETER OF SERVICE LEVEL |

FIG. 4

| SCBootstrap/ @LSIDBaseService | SCBootstrap/ @hybrid | DESCRIPTION |
|---|---|---|
| TRUE | * (N/A) | SERVICE IS TRANSMITTED THROUGH SINGLE BROADCASTING ROUTE SESSION. SERVICE COMPONENT AND SCS ARE TRANSMITTED THROUGH SAME ROUTE SESSION. THUS, IP ADDRESS AND PORT NUMBER ARE SOLVED THROUGH SC BOOTSTRAP INFORMATION, AND INFORMATION IN ROUTE SESSION IS SOLVED THROUGH LSID. |
| FALSE | FALSE | SERVICE IS TRANSMITTED THROUGH ONE OR MORE ROUTE SESSIONS. SAME MIME TYPE STREAMS SUCH AS PLURALITY OF VIDEOS, PLURALITY OF AUDIOS, PLURALITY OF SUBTITLES, AND LIKE ARE CONSIDERED TO BE TRANSMITTED THROUGH SINGLE ROUTE SESSION. ALTERNATIVELY, BASIC VIDEO AND AUDIO AND ROBUST AUDIO ARE CONSIDERED TO BE TRANSMITTED THROUGH PLURALITY OF ROUTE SESSIONS. IN LSID, SINCE SAME MIME TYPE IS NOT DISTINGUISHED, AND PLURALITY OF ROUTE SESSIONS ARE NOT DESCRIBED, USBD, MPD, AND SDP ARE USED. SINCE FALSE IS DESIGNATED AS Hybrid, COMMUNICATION IS NOT USED. |
| FALSE | TRUE | IN ADDITION TO PATTERN OF (@LSIDBaseService=FALSE AND @hybrid=FALSE), COMPONENTS ARE FURTHER TRANSMITTED THROUGH COMMUNICATION. MEANS FOR SOLVING SESSION LOCATION BY USBD, MPD, AND SDP DOES NOT CHANGE. |

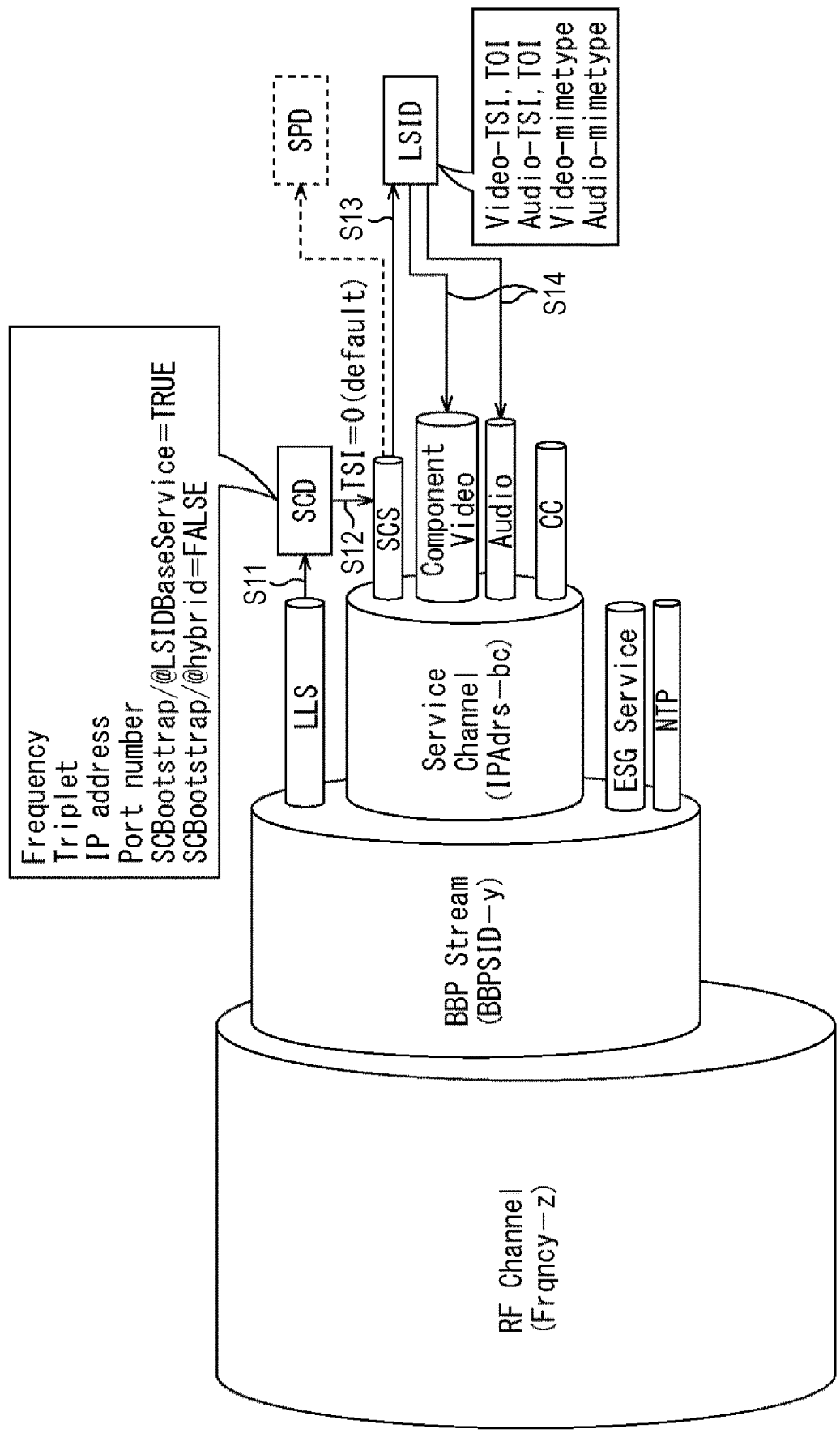

FIG. 30

| Element/Attribute(with@) | Cardinality | Data Type | Description |
|---|---|---|---|
| SCD | | | |
|   @majorProtocolVersion | 0..1 | integer | Major protocol version |
|   @minorProtocolVersion | 0..1 | integer | Minor protocol version |
|   @RFAllocationId | 1 | integer | physical channel ID |
|   @name | 0..1 | string | physical channel name |
|   Tuning_RF | 0..n | | Physical parameters |
|     @frequency | 1 | integer | Center frequency of this RF channel |
|     @preamble | 0..1 | string | Common PHY parameter of this RF channel |
|   BBPStream | 1..n | | BBP stream |
|     @bbpStreamId | 1 | integer | BBP stream ID |
|     @payloadType | 1 | unsignedByte | BBP payload type(e.g. IPv4, IPv6) |
|     @name | 0..1 | string | BBP stream name |
|     ESGBootstrap | 0..1 | | Access information for ESG |
|       ESGProvider | 1..n | | ESG provider |
|         @providerName | 1 | string | ESG provider name |
|         ESGBroadcasterLocation | 0..1 | | Location of ESG in broadcast |
|           @RFAllocationId | 1 | integer | RFAllocation ID for ESG servcie |
|           @BBPStreamId | 1 | integer | BBPStream ID for ESG servcie |
|           @ESGServiceId | 1 | integer | Service ID for ESG servcie |
|         ESGBroadbandLocation | 0..1 | | Location of ESG in broadband |
|           ESGUri | 1 | anyURI | URI for ESG |
|     ClockReferenceInformation | 0..1 | | Clock reference information(CRI) |
|       @sourceIPAddress | 1 | ipAddrType | Source IP address for CRI |
|       @destinationIPAddress | 1 | ipAddrType | destination IP address for CRI |
|       @portNum | 1 | integer | UDP port number for CRI |
|     Service | 1..n | | Service |
|       @serviceId | 1 | integer | Service ID |
|       @globalUniqueServiceId | 1 | integer | Global unique service ID |
|       @serviceType | 1 | enum | Service type(e.g. continued, scripted) |
|       @hidden | 0..1 | integer | Hidden service |
|       @hiddenGuide | 0..1 | integer | Hidden service on ESG |
|       @shortName | 1 | string | Short service name |
|       @longName | 0..1 | string | Long service name |
|       @accessControl | 0..1 | integer | access control |
|       SourceOrign | 0..1 | | Original service |
|         @country | 1 | integer | Country code |
|         @originalRFAllocationId | 1 | integer | Original RF allocation ID |
|         @bbpStreamId | 1 | integer | BBP stream ID |
|         @serviceId | 1 | integer | Service ID |
|       SCBootstrap | 1 | | Access information for service channel |
|         @LSIDBaseService | 0..1 | boolean | all components can be acquired by LSID |
|         @hybrid | 0..1 | boolean | hybrid service |
|         @sourceIPAddress | 1 | ipAddrType | Source IP address to transmit service |
|         @destinationIPAddress | 1 | ipAddrType | Destination IP address to transmit service |
|         @portNum | 1 | integer | Port number to transmit SCS |
|         @tsi | 1 | integer | FLUTE session TSI to transmit SCS |
|       SignalingOverInternet | 0..1 | anyURI | SCS location of broadband |
|         @LSIDBaseService | 0..1 | boolean | all components can be acquired by LSID |
|         @hybrid | 0..1 | boolean | hybrid service |
|         @uri | 1 | | Signaling URI |
|       AssociationService | 0..1 | | |
|         @RFAllocationId | 1 | integer | RF Allocation ID |
|         @bbpStreamId | 1 | integer | BBP Stream ID |
|         @serviceId | 1 | integer | Service ID |

FIG. 31

| Element/Attribute(with@) | | | Cardinality | Data Type | Description |
|---|---|---|---|---|---|
| EAD | | | | | |
| | AutomaticTuningService | | 0..1 | | Automatic tuning service (ATS) when wake-up |
| | | @RFAllocationId | 0..1 | integer | RFAllocation ID for ATS |
| | | @bbpStreamId | 0..1 | integer | BBP Stream ID for ATS |
| | | @serviceId | 1 | integer | Service ID for ATS |
| | EAMessage | | 0..n | | Emergency alert message |
| | | @eaMessageId | 1 | integer | Emergency alert message ID |
| | | @eaPriority | 1 | integer | Priority of emergency alert |
| | EAMessageData | | 0..1 | string | Subtitle message of emergency alert |
| | EAApplication | | 0..1 | | Emergency alert application |
| | | @applicationId | 1 | integer | Application ID |
| | EAService | | 0..1 | | Emergency alert NRT service |
| | | @serviceId | 1 | integer | NRT service ID |
| | | @serviceType | 1 | integer | service type (e.g. "nrt") |
| | EAWww | | 0..n | | Web site of emergency alert information |
| | | @uri | 1 | anyURI | URI of emergency alert information |

FIG. 33

| Element/Attribute(with@) | Cardinality | Data Type | Description |
|---|---|---|---|
| RRD | | | |
| RatingRegionName | 1 | string | |
| RatingRegion | 1 | integer | Rating region (e.g. "us", "canada", "mexico") |
| Version | | integer | Version |
| Dimension | 1..255 | | |
| RatingDimensionName | 1 | string | Rating dimension name |
| RatingDimension | 1 | integer | Rating dimension code |
| GraduatedScale | 1 | integer | whether or not the rating values represent a graduated scale |
| DimensionVaule | 1..16 | | Dimension value |
| RatingValueText | 1 | string | Rating value in text |
| AbbrevValueText | 1 | string | Abbrev rating value |
| RatingValue | 0..15 | integer | Rating value |
| RatingTag | 1 | integer | Rating tag |

FIG. 34

| Element/Attribute (with@) | Cardinality | Description |
|---|---|---|
| DCD | | |
| Serivice | 0..N | |
| @serviceID | 1 | Service ID |
| @serviceStatus | 0..1 | Service running status |
| video | 1 | default video component |
| @mime_type | 0..1 | mime type |
| @port number | 0..1 | port number |
| @TSI | 0..1 | FLUTE session ID |
| audio | 1 | Default audio component |
| @mime_type | 0..1 | mime type |
| @port number | 0..1 | port number |
| @TSI | 0..1 | FLUTE session ID |

FIG. 37

| Element/Attribute (with@) | Use | Description |
|---|---|---|
| LSID | | |
| @version | O | VERSION OF LSID |
| @validFrom | O | VALID PERIOD START DATE AND TIME OF LSID |
| @expiration | O | EXPIRATION DATE AND TIME OF LSID |
| TransportSession | 1..N | LCT transport session INFORMATION |
| @tsi | M | transport session id |
| SourceFlow | 0..1 | SOURCE FLOW INFORMATION |
| RepairFlow | 0..1 | REPAIR FLOW INFORMATION |

FIG. 38

| Element/Attribute(with@) | Use | Description |
|---|---|---|
| SourceFlow | | |
| EFDT | 0..1 | Extended FDT |
| @idRef | 0..1 | EFDT ID |
| @realtime | OD (default=FALSE) | IN CASE OF TRUE, NTP TIME STAMP IS INCLUDED IN LCT extension header |
| @minBufferSize | O | MINIMUM BUFFER SIZE REQUIRED IN RECEIVER |
| ApplicationIdentifier | 0..1 | ID MAPPED WITH APPLICATION |
| PayloadFormat | 1..N | PAYLOAD FORMAT OF SourceFlow |
| @codePoint | OD (default=0) | CodePoint VALUE |
| @deliveryObjectFormat | M | PAYLOAD FORMAT |
| @fragmentation | OD (default=0) | 0: arbitrary<br>1: application specific (sample based)<br>2: application specific (a collection of boxes) |
| @deliveryOrder | OD (default=0) | 0: arbitrary<br>1: in-order delivery<br>2: in-order delivery of media samples and prior to movie fragment box |
| @sourceFECPayloadID | OD (default=1) | Source FEC Payload ID |
| FECParameters | 0..1 | FEC parameters |

FIG. 39

| Element/Attribute(with@) | Use | Description |
|---|---|---|
| EFDT | | Extended FDT |
| @route:idRef | 0..1 | EFDT ID |
| @route:version | 0 | EFDT version |
| @route:maxExpiresDelta | 0 | PERIOD OF TIME UNTIL EXPIRATION AFTER TRANSMISSION OF Object |
| @route:maxTransportSize | 0 | MAXIMUM TRANSPORT SIZE |
| route:FileTemplate | 0..1 | FileTemplate |

FIG. 40

| Element/Attribute(with@) | | Use | Description |
|---|---|---|---|
| RepairFlow | | | |
| | FECParameters | | FEC PARAMETER |
| | @fecEncodingId | M | ID OF FEC SCHEME |
| | @maximumDelay | O | MAXIMUM DELAY TIME OF source flow AND repair flow |
| | @overhead | O | OVERHEAD VALUE (%) |
| | @minBufferSize | O | NECESSARY MINIMUM BUFFER SIZE |
| | FECOTI | 1 | FEC Object Transmission Information |
| | ProtectedObject | 0..N | source flow INFORMATION TO BE PROTECTED |

FIG. 41

| Element/Attribute (with@) | Use | Description |
|---|---|---|
| ProtectedObject | | |
| @sessionDescription | O | SESSION INFORMATION OF source flow |
| @tsi | M | TSI OF source flow |
| @sourceTOI | O | TOI OF delivery object IDENTICAL TO TOI OF repair flow |
| @fecTransportObjectSize | O | DEFAULT SIZE OF FEC transport object |

FIG. 42

| Element/Attribute(with@) | Cardinality | Data Type | Description |
|---|---|---|---|
| SPD | | | |
| @serviceId | 1 | integer | service identifier |
| @spIndicator | 0..1 | integer | Service protection off/on |
| AlternativeService | 0..N | | Alternative service |
| @globalUniqueServiceId | 1 | integer | Global unique service ID |
| HybridSignalLocationDescription | 0..1 | - | Location and delivery method of service signaling |
| ContentAdvisoryDescription | 1 | - | Rating information |
| NRTServiceDescription | 0..1 | - | NRT service configuration |

FIG. 43

| Element/Attribute(with@) | Cardinality | Data Type | Description |
|---|---|---|---|
| HybridSignalLocationDescriptor | | | |
| @version | 0..1 | integer | version |
| @url | 1 | anyURI | Location of service signaling |
| @hybird | 1 | boolean | Delivery method of service signaling true="hybrid", false="basic" |

FIG. 44

| Element/Attribute(with@) | Cardinality | Data Type | Description |
|---|---|---|---|
| ContentAdvisoryDescriptor | | | |
| @version | 1 | integer | version |
| RatingRegion | 1..n | — | Rating region information |
| @ratingRegionId | 0..1 | integer | Rating region identifier |
| RatingDimension | 1..m | — | |
| @dimensionIndex | 1 | integer | Rating dimension index |
| @ratingValue | 1 | integer | Rating value corresponding to the dimension index abive |
| @ratingTag | 1 | integer | Rating tag |

FIG. 45

| Element/Attribute(with@) | Cardinality | Data Type | Description |
|---|---|---|---|
| NRTServiceDescription | | | |
| @ConsumptionModel | 1 | string | NRT Consumption model |
| @autoUpdate | 0..1 | boolean | Auto-updated service or not "on", "off" |
| @storageReservation | 0..1 | integer | Required storage size (Kbytes) |
| @defaultContentSize | 0..1 | integer | Default NRT content size (bytes) |
| ProtocolVersionDescription | 0..1 | – | Data transmission protocol type&version |
| CapabilityDescription | 0..1 | – | Receiver capability to be required |
| IconDescription | 0..1 | – | Icon location for NRT service |
| ISO639LanguageDescription | 0..1 | – | Language for NRT service |
| ReceiverTargetingDescription | 0..1 | – | Targeting information |

FIG. 46

| Element/Attribute(with@) | Cardinality | Data Type | Description |
|---|---|---|---|
| ProtocolVersionDescription | | | |
| @protocolIdentifier | 1 | string | Data service type "A/90", "NRT" |
| @majorProtocolVersion | 1 | integer | Major version of data service specification |
| @minorProtocolVersion | 1 | integer | Minor version of data service specification |

FIG. 47

| Element/Attribute (with@) | Cardinality | Data Type | Description |
|---|---|---|---|
| CapabilityDescription | 0..1 | | Receiver capability to be required |
|   IndividualCapabilityCodes | 0..n | | |
|     @essentialIndicator | 0..1 | integer | The capability is essential or not |
|     @capabilityCode | 1 | integer | Code representing a specific capability |
|     @formatIdentifier | 0..1 | integer | In case of capabilityCode represents private use, related data format targeting for capability check. |
|   IndividualCapabilityString | 0..n | | |
|     @essentialIndicator | 0..1 | integer | The capability is essential or not |
|     @capabilityCategoryCode | 1 | integer | Code representing a capability category |
|     @capabilityString | 0..1 | string | Text string representing a capability check item in the capability category above. |
|   CapabilityOrSets | 0..n | | Capability combined condition of capability code and capability string with "OR" logic. |
|     @essentialIndicator | 0..1 | integer | The capability is essential or not |
|     CapabilityCodesInSets | 0..m | | |
|       @capabilityCode | 1 | integer | Code representing a specific capability |
|       @formatIdentifier | 0..1 | integer | In case of capabilityCode represents private use, related data format targeting for capability check. |
|     CapabilityStringsInSets | 0..m | | Text string representing a capability check item in the capability category above. |
|       @capability_category_code | 1 | integer | Code representing a capability category |
|       @capabilityString | 0..1 | string | Text string representing a capability check item in the capability category above. |

FIG. 48

| Element/Attribute(with@) | Cardinality | Data Type | Description |
|---|---|---|---|
| IconDescription | | | |
| @content_linkage | 1 | anyURI | URL for Icon content |

FIG. 49

| Element/Attribute(with@) | Cardinality | Data Type | Description |
|---|---|---|---|
| ISO639LanguageDescription | | | |
| @languageCode | 1 | integer | ISO-639 language code |

FIG. 50

| Element/Attribute(with@) | Cardinality | Data Type | Description |
|---|---|---|---|
| ReceiverTargetingDescription | | | |
| TargetEntry | 1..n | | Targeting items |
| @geoLocation | 0..1 | integer | Target Geographic location (3byte code) |
| @postalCode | 0..1 | integer | Target postal code (2byte code) |
| @demographic category | 0..n | string | Targeting demographic attributes "males", "females", "Ages 12-17", etc. |

RECEPTION DEVICE, RECEPTION METHOD, TRANSMISSION DEVICE, AND TRANSMISSION METHOD

CROSS-REFERENCE TO RELATED APPLICATIONS

This application is a continuation of U.S. application Ser. No. 15/032,409, filed Apr. 27, 2016, which is a national stage application of International Application No. PCT/JP2015/077244, filed Sep. 28, 2015, which is based on and claims priority to Japanese Application No. 2014-209501, filed Oct. 10, 2014. The above-identified documents are incorporated herein by reference in their entireties.

TECHNICAL FIELD

The present technology relates to a reception device, a reception method, a transmission device, and a transmission method, and more particularly, to a reception device, a reception method, a transmission device, and a transmission method, which are capable of acquiring a component configuring a service efficiently, appropriately, and easily.

BACKGROUND ART

In recent years, a digital broadcasting service has started in respective countries (for example, see Patent Document 1). In digital broadcasting standards of respective countries, a Moving Picture Experts Group phase 2-Transport Stream (MPEG2-TS) scheme is employed as a transmission scheme, but in the future, an Internet Protocol (IP) transmission scheme in which an IP packet used in a communication field is used for digital broadcasting is introduced, and a more advanced service is expected to be provided.

CITATION LIST

Patent Document

Patent Document 1: Japanese Patent Application Laid-Open No. 2008-263616

SUMMARY OF THE INVENTION

Problems to be Solved by the Invention

Meanwhile, as one of candidates of a scheme of transmitting components such as videos, audios, or subtitles using an IP transmission scheme, there is a Real-time Object Delivery over Unidirectional Transport (ROUTE). The ROUTE is one in which a File Delivery over Unidirectional Transport (FLUTE) is extended for live broadcasting services.

However, a technique for transmission of components configuring a service (for example, a program) through a ROUTE session is not established, and there is a demand for a technique capable of acquiring components configuring a service efficiently, appropriately, and easily.

The present technology was made in light of the foregoing, and it is desirable to provide a technique capable of acquiring components configuring a service efficiently, appropriately, and easily.

Solutions to Problems

A reception device of a first aspect of the present technology includes: a first acquiring unit that acquires second metadata including first and second flags, the first flag indicating whether or not it is possible to acquire components configuring a service through only first metadata, the second flag indicating whether or not there is a stream of a component transmitted from a server on the Internet by way of communication among the streams of the components configuring the service, the first metadata including information related to a stream of a component transmitted by way of broadcasting through a broadcast wave of digital broadcasting using an Internet Protocol (IP) transmission scheme; a second acquiring unit that acquires the first metadata based on the second metadata; and a control unit that accesses the stream of the component transmitted by way of the broadcasting based on the first metadata, and controls reproduction of the component.

The reception device according to the first aspect of the present technology may be an independent device or an internal block configuring a single device. A reception method of the first aspect of the present technology is a reception method corresponding to the reception device according to the first aspect of the present technology.

In a reception method of a reception device of the first aspect of the present technology: second metadata including first and second flags is acquired, the first flag indicating whether or not it is possible to acquire components configuring a service through only first metadata, the second flag indicating whether or not there is a stream of a component transmitted from a server on the Internet by way of communication among the streams of the components configuring the service, the first metadata including information related to a stream of a component transmitted by way of broadcasting through a broadcast wave of digital broadcasting using an Internet Protocol (IP) transmission scheme; the first metadata based on the second metadata is acquired; and the stream of the component transmitted by way of the broadcasting is accessed based on the first metadata, and reproduction of the component is controlled.

A transmission device of a second aspect of the present technology includes: a generating unit that generates second metadata including first and second flags, the first flag indicating whether or not it is possible to acquire components configuring a service through only first metadata, the second flag indicating whether or not there is a stream of a component transmitted from a server on the Internet by way of communication among the streams of the components configuring the service, the first metadata including information related to a stream of a component transmitted by way of broadcasting through a broadcast wave of digital broadcasting using an Internet Protocol (IP) transmission scheme; and a transmitting unit that transmits the generated second metadata.

A transmission device according to the second aspect of the present technology may be an independent device or an internal block configuring a single device. A transmission method according to the second aspect of the present technology is a transmission method corresponding to the transmission device according to the second aspect of the present technology.

In a transmission method of a transmission device of the second aspect of the present technology: second metadata including first and second flags is generated, the first flag indicating whether or not it is possible to acquire components configuring a service through only first metadata, the second flag indicating whether or not there is a stream of a component transmitted from a server on the Internet by way of communication among the streams of the components configuring the service, the first metadata including information related to a stream of a component transmitted by way of broadcasting through a broadcast wave of digital broadcasting using an Internet Protocol (IP) transmission scheme; and the generated second metadata is transmitted.

Effects of the Invention

According to the first aspect and the second aspect of the present technology, it is possible to acquire components configuring a service efficiently, appropriately, and easily.

The effect described herein is not necessarily limited, and an effect described in the present disclosure may be included.

BRIEF DESCRIPTION OF DRAWINGS

FIG. 1 is a diagram illustrating an exemplary configuration of a service provision system when a fixed receiver is used.

FIG. 2 is a diagram illustrating an exemplary configuration of a service provision system when a mobile receiver is used.

FIG. 3 is a diagram illustrating an example of signaling data.

FIG. 4 is a diagram illustrating an example of a combination of an LSIDBaseService attribute and a hybrid attribute of an SCBootstrap element of an SCD.

FIG. 5 is a diagram illustrating a system pipe model of an operation example 1.

FIG. 30 is a diagram illustrating a syntax of an SCD.

FIG. 31 is a diagram illustrating a syntax of an EAD.

FIG. 33 is a diagram illustrating a syntax of an RRD.

FIG. 34 is a diagram illustrating an example of a syntax of a DCD.

FIG. 37 is a diagram illustrating an example of a syntax of an LSID.

FIG. 38 is a diagram illustrating an example of a syntax of a SourceFlow element.

FIG. 39 is a diagram illustrating an example of a syntax of an EFDT element.

FIG. 40 is a diagram illustrating an example of a syntax of a RepairFlow element.

FIG. 41 is a diagram illustrating an example of a syntax of a ProtectedObject element.

FIG. 42 is a diagram illustrating an example of a syntax of an SPD.

FIG. 43 is a diagram illustrating an example of a syntax of a HybridSignalLocationDescription element.

FIG. 44 is a diagram illustrating an example of a syntax of a ContentAdvisoryDescription element.

FIG. 45 is a diagram illustrating an example of a syntax of an NRTServiceDescription element.

FIG. 46 is a diagram illustrating an example of a syntax of a ProtocolVersionDescription element.

FIG. 47 is a diagram illustrating an example of a syntax of a CapabilityDescription element.

FIG. 48 is a diagram illustrating an example of a syntax of an IconDescription element.

FIG. 49 is a diagram illustrating an example of a syntax of an ISO-639 Language Description element.

FIG. 50 is a diagram illustrating an example of a syntax of a ReceiverTargetingDescription element.

MODE FOR CARRYING OUT THE INVENTION

Figure 6:
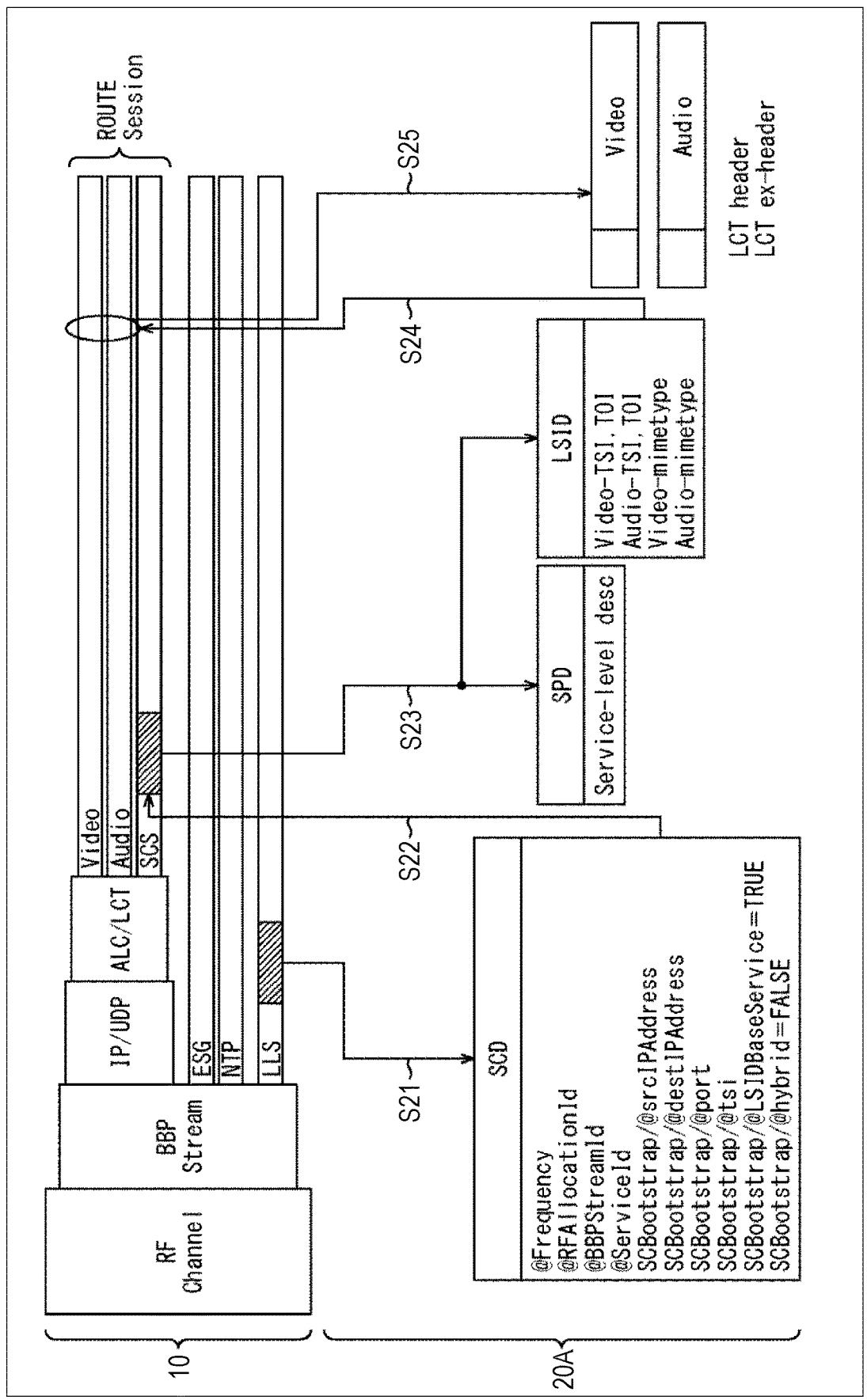
FIG. 6 is a sequence diagram of the operation example 1.

Hereinafter, exemplary embodiments of the present technology will be described with reference to the appended drawings. A description will proceed in the following order.

1. Configuration of system
2. Operation examples
    (1) Operation example 1: basic broadcasting service selection (fixed receiver and direct selection)
    (2) Operation example 2-1: hybrid service selection 1 (fixed receiver and direct selection)
    (3) Operation example 2-2: hybrid service selection 2 (fixed receiver and direct selection)

(4) Operation example 3: basic broadcasting service selection (mobile receiver and ESG selection)
(5) Operation example 4: basic broadcasting service selection (fixed receiver, ESG selection)
(6) Operation example 5-1: robust service selection 1 (fixed receiver and direct selection)
(7) Operation example 5-2: robust service selection 2 (fixed receiver and direct selection)
3. Configurations of devices configuring system
4. Flow of processes performed by devices
5. Examples of syntaxes
(1) LLS signaling data
(2) SCS signaling data
6. Modified example
7. Configuration of computer 1. Configuration of System (Exemplary Configuration of Service Provision System when Fixed Receiver is Used)

FIG. 1 is a diagram illustrating an exemplary configuration of a service provision system when a fixed receiver is used.

In FIG. 1, a service provision system 1 is a system that provides a service to a reception device 20A serving as a fixed receiver. The service provision system 1 is configured with a transmission device 10, the reception device 20A, a broadband server 30, and an Internet server 40. The reception device 20A is connected with the broadband server 30 and the Internet server 40 via the Internet 90.

The transmission device 10 is, for example, a transmitter that supports digital terrestrial television broadcasting of a predetermined standard, and provided by a broadcaster and installed in a broadcasting station. As a digital terrestrial television broadcasting standard according to an embodiment of the present technology, for example, standards such as Advanced Television Systems Committee (ATSC) standards may be employed.

The transmission device 10 transmits streams of components such as videos, audios, or subtitles configuring a service (for example, a program) through a broadcast wave of digital broadcasting using an IP transmission scheme together with signaling data.

As the signaling data, there are two types of signaling data, that is, Low Layer Signaling (LLS) signaling data that does not depend on a service and a Service Channel Signaling (SCS) signaling data of service units, which will be described later in detail.

The components such as the video and the audio and the SCS signaling data are transmitted through a ROUTE session. The ROUTE is one in which a FLUTE (RFC 6276, 5775, and 5651) is extended for live broadcasting services. There are cases in which the ROUTE is called FLUTE+ (FLUTE plus) or FLUTE enhancement or the like.

In the ROUTE session, for example, a file to be transmitted is managed as an object using a Transport Object Identifier (TOI). A set of a plurality of objects is managed as a session using a Transport Session Identifier (TSI). In other words, in the ROUTE session, it is possible to designate a specific file using two pieces of identification information of the TSI and the TOI.

The reception device 20A is, for example, a fixed receiver that supports digital terrestrial television broadcasting of a predetermined standard such as a television receiver or a set top box and installed, for example in a house of each user. The reception device 20A has a communication function and can access the broadband server 30 or the Internet server 40 via the Internet 90. The reception device 20A need not necessarily have a communication function.

The reception device 20A receives the broadcast wave of the digital broadcasting transmitted from the transmission device 10, and acquires the signaling data transmitted through the broadcast wave of the digital broadcasting. The reception device 20A accesses the streams of (the components configuring) the service transmitted through the broadcast wave of the digital broadcasting transmitted from the transmission device 10 based on the acquired signaling data, and reproduces (outputs) a video and a sound obtained from the streams.

The broadband server 30 performs streaming delivery of the streams of components such as videos, audios, or subtitles configuring the service (for example, the program) via the Internet 90 according to a request made from the reception device 20A. The broadband server 30 delivers the signaling data via the Internet 90 according to the request made from the reception device 20A.

The reception device 20A accesses the streams of (the components configuring) the service that is streaming-delivered from the broadband server 30 via the Internet 90 based on the signaling data received from the transmission device 10 or the broadband server 30, and reproduces (outputs) a video or a sound obtained from the streams.

The Internet server 40 is a server that delivers various kinds of information according to the request made from the reception device 20A. For example, the Internet server 40 may deliver emergency alert information related to an emergency alert. In this case, the reception device 20A can access the Internet server 40 via the Internet 90, acquire the emergency alert information from the Internet server 40, and display the emergency alert information.

(Exemplary Configuration of Service Provision System when Mobile Receiver is Used)

FIG. 2 is a diagram illustrating an exemplary configuration of a service provision system when a mobile receiver is used.

In FIG. 2, a service provision system 2 is a system that can provide service continuously even when a reception device 20B serving as a mobile receiver moves between broadcasting areas. The service provision system 2 differs from the service provision system 1 of FIG. 1 in that the reception device 20B is arranged instead of the reception device 20A, and a relay station 50 and an access point 60 are further arranged.

A broadcast wave of digital broadcasting transmitted from the transmission device 10 is received by the reception device 20B within the broadcasting area of the relay station 50 via the relay station 50. The access point 60 is an access point of a public wireless Local Area Network (LAN), and the reception device 20B within a communication area of the access point 60 can be connected to the Internet 90 via the access point 60.

The reception device 20B is, for example, a mobile receiver such as a smartphone, a mobile phone, a tablet computer, a personal computer, or a terminal used in a vehicle, and supports, for example, digital terrestrial television broadcasting of a predetermined standard.

The reception device 20B accesses the Internet 90 via the access point 60, and acquires the signaling data from the broadband server 30. The reception device 20B receives the broadcast wave of the digital broadcasting transmitted from the transmission device 10 via the relay station 50, and acquires the signaling data transmitted through the broadcast wave of the digital broadcasting.

The reception device 20B accesses the streams of (the components configuring) the service transmitted from the transmission device 10 or the broadband server 30 based on the signaling data acquired from the transmission device 10 or the broadband server 30, and reproduces (outputs) a video or a sound obtained from the streams.

In FIG. 2, for the sake of convenience of description, the configuration in which one transmission device 10 and one relay station 50 are installed is illustrated, but in practice, one or more transmission devices 10 and a plurality of relay stations 50 are installed, and the reception device 20B serving as the mobile receiver moves in a plurality of broadcasting areas provided by a plurality of relay stations 50. The reception device 20B may be connected to the broadband server 30 via a mobile network such as Long Term Evolution (LTE) without intervention of the access point 60.

The service provision systems 1 and 2 are configured as described above. In the following description, when it is unnecessary to particularly distinguish the reception device 20A and the reception device 20B, they are referred to simply as a "reception device 20."

(Example of Signaling Data)

FIG. 3 is a diagram illustrating an example of the signaling data.

As the signaling data, there are LLS signaling data transmitted through an LLS stream and SCS signaling data transmitted through an SCS stream.

The LLS signaling data is signaling data of a low layer that does not depend on a service and transmitted through a layer lower than an IP layer in a protocol stack of an IP transmission scheme. For example, LLS metadata such as a Service Configuration Description (SCD), an Emergency Alerting Description (EAD), a Region Rating Description (RRD), and a Default Component Description (DCD) is included as the LLS signaling data.

The SCS signaling data is signaling data of service unit and transmitted through a layer higher than the IP layer in the protocol stack of the IP transmission scheme. For example, SCS metadata SCS metadata such as a User Service Bundle Description (USBD), a User Service Description (USD), a Session Description Protocol (SDP), a Media Presentation Description (MPD), an Initialization Segment (IS), an LCT Session Instance Description (LSID), an Electric Service Guide Current (ESGc), and a Service Parameter Description (SPD) is included as the SCS signaling data. The SCS signaling data is transmitted through the ROUTE session.

The SCD indicates a BBP stream configuration and a service configuration within a network through an ID system corresponding to an MPEG2-TS scheme. For example, ESG bootstrap information for accessing an ESG stream, SC bootstrap information for accessing an SCS stream, and SCS broadband location information for acquiring the SCS signaling data by way of communication are described in the SCD.

In addition to an IP address, a port number, and a TSI for acquiring the SCS signaling data, a basic service flag and a hybrid flag are designated in the SC bootstrap information. The basic service flag is a flag indicating whether or not components configuring a service can be acquired only through the LSID. The hybrid flag is a flag indicating whether or not there is a stream of a components delivered from the broadband server 30.

Here, FIG. 4 illustrates examples of combinations of the basic service flag and the hybrid flag. In the SCD, the SC bootstrap information is designated by an SCBootstrap element. "@" in FIG. 4 indicates an attribute, and the basic service flag and the hybrid flag are designated by an LSID-BaseService attribute and a hybrid attribute of the SCBootstrap element. The details of the SCBootstrap element will be described later with reference to a syntax of an SCD of FIG. 30.

In FIG. 4, "TRUE" or "FALSE" is designated in the basic service flag and the hybrid flag as a 1-bit flag. In other words, in FIG. 4, when "TRUE" is designated as the basic service flag, it is hard to use the hybrid flag ("N/A" in FIG. 4), but "FALSE" may be designated as the hybrid flag. Further, when "FALSE" is designated as the basic service flag, "FALSE" or "TRUE" may be designated in the hybrid flag.

Specifically, when "TRUE" is designated as the basic service flag, the streams of components configuring the service are transmitted through a single ROUTE session. Further, the streams of components configuring the service and the SCS are transmitted through the same ROUTE session. For this reason, the IP address and the port number are solved based on the SC bootstrap information, and information in the ROUTE session is solved based on the LSID.

Further, when "FALSE" is designated as the basic service flag, and "FALSE" is designated as the hybrid flag, the streams of the components configuring the service are transmitted through one or more ROUTE sessions.

Here, streams of the same MIME type such as a plurality of videos, a plurality of audios, or a plurality of subtitles are considered to be transmitted through a single ROUTE session. Alternatively, a basic video and audio and a robust audio are considered to be transmitted through a plurality of ROUTE sessions. In the LSID, the same MIME type is not distinguished, and a plurality of ROUTE sessions are not described, and thus the USBD (USD), the MPD, and the SPD are used. In this case, since "FALSE" is designated as the hybrid flag, there is no component acquired by way of communication among the components configuring the service.

Further, when "FALSE" is designated as the basic service flag, and "TRUE" is designated as the hybrid flag, the streams of the components configuring the service are transmitted through one or more ROUTE sessions or by way of communication.

Here, streams of the same MIME type such as a plurality of videos, a plurality of audios, or a plurality of subtitles are considered to be transmitted through a single ROUTE session. Alternatively, a basic video and audio and a robust audio are considered to be transmitted through a plurality of ROUTE sessions. In this case, since "TRUE" is designated as the hybrid flag, for example, a stream of a component acquired by way of communication such as a secondary audio is used. In the LSID, the same MIME type is not distinguished, and thus the USBD (USD), the MPD, and the SPD are used.

In the SCS broadband location information, in addition to location information indicating an acquisition destination of the SCS signaling data, the basic service flag and the hybrid flag are designated, but the meanings of the flags are the same as the flags designated in the SC bootstrap information of FIG. 4. In detail, as will be described later with reference to FIG. 30, in the SCD, the SCS broadband location information is designated by a SignalingOverInternet element, and the basic service flag and the hybrid flag are designated by the LSIDBaseService attribute and the hybrid attribute of the SignalingOverInternet element.

As described above, the basic service flag and the hybrid flag can be set to the SCBootstrap element and the SignalingOverInternet element. The basic service flag and the hybrid flag designated by the SCBootstrap element indicate an attribute of the SCS flowing in a broadcasting stream which is designated by the SCBootstrap element. The basic service flag and the hybrid flag designated in the SignalingOverInternet element indicate an attribute of the SCS acquired from the broadband server 30 on the Internet 90 which is designated by the SignalingOverInternet element. Further, in the SCBootstrap element and the SignalingOverInternet element, an attribute in which the LSIDBaseService attribute is combined with the hybrid attribute may be defined so that the attribute has the same function.

Returning to the description of FIG. 3, the EAD includes the emergency alert information related to the emergency alert. The RRD includes information related to a rating. The DCD is information for selecting a minimal service which is acquired prior to the SCS signaling data. The USBD includes reference information for referring to the SCS metadata such as the MPD and the SDP. There are cases in which the USBD is called the USD. The SDP includes a service attribute of a service unit, configuration information or an attribute of a stream, filter information, location information, and the like.

The MPD is information for managing reproduction of streams of components transmitted in units of services and includes information such as a segment Uniform Resource Locator (URL). The IS is an initialization segment for a media segment (MS) in the ROUTE session.

For the USBD, the USD, the MPD, the SPD, and the IS, those standardized in Third Generation Partnership Project (3GPP), Moving Picture Expert Group (MPEG), or Internet Engineering Task Force (IETF) are referred to.

The LSID is one in which a File Delivery Table (FDT) of the FLUTE is extended for real-time services and serves as management information of streams of components transmitted for each ROUTE session. The LSID may be transmitted through a different ROUTE session from that of another SCS metadata. The ESGc is current information of an ESG for transmitting information for a program that is currently being broadcast. The ESG is standardized by Open Mobile Alliance (OMA). In the SPD, a parameter of a service level is defined.

The LLS metadata such as the SCD and the SCS metadata such as the USBD and the LSID may be described in a markup language such as an Extensible Markup Language (XML).

2. Operation Examples (1) Operation Example 1: Basic Broadcasting Service Selection (The Fixed Receiver and Direct Selection)

An operation example 1 is an operation example in which, when components configuring a service are provided only through broadcasting, the service is directly selected in the reception device 20A (FIG. 1) serving as the fixed receiver.

(System Pipe Model)

FIG. 5 is a diagram illustrating a system pipe model of the operation example 1.

In FIG. 5, one Base Band Packet (BBP) stream is transmitted through a physical channel (an RF Channel) corresponding to a broadcast wave configured with a predetermined frequency band. In the BBP stream, streams of the LLS, a service channel, an ESG service, and a Network Time Protocol (NTP) are transmitted.

In the LLS, LLS signaling data of a lower layer that does not depend on a service is transmitted. The LLS signaling data includes, for example, the LLS metadata such as the SCD.

The service channel (hereinafter, also referred to as a "service") is configured with the SCS and the components such as the videos, the audios, or the subtitles. A common IP address is allocated to elements configuring each service (for example, a program), and the components, the SCS signaling data, or the like can be packaged for each service using the IP address.

In the SCS, the SCS signaling data of the service unit is transmitted. The SCS signaling data includes, for example, the SCS metadata such as the USBD and the LSID. The service is transmitted according to the protocol of a User Datagram Protocol/Internet Protocol (UDP/IP). The ESG service (hereinafter, also referred to as an "ESG") is an electronic service guide (an electronic program table). The NTP is time information.

An RF allocation ID is allocated to a broadcast wave (RF Channel) having a predetermined frequency band, for example, for each broadcaster. A BBP stream ID is allocated to one or more BBP streams transmitted through each broadcast wave. A service ID is allocated to one or more services transmitted through each BBP stream.

As described above, a configuration corresponding to a combination (hereinafter, referred to as a "triplet") of a network ID, a transport stream ID, and a service ID used in the MPEG2-TS scheme is employed as the ID system of the IP transmission scheme, and the BBP stream configuration and the service configuration within the network are indicated by the triplet.

Using such an ID system, it is possible to take compatibility with the MPEG2-TS scheme that is currently widespread. In the ID system of the IP transmission scheme, the RF allocation ID and the BBP stream ID correspond to the network ID and the transport stream ID in the MPEG2-TS scheme.

The broadcast wave having the above configuration is transmitted from the transmission device 10 and received by the reception device 20A serving as the fixed receiver. In the reception device 20A, the SCD transmitted through the LLS stream is acquired through an initial scan process or the like (S11). In addition to a frequency serving as a physical parameter and the triplet, the SC bootstrap information for acquiring the SCS signaling data is described in the SCD.

Further, in the reception device 20A, when the user selects (directly selects) a service, the SCS signaling data is acquired according to the SC bootstrap information of the service (S12).

Here, in the SC bootstrap information of the SCD, "TRUE" is designated as the basic service flag (LSIDBaseService), and "FALSE" is designated as the hybrid flag (hybrid), and thus the reception device 20A obtains all information for accessing the streams of the videos and the audios configuring the directly selected service with reference to only the LSID (S13).

Thus, the reception device 20A can access the streams of the videos and the audios configuring the directly selected service using the TSI and the TOI of the video and the audio corresponding to the MIME type with reference to the LSID (S14). Here, since "FALSE" is designated as the hybrid flag (hybrid), there is no component acquired by way of communication among the components configuring the service.

In FIG. 5, the LSID is illustrated as the SCS signaling data transmitted by way of broadcasting, and the streams of the videos and the audios are accessed with reference to only the LSID, but the SPD (indicated by a dotted line in FIG. 5) or any other SCS metadata may be referred to as necessary. Further, information of subtitles may be added to the LSID so that streams of subtitles as well as videos or audios are accessed.

In FIG. 5, the example in which the LSID and other SCS metadata are transmitted through the same ROUTE session is illustrated, but the LSID may be transmitted through a different ROUTE session from that for other SCS metadata. In the ROUTE session, a value of the TSI of the LSID is set to "0."

(Sequence Diagram)

Next, the flow of a specific process in the reception device 20A when the operation example 1 is employed will be described with reference to FIG. 6. In FIG. 6, an upper portion indicates the flow of data transmitted from the transmission device 10, and a lower portion indicates the flow of a process of processing the data in the reception device 20A. In FIG. 6, a time direction is a direction from the left to the right.

In FIG. 6, the transmission device 10 installed in the broadcasting station transmits the broadcast wave of the digital broadcasting (RF Channel) using the IP transmission scheme. In the broadcast wave, the components configuring the service (for example, the program), the SCS signaling data, ESG data, NTP data, and the LLS signaling data are transmitted through the BBP stream. Here, the components configuring the service and the SCS signaling data are transmitted through the same ROUTE session.

As illustrated in FIG. 6, in the reception device 20A serving as the fixed receiver installed in the house or the like, the SCD transmitted through the LLS stream is acquired through the initial scan process or the like and recorded in a Non Volatile RAM (NVRAM) (S21). In addition to the frequency serving as the physical parameter and the triplet, the SC bootstrap information in which the IP address, the port number, and the TSI for acquiring the SCS signaling data are designated is described in the SCD.

The basic service flag and the hybrid flag are designated in the SC bootstrap information of each service identified by the service ID. Here, since "TRUE" is designated as the basic service flag, and "FALSE" is designated as the hybrid flag, it is possible to specify the acquisition destination of the components based on only content described in the LSID, and it further indicates that the components are not delivered by way of communication. In other words, in this case, the streams of the components configuring the target service are transmitted through a single ROUTE session.

For example, when the user performs an operation of selecting (directly selecting) a service (for example, a program), the reception device 20A reads the SCD (selection information) from the NVRAM, and accesses the SCS stream transmitted from the transmission device 10 through the broadcast wave according to the SC bootstrap information of the service (S22). As a result, the reception device 20A can acquire the SCS signaling data transmitted through the ROUTE session (S23).

Here, since it is understood that it is possible to specify the acquisition destination of the components based on only content described in the LSID according to the basic service flag of the SCD, it is desirable to acquire only the LSID as the SCS signaling data. Here, the reception device 20A may acquire other SCS metadata such as the SPD as necessary. Further, since the SCS signaling data is transmitted through the ROUTE session, (a file of) the LSID is acquired by analyzing data stored in an LCT packet to which an LCT header is added.

The TSI and the TOI of the video and the audio corresponding to the MIME type are described in the LSID. In other words, the IP address, the port number, the TSI, and the TOI for accessing the streams of the videos and the audios configuring the directly selected service are specified with reference to the LSID.

The reception device 20A accesses the streams of the videos and the audios transmitted through the ROUTE session according to the IP address, the port number, the TSI, and the TOI (S24). As a result, the reception device 20A can acquire video data and audio data transmitted through the ROUTE session (S25).

Since the video data and the audio data are transmitted through the ROUTE session, the video data and the audio data are acquired by extracting the segment data (the media segment) stored in the LCT packet to which the LCT header is added.

Further, in the reception device 20A, a buffering process is performed by temporarily storing the video data and the audio data acquired by way of broadcasting in a buffer, and the video and the sound of the program corresponding to the directly selected service are reproduced by further performing the rendering process. A time stamp of the NTP transmitted through an extension field of the LCT header may be used for synchronous reproduction of the video and the sound. Further, when the NTP time stamp is not transmitted through the extension field of the LCT header, as another means, it is desirable to acquire the MPD transmitted through the SCS stream and calculate a decoding time and a display time based on a reference time of the MPD, a decoding time of picture units stored in a moof box of a DASH segment, and display time information.

As described above, in the operation example 1, in the reception device 20A serving as the fixed receiver, when the service is directly selected, since "TRUE" and "FALSE" are designated in the SC bootstrap information of the SCD as the basic service flag and the hybrid flag, respectively, the streams of the components configuring the directly selected service are transmitted through a single ROUTE session. With reference to only the LSID, all information for accessing the streams of the videos and the audios configuring the service in the ROUTE session is acquired.

In other words, the reception device 20A can acquire a desired component using only the LSID without reference to all the SCS metadata, and thus when the components configuring the service are transmitted through the ROUTE session, it is possible to acquire the components configuring the service efficiently, appropriately, and easily.

(2) Operation Example 2-1: Hybrid Service Selection 1 (The Fixed Receiver and Direct Selection)

An operation example 2-1 is an operation example in which, when the components configuring the service are provided through a hybrid of broadcasting and communication, the service is directly selected in the reception device 20A (FIG. 1) serving as the fixed receiver.

(System Pipe Model)

Figure 7:
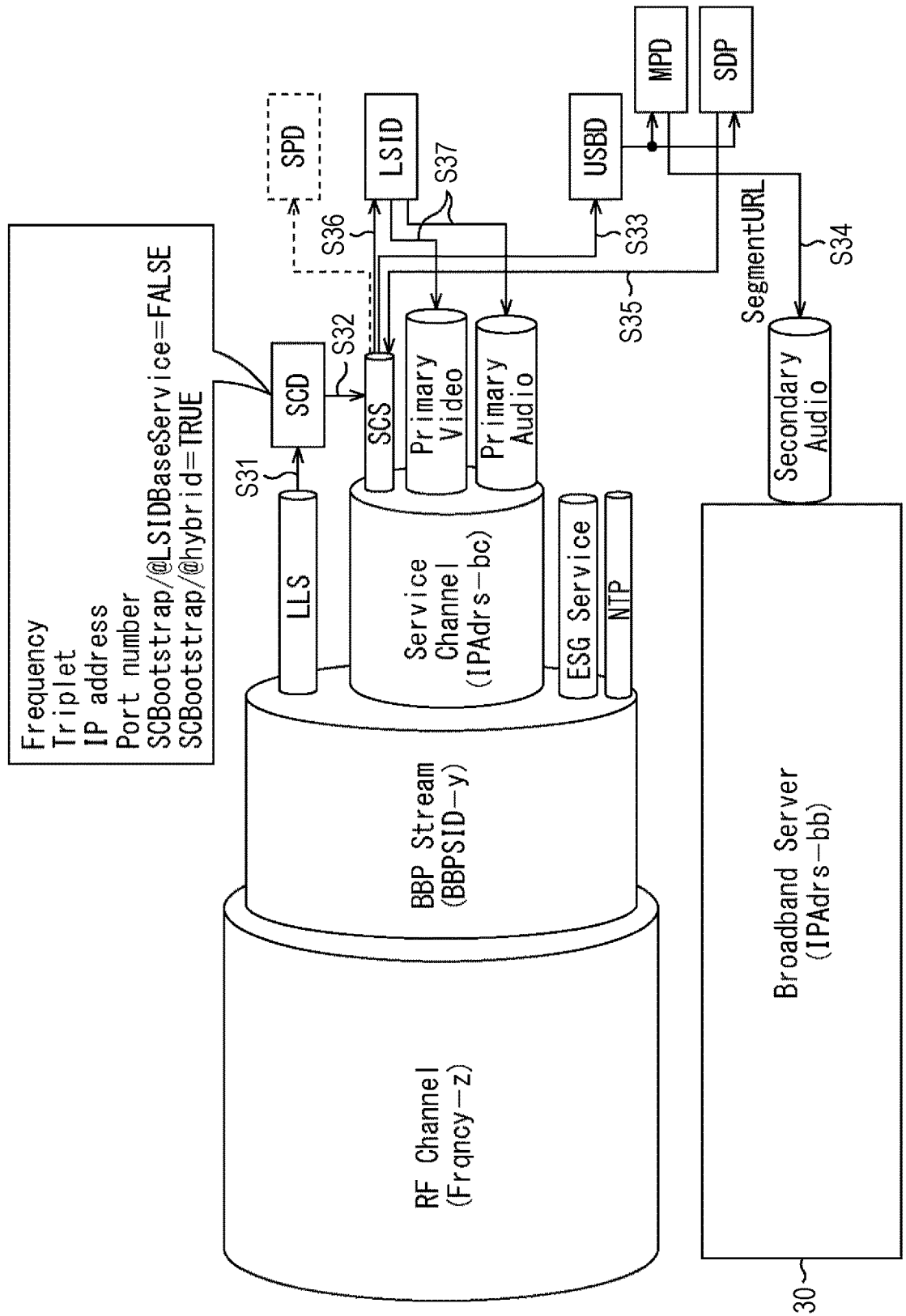
FIG. 7 is a diagram illustrating a system pipe model of an operation example 2-1.

FIG. 7 is a diagram illustrating a system pipe model of the operation example 2-1.

In the operation example 2-1 of FIG. 7, similarly to the operation example 1 of FIG. 5, one BBP stream is transmitted through a physical channel (an RF Channel) corresponding to a broadcast wave configured with a predetermined frequency band. In the BBP stream, streams of the LLS, the service channel (service), the ESG service, and the NTP are transmitted. The service is configured with the SCS signaling data and components of a primary video and a primary audio.

The broadcast wave having the above configuration is transmitted from the transmission device 10 and received by the reception device 20A serving as the fixed receiver.

In the operation example 2-1, the broadband server 30 performs streaming delivery of the secondary audio via the Internet 90. The reception device 20A can access the broadband server 30 via the Internet 90 and acquire the secondary audio data.

In other words, in the reception device 20A, the SCD transmitted through the LLS stream is acquired through the initial scan process or the like (S31). In addition to the frequency serving as the physical parameter and the triplet, the SC bootstrap information is described in the SCD.

Here, since "FALSE" and "TRUE" are designated in the SC bootstrap information of the SCD as the basic service flag and the hybrid flag, respectively, the reception device 20A hardly acquire all the information for accessing the streams of the videos and the audios configuring the selected service with reference to only the LSID. Further, there is a component acquired by way of communication among the components configuring the service.

When the user selects (directly selects) a service, the reception device 20A accesses the SCS stream according to the SC bootstrap information of the service, and acquire the SCS metadata such as the USBD, the MPD, and the SDP (S32).

Further, the reception device 20A can access the broadband server 30 via the Internet 90 according to the segment URL of the secondary audio described in the MPD with reference to the USBD acquired in the process of step S32 and access the stream of the secondary audio configuring the directly selected service (S33 and S34).

The reception device 20A accesses the SCS stream transmitted through the broadcast wave according to the SDP with reference to the USBD, and acquires the LSID (S35 and S36). Then, the reception device 20A can access the streams of the primary video and the primary audio configuring the directly selected service using the TSI and the TOI of the primary video and the primary audio corresponding to the MIME type with reference to the LSID acquired in the process of step S36 (S37).

In FIG. 7, the LSID, the USBD, the MPD, and the SDP are illustrated as the SCS signaling data transmitted by way of broadcasting, and the streams of the videos and the audios transmitted by way of broadcasting and communication are accessed with reference to the SCS metadata, but the SPD (indicated by a dotted line in FIG. 7) or other SCS metadata may be referred to as necessary.

(Sequence Diagram)

Figure 8:
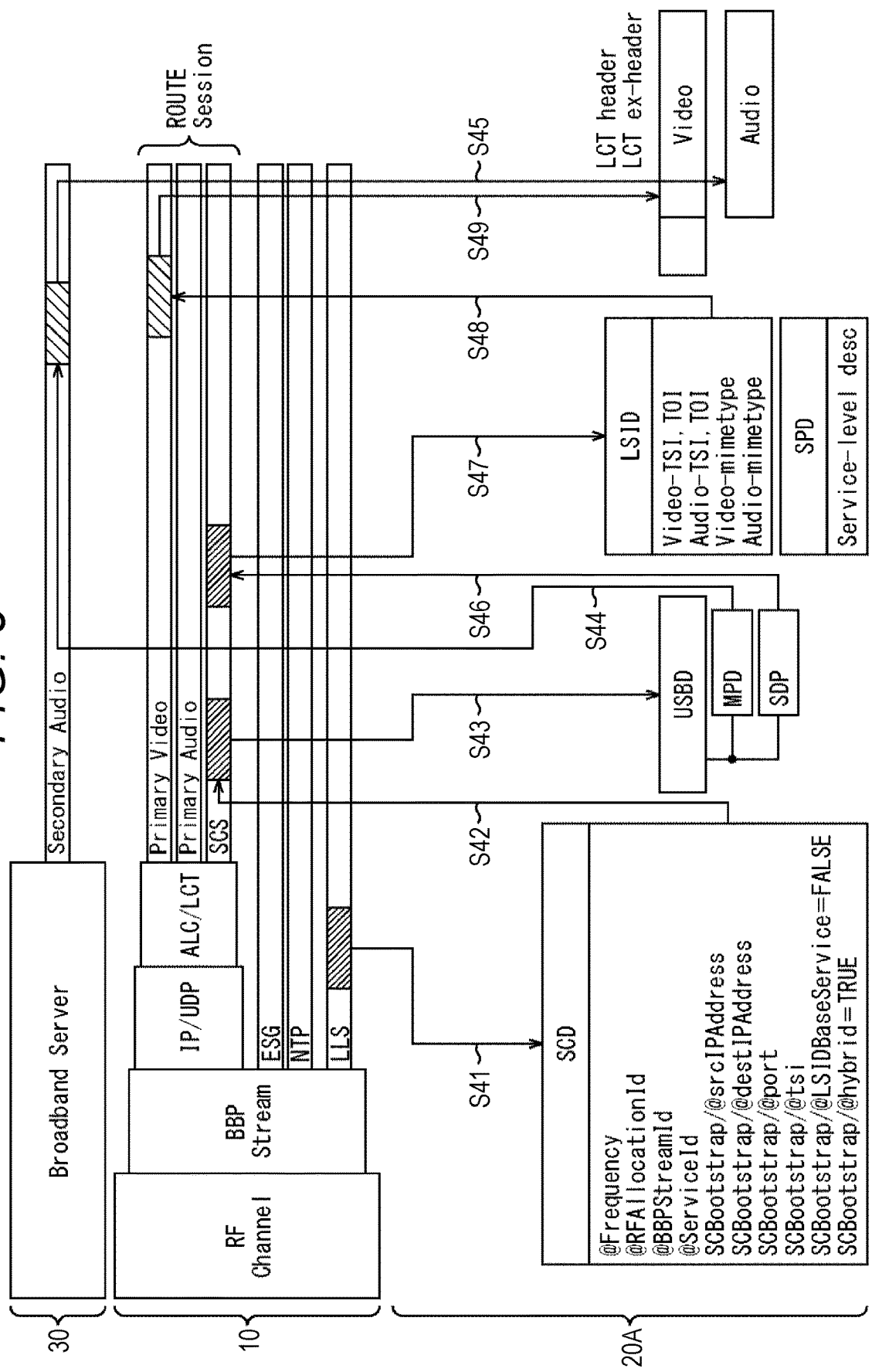
FIG. 8 is a sequence diagram of the operation example 2-1.

Next, the flow of a specific process in the reception device 20A when the operation example 2-1 is employed will be described with reference to FIG. 8. In FIG. 8, an upper portion indicates the flow of data transmitted from the transmission device 10 and the broadband server 30, and a lower portion indicates the flow of a process of processing the data in the reception device 20A. In FIG. 8, a time direction is a direction from the left to the right.

In FIG. 8, the transmission device 10 transmits the broadcast wave (RF Channel) of the digital broadcasting using the IP transmission scheme. In the broadcast wave, the components configuring the service (for example, the program), the SCS signaling data, the ESG data, the NTP data, and the LLS signaling data are transmitted through the BBP stream. Here, the primary video data and the primary audio data serving as the components configuring the service and the SCS signaling data are transmitted through the same ROUTE session.

In FIG. 8, the broadband server 30 performs streaming delivery of the secondary audio data via the Internet 90.

As illustrated in FIG. 8, in the reception device 20A serving as the fixed receiver, the SCD transmitted through the LLS stream is acquired through the initial scan process or the like and recorded in the NVRAM (S41). In addition to the frequency serving as the physical parameter and the triplet, the SC bootstrap information is described in the SCD for each service.

The basic service flag and the hybrid flag are designated in the SC bootstrap information. Here, since "FALSE" is designated as the basic service flag, and "TRUE" is designated as the hybrid flag, it is hard to specify the acquisition destination of the components based on only content described in the LSID, and it indicates that some components are delivered even by way of communication. In other words, in this case, the components configuring the target service are transmitted through a single ROUTE session, but some components (audios) are delivered by way of communication.

For example, when the user performs an operation of selecting (directly selecting) the service, the reception device 20A reads the SCD from the NVRAM, and accesses the SCS stream transmitted from the transmission device 10 through the broadcast wave according to the SC bootstrap information of the service (S42). As a result, the reception device 20A can acquire the SCS signaling data transmitted through the ROUTE session (S43).

Since the SCS signaling data is transmitted through the ROUTE session, data stored in the LCT packet is analyzed, and (the file of) the SCS metadata such as the USBD, the MPD, and the SDP is acquired. For example, since the reference information of the SCS metadata is described in the USBD, the SCS metadata such as the MPD and the SDP is acquired using the reference information, but since the SCS metadata is transmitted through the same SCS stream, the SCS metadata may be collectively acquired from that.

The reception device 20A accesses the broadband server 30 via the Internet 90 according to the segment URL of the secondary audio described in the MPD acquired in the process of step S43 (S44). As a result, the reception device 20A can acquire the secondary audio data configuring the directly selected service which is streaming-delivered from the broadband server 30 (S45).

The reception device 20A accesses the SCS stream transmitted from the transmission device 10 through the broadcast wave according to the SDP acquired in the process of step S43 (S46). As a result, the reception device 20A can acquire the LSID or the SPD transmitted through the ROUTE session (S47).

The TSI and the TOI of the video and the audio corresponding to the MIME type are described in the LSID. In other words, the IP address, the port number, the TSI, and the TOI for accessing the streams of the primary video and the primary audio configuring the directly selected service are specified with reference to the LSID. Here, since the secondary audio (for example, a second language) is reproduced instead of the primary audio (for example, a first language), only information related to a component of the primary video is used.

The reception device 20A accesses the stream of the primary video transmitted through the ROUTE session according to the IP address, the port number, the TSI, and the TOI of the primary video (S48). As a result, the reception device 20A can acquire the primary video data transmitted through the ROUTE session (S49).

Then, the reception device 20A performs the buffering process by temporarily storing the primary video data acquired by way of broadcasting and the secondary audio data acquired by way of communication in a buffer, and further performs the rendering process to reproduce the video and the sound of the program corresponding to the directly selected service.

The example in which the secondary audio (for example, the second language) acquired by way of communication is reproduced has been described herein, but, for example, when the user performs a predetermined operation or when the reception device 20A has no communication function, the primary audio (for example, the first language) acquired by way of broadcasting may be reproduced.

As described above, in the operation example 2-1, in the reception device 20A serving as the fixed receiver, when the service is directly selected, since "FALSE" and "TRUE" are designated in the SC bootstrap information of the SCD as the basic service flag and the hybrid flag, respectively, the components configuring the target service are transmitted through one or more ROUTE sessions, and some components (audios) are delivered by way of communication. Further, all the information for accessing the streams of the videos and the audios configuring the service in the ROUTE session is obtained with reference to other SCS metadata such as the MPD in addition to the LSID.

For example, the reception device 20A can identify whether or not the components configuring the service are transmitted through only the ROUTE session, whether or not a location can be solved through only the LSID, or the like with reference to the basic service flag and the hybrid flag of the SC bootstrap information before the SCS signaling data is acquired and thus can acquire the components configuring the service efficiently, appropriately, and easily.

(3) Operation Example 2-2: Hybrid Service Selection 2
(The Fixed Receiver and Direct Selection)

An operation example 2-2 is another operation example in which, when the components configuring the service are provided through a hybrid of broadcasting and communication, the service is directly selected in the reception device 20A (FIG. 1) serving as the fixed receiver.

(System Pipe Model)

Figure 9:
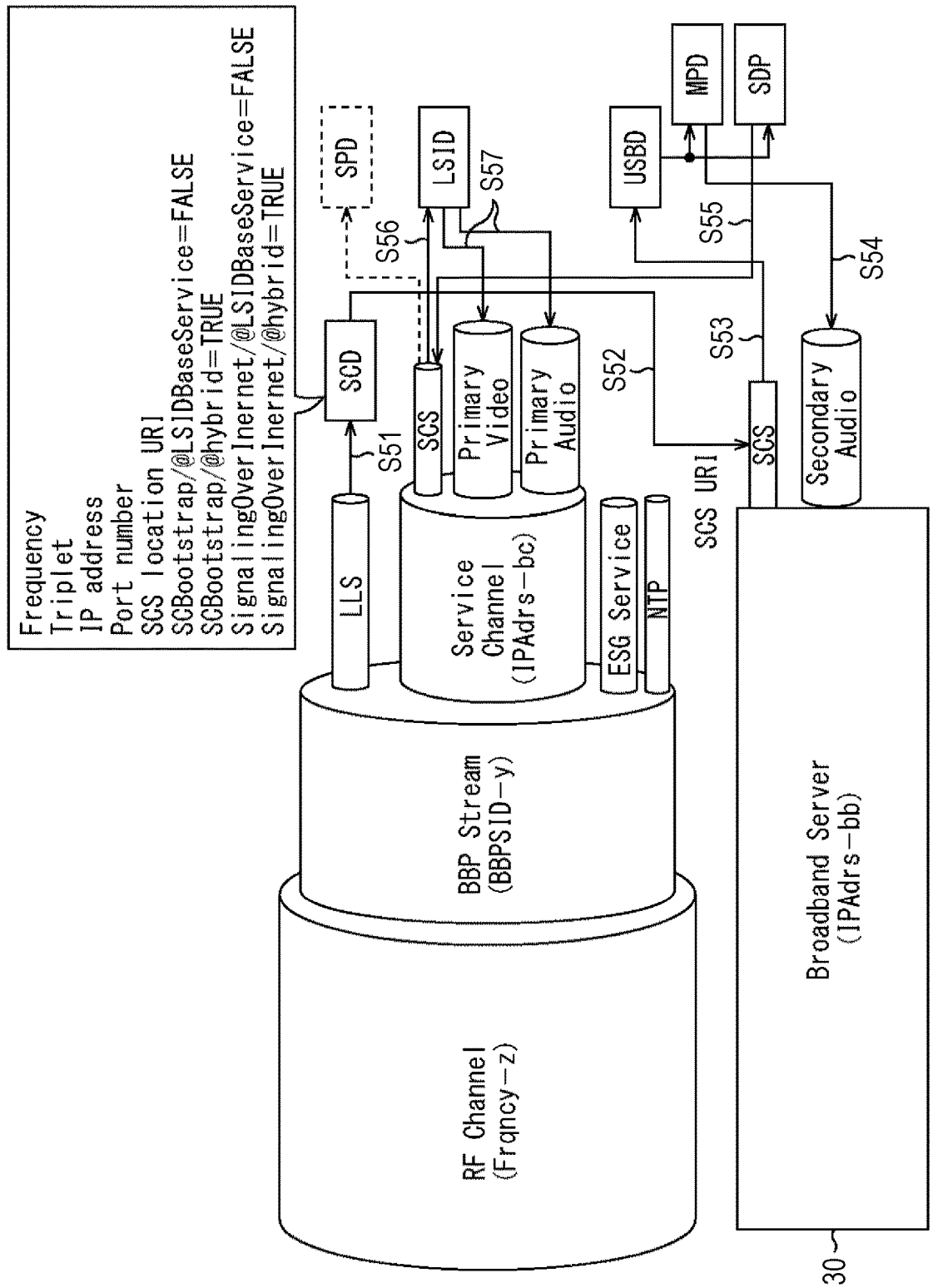
FIG. 9 is a diagram illustrating a system pipe model of an operation example 2-2.

FIG. 9 is a diagram illustrating a system pipe model of the operation example 2-2.

In the operation example 2-2 of FIG. 9, similarly to the operation example 1 of FIG. 5, one BBP stream is transmitted through a physical channel (an RF Channel) corresponding to a broadcast wave configured with a predetermined frequency band. In the BBP stream, streams of the LLS, the service channel (service), the ESG service, and the NTP are transmitted. The service is configured with the SCS signaling data and the components of the primary video and the primary audio.

The broadcast wave having the above configuration is transmitted from the transmission device 10 and received by the reception device 20A serving as the fixed receiver.

In the operation example 2-2, similarly to the operation example 2-1, the broadband server 30 performs streaming delivery of the secondary audio via the Internet 90, and delivers the SCS signaling data. The reception device 20A can access the broadband server 30 via the Internet 90 and acquire the secondary audio data or the SCS signaling data.

In other words, in the reception device 20A, the SCD transmitted through the LLS stream is acquired through the initial scan process or the like (S51). In addition to the frequency serving as the physical parameter and the triplet, the SC bootstrap information and the SCS broadband location information are described in the SCD.

Here, since "FALSE" and "TRUE" are designated in the SC bootstrap information of the SCD as the basic service flag and the hybrid flag, respectively, it is hard to acquire all the information for accessing the streams of the videos and the audios configuring the selected service with reference to only the LSID, and there is a component acquired by way of communication among the components configuring the service.

Further, since "FALSE" and "TRUE" are designated in the SCS broadband location information of the SCD as the basic service flag and the hybrid flag, respectively, it is hard to acquire all the information for accessing the streams of the videos and the audios configuring the selected service with reference to only the LSID, and there is a component acquired by way of communication among the components configuring the service.

When the user selects (directly selects) a service, the reception device 20A accesses the broadband server 30 via the Internet 90 according a Uniform Resource Identifier (URI) designated in the SCS broadband location information of the service, and acquires the SCS metadata such as the USBD, the MPD, and the SDP (S52 and S53).

Then, the reception device 20A can access the broadband server 30 via the Internet 90 according to the segment URL of the secondary audio described in the MPD with reference to the USBD acquired in the process of step S53 and access the stream of the secondary audio configuring the directly selected service (S54).

Further, the reception device 20A accesses the SCS stream transmitted through the broadcast wave according to the SDP with reference to the USBD, and acquires the LSID (S55 and S56). Then, the reception device 20A can access the streams of the primary video and the primary audio configuring the directly selected service using the TSI and the TOI of the primary video and the primary audio corresponding to the MIME type with reference to the LSID acquired in the process of step S56 (S57).

In FIG. 9, the LSID, the USBD, the MPD, and the SDP are illustrated as the SCS signaling data transmitted by way of broadcasting or communication, and the streams of the videos and the audios transmitted by way of broadcasting and communication is accessed with reference to the SCS metadata, but the SPD (indicated by a dotted line in FIG. 9) or other SCS metadata may be referred to as necessary.

(Sequence Diagram)

Figure 10:
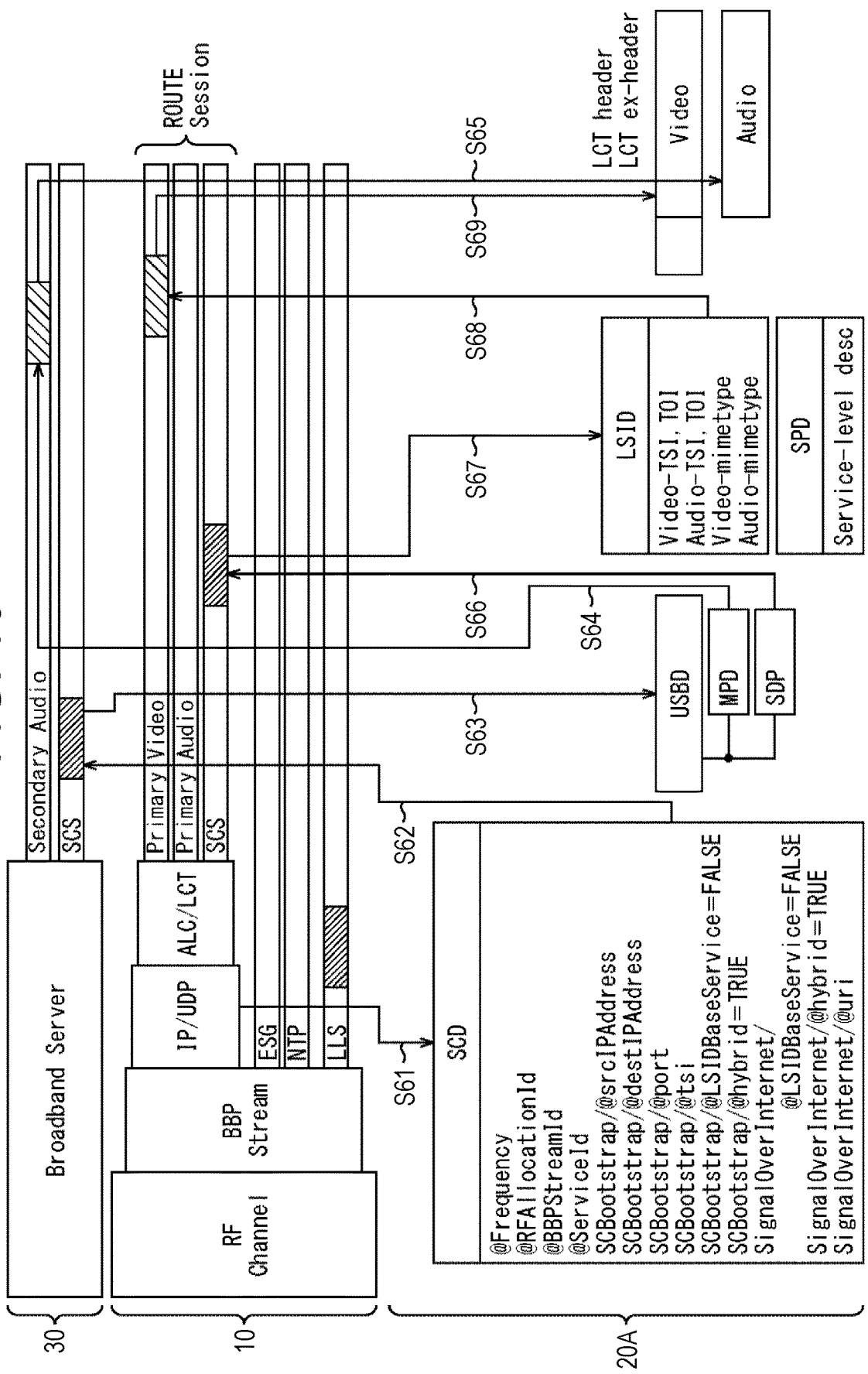
FIG. 10 is a sequence diagram of the operation example 2-2.

Next, the flow of a specific process in the reception device 20A when the operation example 2-2 is employed will be described with reference to FIG. 10. In FIG. 10, an upper portion indicates the flow of data transmitted from the transmission device 10 and the broadband server 30, and a lower portion indicates the flow of a process of processing the data in the reception device 20A. In FIG. 10, a time direction is a direction from the left to the right.

In FIG. 10, the transmission device 10 transmits the broadcast wave (RF Channel) of the digital broadcasting using the IP transmission scheme. In the broadcast wave, the components configuring the service (for example, the program), the SCS signaling data, the ESG data, the NTP data, and the LLS signaling data are transmitted through the BBP stream. Here, the primary video data and the primary audio data serving as the components configuring the service and the SCS signaling data are transmitted through the same ROUTE session.

In FIG. 10, the broadband server 30 delivers the secondary audio data and the SCS signaling data via the Internet 90.

As illustrated in FIG. 10, in the reception device 20A serving as the fixed receiver, the SCD transmitted through the LLS stream is acquired through the initial scan process or the like and recorded in the NVRAM (S61). In addition to the frequency serving as the physical parameter and the triplet, the SC bootstrap information and the SCS broadband location information are described in the SCD for each service.

In addition to the IP address, the port number, or the like, the basic service flag and the hybrid flag are designated in the SC bootstrap information. Here, since "FALSE" is designated as the basic service flag, and "TRUE" is designated as the hybrid flag, it is hard to specify the acquisition destination of the components based on only content described in the LSID, and it indicates that some components are delivered even by way of communication. In other words, In this case, the components configuring the target service are transmitted through a single ROUTE session, but some components (audios) are delivered by way of communication.

In addition to the URI indicating the acquisition destination of the SCS signaling data, the basic service flag and the hybrid flag are designated in the SCS broadband location information. Here, since "FALSE" is designated as the basic service flag, and "TRUE" is designated as the hybrid flag, it is hard to specify the acquisition destination of the components based on only content described in the LSID, and it indicates that some components are delivered even by way of communication.

For example, when the user performs an operation of selecting (directly selecting) the service, the reception device 20A reads the SCD from the NVRAM, and accesses the broadband server 30 via the Internet 90 according to the URI of the SCS broadband location information of the service (S62). As a result, the reception device 20A can acquire the SCS signaling data by way of communication (S63). Here, (the file of) the SCS metadata such as the USBD, the MPD, and the SDP is acquired as the SCS signaling data.

Then, the reception device 20A accesses the broadband server 30 via the Internet 90 according to the segment URL of the secondary audio described in the MPD acquired in the process of step S63 (S64). As a result, the reception device 20A can acquire the secondary audio data configuring the directly selected service which is streaming-delivered from the broadband server 30 (S65).

Further, the reception device 20A accesses the SCS stream transmitted from the transmission device 10 through the broadcast wave according to the SDP acquired in the process of step S63 (S66). As a result, the reception device 20A can acquire the LSID or the SPD transmitted through the ROUTE session (S67).

The TSI and the TOI of the video and the audio corresponding to the MIME type are described in the LSID. In other words, the IP address, the port number, the TSI, and the TOI for accessing the streams of the primary video and the primary audio configuring the directly selected service are specified with reference to the LSID. Here, since the secondary audio (for example, a second language) is reproduced instead of the primary audio (for example, a first language), only information related to a component of the primary video is used.

The reception device 20A accesses the stream of the primary video transmitted through the ROUTE session according to the IP address, the port number, the TSI, and the TOI of the primary video (S68). As a result, the reception device 20A can acquire the primary video data transmitted through the ROUTE session (S69).

Then, the reception device 20A performs the buffering process by temporarily storing the primary video data acquired by way of broadcasting and the secondary audio data acquired by way of communication in the buffer, and further performs the rendering process to reproduce the video and the sound of the program corresponding to the selected service.

As described above, in the operation example 2-2, in the reception device 20A serving as the fixed receiver, when the service is directly selected, since "FALSE" and "TRUE" are designated in the SC bootstrap information of the SCD or the SCS broadband location information as the basic service flag and the hybrid flag, respectively, the components configuring the target service are transmitted through one or more ROUTE sessions, and some components (audios) are delivered by way of communication. Further, all the information for accessing the streams of the videos and the audios configuring the service in the ROUTE session is obtained with reference to other SCS metadata such as the MPD in addition to the LSID.

For example, the reception device 20A can identify whether or not the components configuring the service are transmitted through only the ROUTE session, whether or not a location can be solved through only the LSID, or the like with reference to the basic service flag and the hybrid flag of the SC bootstrap information or the SCS broadband location information before the SCS signaling data is acquired and thus can acquire the components configuring the service efficiently, appropriately, and easily. Further, in the operation example 2-2, since the SCS signaling data is acquired by way of communication as well as by way of broadcasting, it is possible to reduce the data amount of the SCS signaling data transmitted through the broadcast wave and reduce the use band thereof.

As a modified example of the operation example 2-2, by designating "TRUE" and FALSE" in the SC bootstrap information as the basic service flag and the hybrid flag, respectively and designating "TRUE" in the SCS broadband location information as the hybrid flag, it is possible to indicate that the SCS signaling data for receiving only the primary video data and the primary audio data transmitted by way of broadcasting is transmitted as the SCS signaling data transmitted by way of broadcasting. In this case, by designating "TRUE" as the hybrid flag of the SCS broadband location information, it is possible to indicate that the SCS signaling data for receiving the primary video data and the primary audio data transmitted by way of broadcasting and the secondary audio data transmitted by way of communication is transmitted as the SCS signaling data transmitted by way of communication.

(4) Operation Example 3: Basic Broadcasting Service Selection (The Mobile Receiver and the ESG Selection)

An operation example 3 is an operation example in which, when the components configuring the service are provided through broadcasting (and communication), the service is ESG-selected in the reception device 20B serving as the mobile receiver (FIG. 2).

(System Pipe Model)

Figure 11:
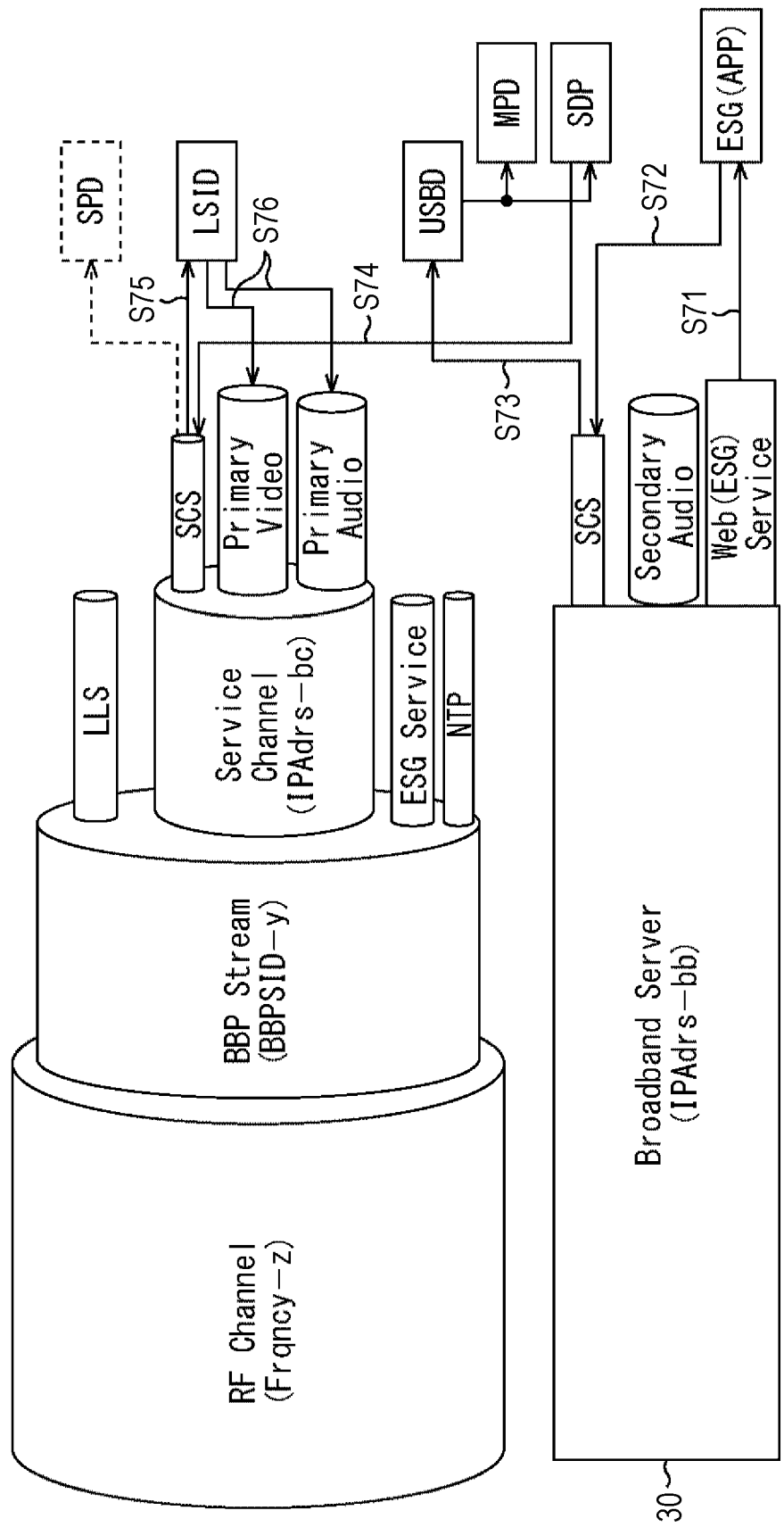
FIG. 11 is a diagram illustrating a system pipe model of an operation example 3.

FIG. 11 is a diagram illustrating a system pipe model of the operation example 3.

In the operation example 3 of FIG. 11, similarly to the operation example 1 of FIG. 5, one BBP stream is transmitted through a physical channel (an RF Channel) corresponding to a broadcast wave configured with a predetermined frequency band. In the BBP stream, streams of the LLS, the service channel (service), the ESG service, and the NTP are transmitted. The service is configured with the SCS signaling data and the components of the primary video and the primary audio.

The broadcast wave having the above configuration is transmitted from the transmission device 10 and received by the reception device 20B serving as the mobile receiver.

In the operation example 3, the broadband server 30 delivers the SCS signaling data and the ESG data via the Internet 90. The reception device 20B can access the broadband server 30 via the Internet 90 and acquire the SCS signaling data and the ESG data.

In other words, when the user performs a predetermined operation (for example, gives an instruction to acquire the electronic program table), the reception device 20B accesses the broadband server 30 according to the URL of the acquisition destination of the ESG data acquired in advance and acquires the ESG data (S71). Further, when the user performs service selection (ESG selection) using the electronic program table corresponding to the ESG data, the reception device 20B accesses the broadband server 30 via the Internet 90 based on the ESG data, and acquires the SCS metadata such as the USBD, the MPD, and the SDP (S72 and S73).

Then, the reception device 20B accesses the SCS stream transmitted through the broadcast wave according to the SDP with reference to the USBD acquired in the process of step S73, and acquires the LSID (S74 and S75). Then, the reception device 20B can access the streams of the primary video and the primary audio configuring the ESG-selected service using the TSI and the TOI of the primary video and the primary audio corresponding to the MIME type with reference to the LSID acquired in the process of step S75 (S76).

In FIG. 11, the LSID, the USBD, the MPD, and the SDP are illustrated as the SCS signaling data transmitted by way of broadcasting or communication, and the streams of the videos and the audios transmitted by way of broadcasting are accessed with reference to the SCS metadata, but the SPD (indicated by a dotted line in FIG. 11) or other SCS metadata may be referred to as necessary.

In FIG. 11, in the reception device 20B, the selection (the ESG selection) of the service is performed using the electronic program table corresponding to the ESG data, the ESG data may be acquired via an application for viewing the service delivered from the broadband server 30, and then the selection of the service may be performed. Further, in FIG. 11, the example of accessing the streams of the primary video and the primary audio transmitted through the broadcast wave is illustrated, but the streams of the secondary audio delivered from the broadband server 30 may be accessed using the MPD referred to from the USBD.

(Sequence Diagram)

Figure 12:
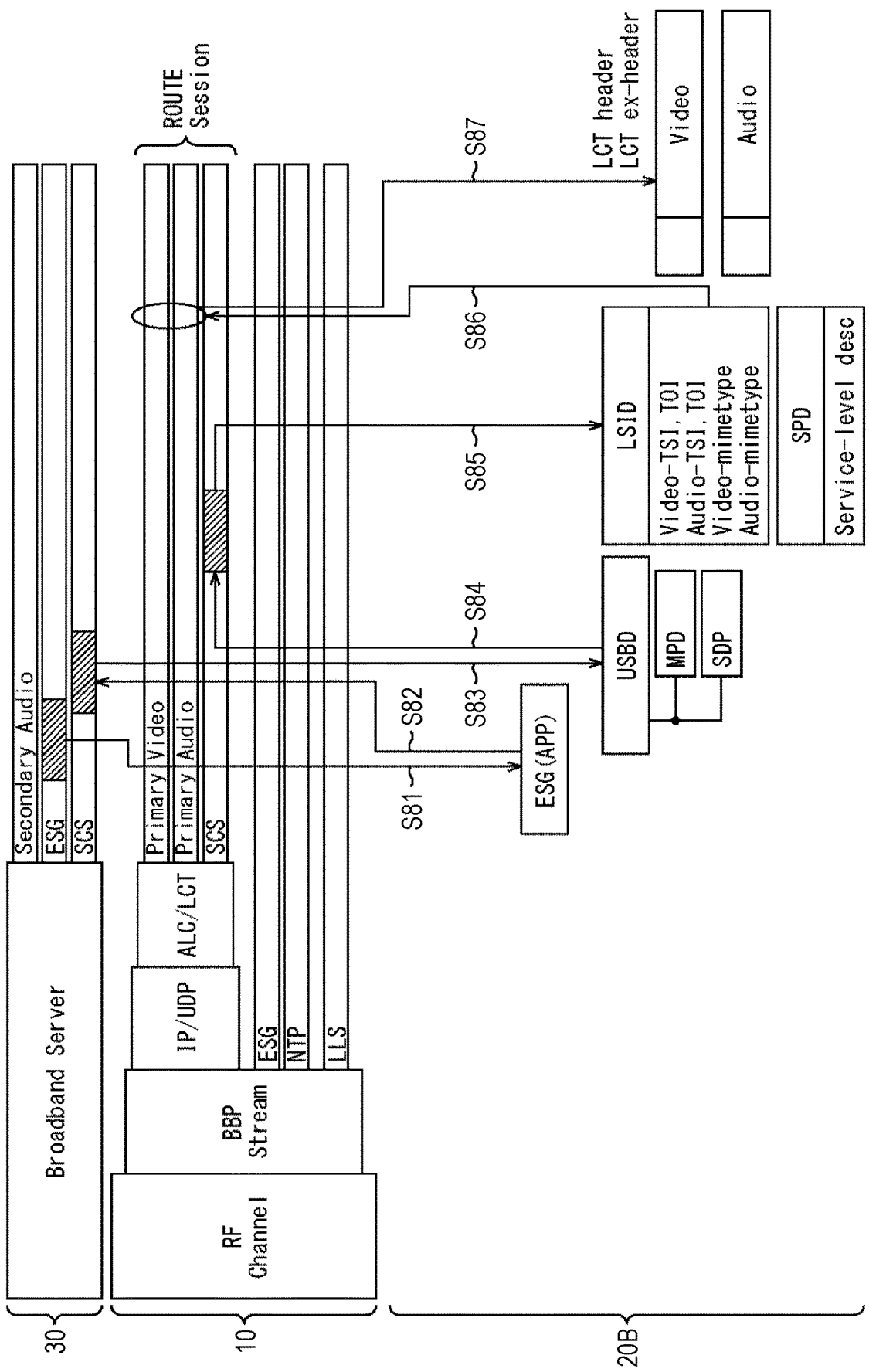
FIG. 12 is a sequence diagram of the operation example 3.

Next, the flow of a specific process in the reception device 20B when the operation example 3 is employed will be described with reference to FIG. 12. In FIG. 12, an upper portion indicates the flow of data transmitted from the transmission device 10 and the broadband server 30, and a lower portion indicates the flow of a process of processing the data in the reception device 20B. In FIG. 12, a time direction is a direction from the left to the right.

In FIG. 12, the transmission device 10 transmits the broadcast wave (RF Channel) of the digital broadcasting using the IP transmission scheme. In the broadcast wave, the components configuring the service (for example, the program), the SCS signaling data, the ESG data, the NTP data, and the LLS signaling data are transmitted through the BBP stream. Here, the primary video data and the primary audio data serving as the components configuring the service and the SCS signaling data are transmitted through the same ROUTE session.

In FIG. 12, the broadband server 30 delivers the ESG data and the SCS signaling data via the Internet 90. The broadband server 30 may deliver the secondary audio data.

As illustrated in FIG. 12, when an application (APP) is activated, and, for example, the electronic program table is displayed on the application, the reception device 20B serving as the mobile receiver accesses the broadband server 30 via the Internet 90 and acquires the ESG data (S81). As a result, in the reception device 20B, the electronic program table is displayed according to the ESG data acquired by the application by way of communication.

Here, for example, when the user performs the selection operation (the ESG selection) of the service based on the electronic program table, the reception device 20B accesses the broadband server 30 via the Internet 90 based on the ESG data (S82). As a result, the reception device 20B can acquire the SCS signaling data by way of communication (S83). Here, using the ESG data, it is possible to acquire the SCS metadata such as the USBD, the MPD, and the SDP.

Further, the reception device 20B accesses the SCS stream transmitted from the transmission device 10 through the broadcast wave according to the SDP acquired in the process of step S83 (S84). As a result, the reception device 20B can acquire the SCS signaling data transmitted through the ROUTE session (S85). Here, the SCS metadata such as the LSID and the SPD is acquired as the SCS signaling data.

The TSI and the TOI of the video and the audio corresponding to the MIME type are described in the LSID. In other words, the IP address, the port number, the TSI, and the TOI for accessing the streams of the primary video and the primary audio configuring the ESG-selected service are specified with reference to the LSID.

The reception device 20B accesses the streams of the primary video and the primary audio transmitted through the ROUTE session according to the IP address, the port number, the TSI, and the TOI (S86). As a result, the reception device 20B can acquire the primary video data and the primary audio data transmitted through the ROUTE session (S87).

Then, the reception device 20B performs the buffering process by temporarily storing the primary video data and the secondary audio data acquired by way of broadcasting in the buffer, and further performs the rendering process to reproduce the video and the sound of the program corresponding to the ESG-selected service. The time stamp of the NTP transmitted through the extension field of the LCT header may be used for the synchronous reproduction of the video and the sound. Further, when the NTP time stamp is not transmitted through the extension field of the LCT header, as another means, it is desirable to acquire the MPD transmitted through the SCS stream and calculate a decoding time and a display time based on a reference time of the MPD, a decoding time of picture units stored in a moof box of a DASH segment, and display time information.

In the example of FIG. 12, both the primary video data and the secondary audio data are acquired by way of broadcasting, but when the secondary audio instead of the primary audio is acquired by way of communication, the secondary audio data may be acquired by accessing the broadband server 30 via the Internet 90 according to the segment URL of the MPD acquired in the process of step S83.

As described above, in the operation example 3, the example in which the ESG selection of the service is performed in the reception device 20B serving as the mobile receiver has been described.

(5) Operation Example 4: Basic Broadcasting Service Selection (The Fixed Receiver, the ESG Selection)

An operation example 4 is an operation example in which, when the components configuring the service are provided only through broadcasting, the service is ESG-selected in the reception device 20A (FIG. 1) serving as the fixed receiver.

(System Pipe Model)

Figure 13:
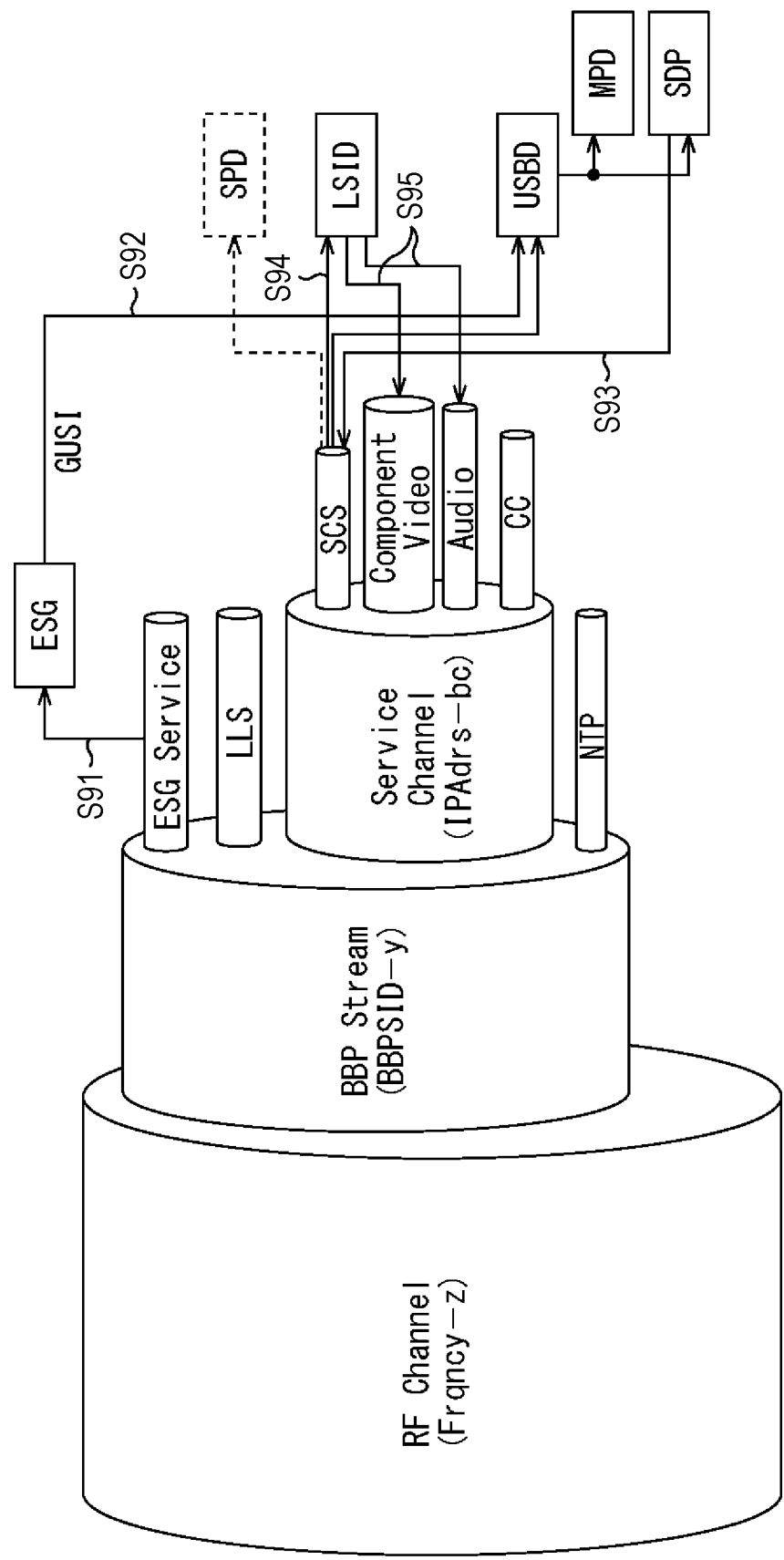
FIG. 13 is a diagram illustrating a system pipe model of an operation example 4.

FIG. 13 is a diagram illustrating a system pipe model of the operation example 4.

In the operation example 4 of FIG. 13, similarly to the operation example 1 of FIG. 5, one BBP stream is transmitted through a physical channel (an RF Channel) corresponding to a broadcast wave configured with a predetermined frequency band. In the BBP stream, streams of the LLS, the service channel (service), the ESG service, and the NTP are transmitted. The service is configured with the SCS signaling data and the components of the videos, the audios, and the subtitles.

The broadcast wave having the above configuration is transmitted from the transmission device 10 and received by the reception device 20A serving as the fixed receiver.

In other words, when the user performs a predetermined operation, the reception device 20A acquires the ESG data transmitted through the ESG stream according to the ESG bootstrap information of the SCD read from the NVRAM (S91).

When the user performs selection (the ESG selection) of a service using the electronic program table corresponding to the ESG data, the reception device 20A acquires the USBD from the SCS stream according to the ESG-selected service (S92). The ESG-selected service is linked with the USBD using a global unique service ID (GUSI) of the SCD. The SCS metadata such as the MPD and the SDP is acquired based on the reference information of the USBD.

The reception device 20A accesses the SCS stream according to the SDP with reference to the USBD and acquires the LSID (S93 and S94). Then, the reception device 20A can access the streams of the videos and the audios configuring the ESG-selected service with reference to the LSID acquired in the process of step S94 using the TSI and the TOI of the video and the audio corresponding to the MIME type (S95).

In FIG. 13, the LSID, the USBD, the MPD, and the SDP are illustrated as the SCS signaling data transmitted by way of broadcasting, and the streams of the videos and the audios transmitted by way of broadcasting are accessed with reference to the SCS metadata, but the SPD (indicated by a dotted line in FIG. 13) or other SCS metadata may be referred to as necessary.

(Sequence Diagram)

Figure 14:
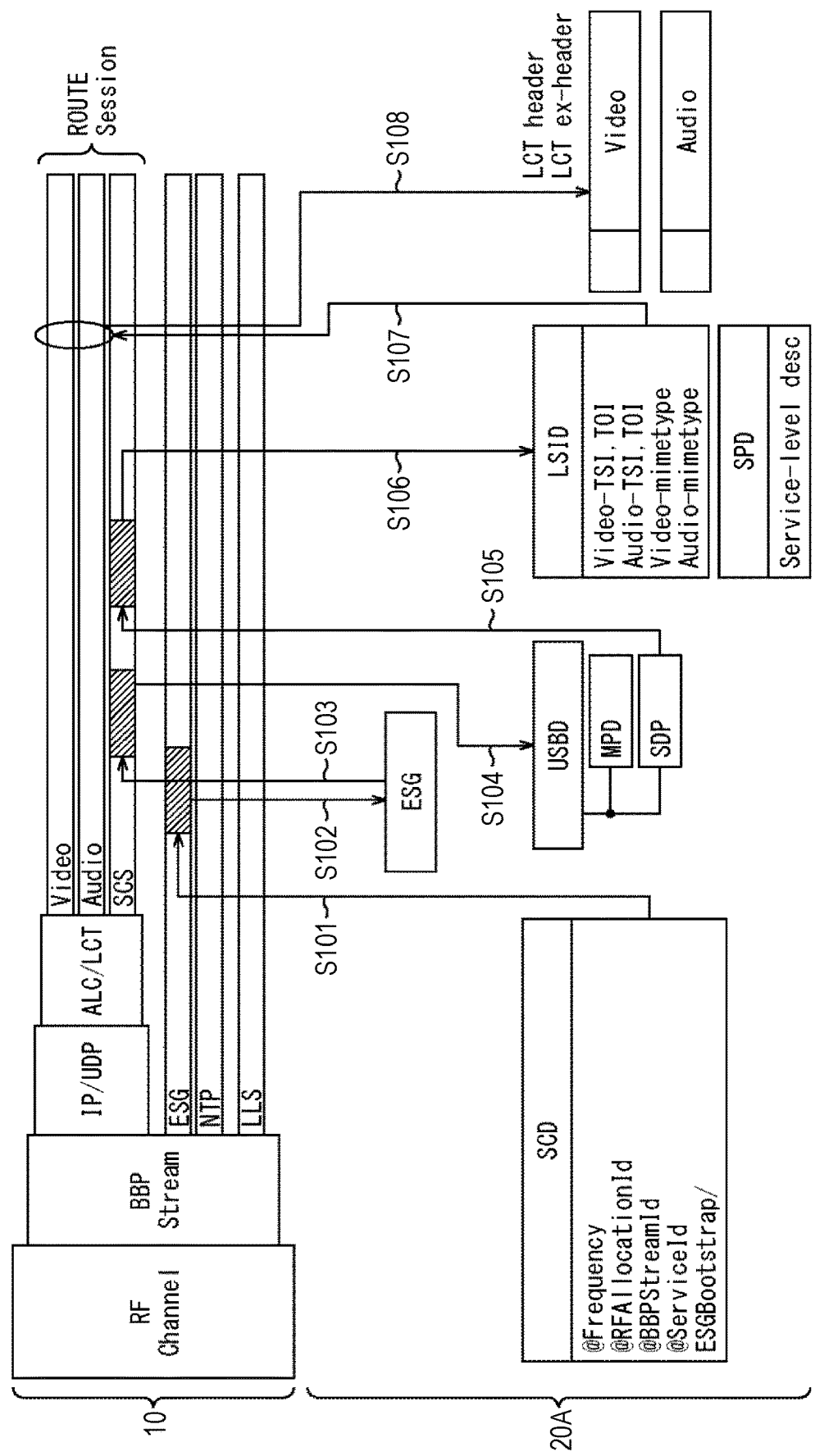
FIG. 14 is a sequence diagram of the operation example 4.

Next, the flow of a specific process in the reception device 20A when the operation example 4 is employed will be described with reference to FIG. 14. In FIG. 14, an upper portion indicates the flow of data transmitted from the transmission device 10, and a lower portion indicates the flow of a process of processing the data in the reception device 20A. In FIG. 14, a time direction is a direction from the left to the right.

In FIG. 14, the transmission device 10 of the broadcasting station transmits the broadcast wave (RF Channel) of the digital broadcasting using the IP transmission scheme. In the broadcast wave, the components configuring the service (for example, the program), the SCS signaling data, the ESG data, the NTP data, and the LLS signaling data are transmitted through the BBP stream. Here, the video data and the audio data serving as the components configuring the service and the SCS signaling data are transmitted through the same ROUTE session.

As illustrated in FIG. 14, in the reception device 20A serving as the fixed receiver, the SCD transmitted through the LLS is acquired through the initial scan process or the like and recorded in the NVRAM. In addition to the frequency serving as the physical parameter and the triplet, the ESG bootstrap information is described in the SCD.

For example, when the user gives an instruction to display the electronic program table, the reception device 20A accesses the ESG stream transmitted from the transmission device 10 through the broadcast wave according to the ESG bootstrap information of the SCD read from the NVRAM (S101). As a result, the reception device 20A can acquire the ESG data transmitted through the ESG stream (S102).

For example, when the user performs the selection operation (the ESG selection) of the service based on the electronic program table, the reception device 20A accesses the SCS stream according to the ESG-selected service (S103). As a result, the reception device 20A can acquire the SCS signaling data transmitted through the ROUTE session (S104). Here, the ESG-selected service is linked with the USBD using the global unique service ID of the SCD, since the reference information of the SCS metadata is described in the USBD, the SCS metadata such as the MPD and the SDP is acquired using the reference information.

The reception device 20A accesses the SCS stream transmitted from the transmission device 10 through the broadcast wave according to the SDP acquired in the process of step S104 (S105). As a result, the reception device 20A can acquire the SCS signaling data transmitted through the ROUTE session (S106). Here, the SCS metadata such as the LSID and the SPD is acquired as the SCS signaling data.

The TSI and the TOI of the video and the audio corresponding to the MIME type are described in the LSID. In other words, the IP address, the port number, the TSI, and the TOI for accessing the streams of the videos and the audios configuring the ESG-selected service are specified with reference to the LSID.

The reception device 20A accesses the streams of the videos and the audios transmitted through the ROUTE session according to the IP address, the port number, the TSI, and the TOI (S107). As a result, the reception device 20A can acquire the video data and the audio data transmitted through the ROUTE session (S108).

Then, the reception device 20A performs the buffering process by temporarily storing the video data and the audio data acquired by way of broadcasting in the buffer, and further performs the rendering process to reproduce the video and the sound of the program corresponding to the ESG-selected service. The time stamp of the NTP transmitted through the extension field of the LCT header may be used for the synchronous reproduction of the video and the sound. Further, when the NTP time stamp is not transmitted through the extension field of the LCT header, as another means, it is desirable to acquire the MPD transmitted through the SCS stream and calculate a decoding time and a display time based on a reference time of the MPD, a decoding time of picture units stored in a moof box of a DASH segment, and display time information.

As described above, the operation example 4 has been described in connection with the example in which the reception device 20A serving as the fixed receiver performs the ESG selection of the service.

(6) Operation Example 5-1: Robust Service Selection 1 (The Fixed Receiver and Direct Selection)

An operation example 5-1 is an operation example in which, when the components configuring the service are transmitted through a plurality of ROUTE sessions, the service is directly selected in the reception device 20A (FIG. 1) serving as the fixed receiver.

(System Pipe Model)

Figure 15:
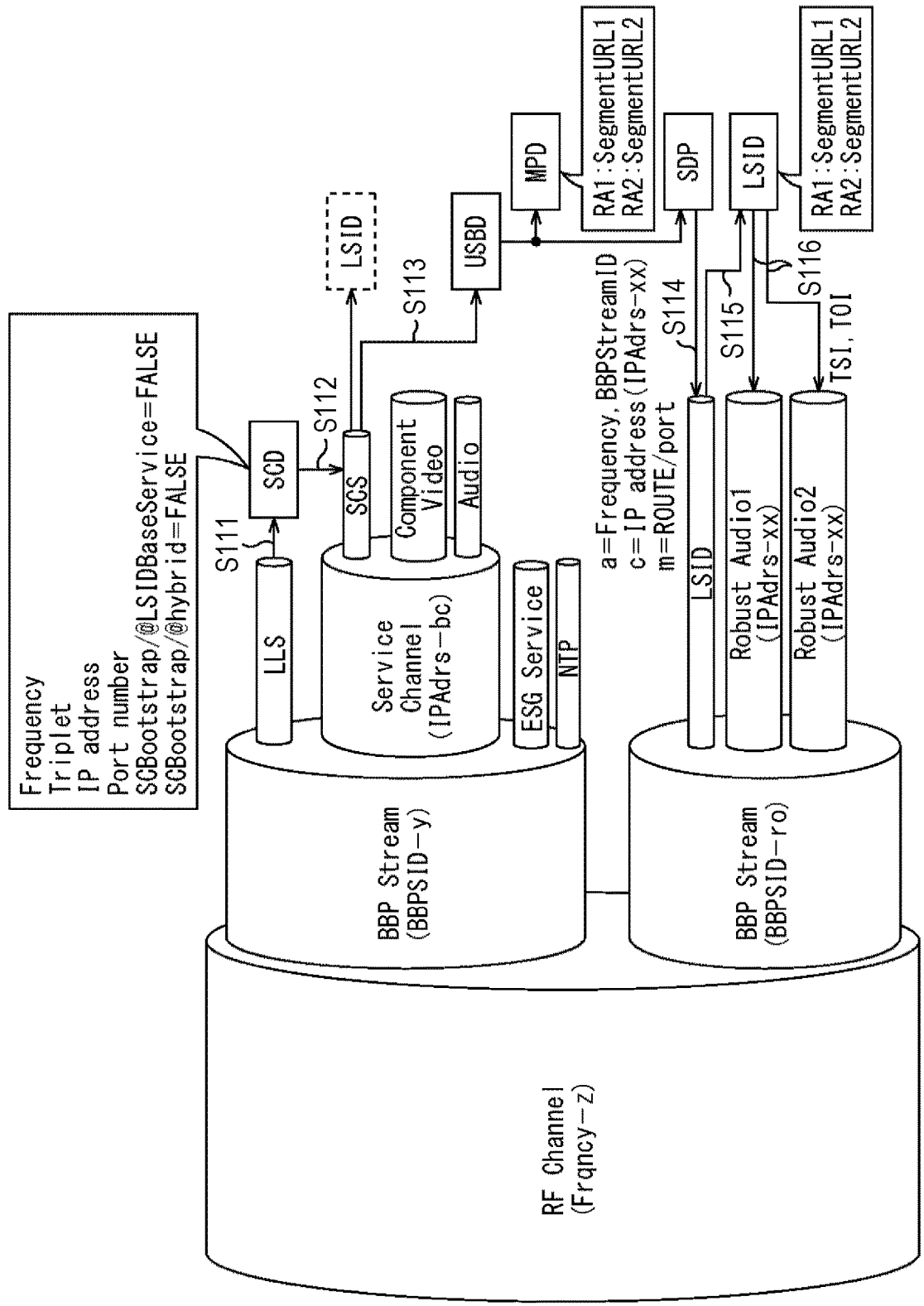
FIG. 15 is a diagram illustrating a system pipe model of an operation example 5-1.

FIG. 15 is a diagram illustrating a system pipe model of the operation example 5-1.

The broadcast wave of the operation example 5-1 of FIG. 15 has the same configuration as the broadcast wave of the operation example 1 of FIG. 5, but two BBP streams are transmitted through a physical channel (RF Channel) corresponding to a broadcast wave configured with a predetermined frequency band.

Here, the streams of the LLS, the service channel (service), the ESG service, and the NTP are transmitted through one BBP stream (the BBP stream ID="y"). The service is configured with the SCS signaling data and the components of the videos and the audios. The streams of the LSID, two robust audios (Robust Audio1 and Robust Audio2) are transmitted through the other BBP stream (the BBP stream ID="ro").

As described above, in the operation example 5-1, in addition to the streams of the basic videos and the audios, the streams of the robust audios that are low in a quality and high in robustness are transmitted. Further, two streams of a robust audio 1 and a robust audio 2 that differ in strength level are transmitted as the robust audio.

The broadcast wave having the above configuration is transmitted from the transmission device 10 and received by the reception device 20A serving as the fixed receiver.

In other words, in the reception device 20A, the SCD transmitted through the LLS stream is acquired through the initial scan process or the like (S111). Here, since "FALSE" and "FALSE" are designated in the SC bootstrap information of the SCD as the basic service flag and the hybrid flag, respectively, the reception device 20A hardly acquire all the information for accessing the streams of the videos and the audios configuring the selected service with reference to only the LSID. Further, there is no component acquired by way of communication among the components configuring the service.

When the user selects (directly selects) a service, the reception device 20A accesses the SCS stream transmitted through one BBP stream (the BBP stream ID="y") according to the SC bootstrap information of the service, and acquires the SCS metadata such as the USBD, the MPD, and the SDP (S112 and S113).

Further, the reception device 20A accesses the SCS stream transmitted through the other BBP stream (the BBP stream ID="ro") according to the SDP with reference to the USBD, and acquires the LSID (S114 and S115). Then, the reception device 20A can access the streams of the robust audio 1 or the robust audio 2 configuring the directly selected service with reference to the LSID acquired in the process of step S115 using the TSI and the TOI of the robust audio 1 and the robust audio 2 corresponding to the MIME type (S116). For example, when a viewing environment is bad, and it is hard to view the basic video and audio, an operation of reproducing only the sound of the robust audio may be performed.

In FIG. 15, the LSID, the USBD, the MPD, and the SDP are illustrated as the SCS signaling data transmitted by way of broadcasting, and the stream of the robust audio transmitted by way of broadcasting is accessed with reference to the SCS metadata, but the SPD, the LSID (indicated by a dotted line in FIG. 15), or other SCS metadata may be referred to as necessary.

(Sequence Diagram)

Figure 16:
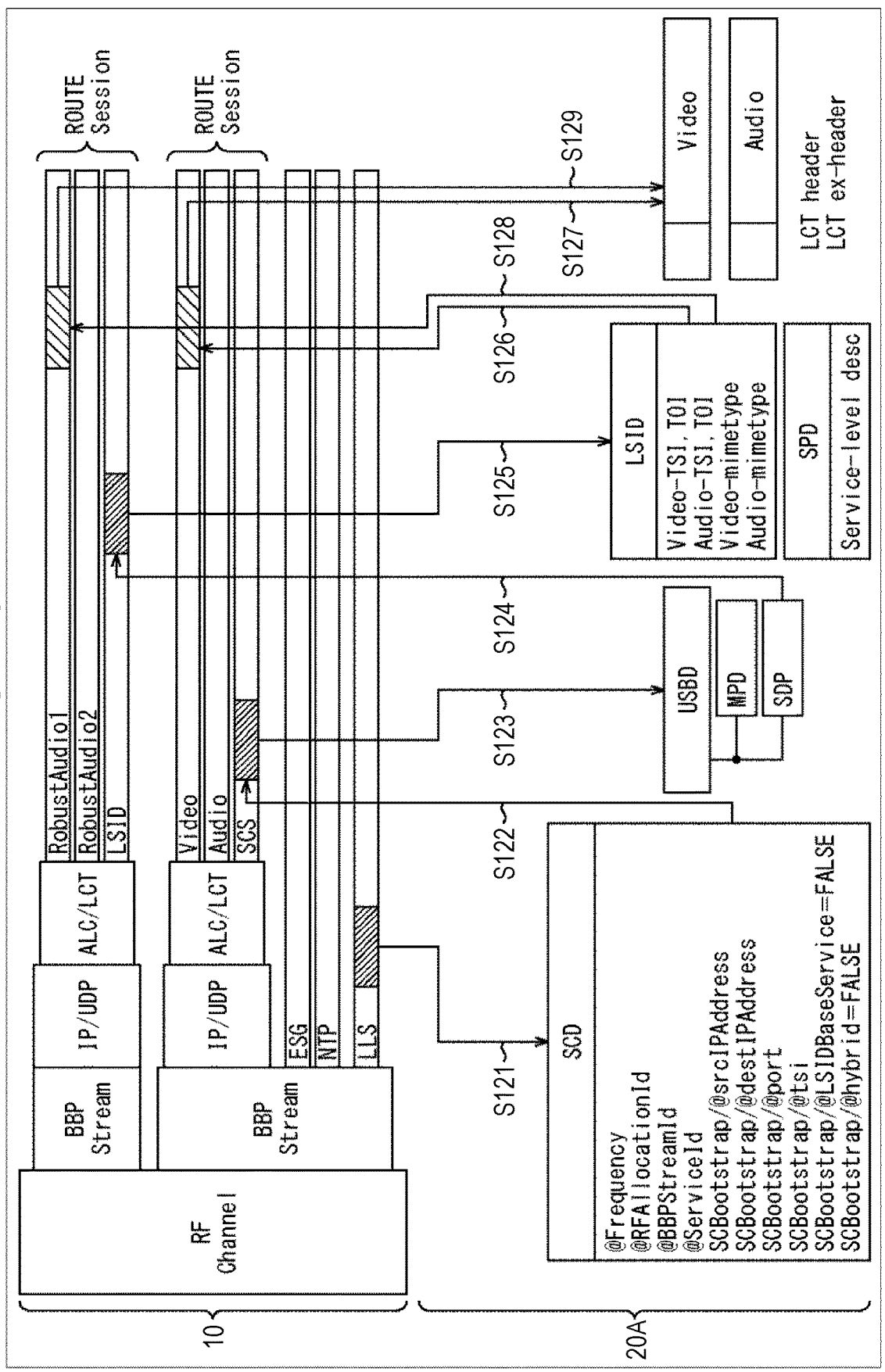
FIG. 16 is a sequence diagram of the operation example 5-1.

Next, the flow of a specific process in the reception device 20A when the operation example 5-1 is employed will be described with reference to FIG. 16. In FIG. 16, an upper portion indicates the flow of data transmitted from the transmission device 10, and a lower portion indicates the flow of a process of processing the data in the reception device 20A. In FIG. 16, a time direction is a direction from the left to the right.

In FIG. 16, the transmission device 10 transmits the broadcast wave (RF Channel) of the digital broadcasting using the IP transmission scheme. In the broadcast wave, the components configuring the service (for example, the program), the SCS signaling data, the ESG data, the NTP data, and the LLS signaling data are transmitted through one BBP stream (hereinafter, referred to as a "BBP stream 1"). The streams of the robust audio and the LSID are transmitted through the other BBP stream (hereinafter, referred to as a "BBP stream 2").

A ROUTE session for transmitting the streams of the video, the audio, and the SCS signaling data in the BBP stream 1 and a ROUTE session for transmitting the two robust audios and the LSID in the BBP stream 2 are different ROUTE sessions. Here, the former is referred to as a "ROUTE session 1," and the latter is referred to as a "ROUTE session 2."

As illustrated in FIG. 16, in the reception device 20A serving as the fixed receiver, the SCD transmitted through the LLS stream of the BBP stream 1 is acquired through the initial scan process or the like and recorded in the NVRAM (S121). In addition to the frequency serving as the physical parameter and the triplet, the SC bootstrap information is described in the SCD for each service.

The basic service flag and the hybrid flag are designated in the SC bootstrap information. Here, since "FALSE" is designated as the basic service flag, and "FALSE" is designated as the hybrid flag, it is hard to specify the acquisition destination of the components based on only content described in the LSID, and it indicates that all components are delivered by way of broadcasting.

For example, when the user performs an operation of selecting (directly selecting) the service, the reception device 20A reads the SCD from the NVRAM, and accesses the SCS stream of the BBP stream 1 transmitted from the transmission device 10 through the broadcast wave according to the SC bootstrap information of the service (S122). As a result, the reception device 20A can acquire the SCS signaling data transmitted through the ROUTE session 1 (S123). Here, since the reference information of the SCS metadata is described in the USBD, the MPD or the SDP is acquired using the reference information.

Further, the reception device 20A accesses the LSID stream of the BBP stream 2 transmitted from the transmission device 10 through the broadcast wave according to the SDP acquired in the process of step S123 (S124). As a result, the reception device 20A can acquire the LSID transmitted through the ROUTE session 2 (S125).

The TSI and the TOI of the video and the audio corresponding to the MIME type are described in the LSID. In other words, the IP address, the port number, the TSI, and the TOI for accessing the streams of the video and the robust audio 1 configuring the directly selected service are specified with reference to the LSID.

The reception device 20A accesses the stream of the video transmitted through the ROUTE session 1 according to the IP address, the port number, the TSI, and the TOI of the video (S126). As a result, the reception device 20A can acquire the video data transmitted through the ROUTE session 1 (S127).

Further, the reception device 20A accesses the stream of the robust audio 1 transmitted through the ROUTE session 2 according to the IP address, the port number, the TSI, and the TOI of the robust audio 1 (S128). As a result, the reception device 20A can acquire the robust audio data transmitted through the ROUTE session 2 (S129).

Then, the reception device 20A performs the buffering process by temporarily storing the video data acquired from the ROUTE session 1 and the robust audio data acquired from the ROUTE session 2 in the buffer, and further performs the rendering process to reproduce the video and the sound of the program corresponding to the selected service.

As described above, in the operation example 5-1, in the reception device 20A serving as the fixed receiver, when the service is directly selected, since "FALSE" and "FALSE" are designated in the SC bootstrap information of the SCD as the basic service flag and the hybrid flag, respectively, the components configuring the target service are transmitted through one or more ROUTE sessions, and all the components are delivered by way of broadcasting. Further, all the information for accessing the streams of the videos and the audios configuring the service in the ROUTE session is obtained with reference to other SCS metadata such as the SDP in addition to the LSID.

For example, the reception device 20A can identify whether or not the components configuring the service are transmitted through only the ROUTE session, whether or not a location can be solved through only the LSID, or the like with reference to the basic service flag and the hybrid flag of the SC bootstrap information before the SCS signaling data is acquired and thus can acquire the components configuring the service efficiently, appropriately, and easily.

(7) Operation Example 5-2: Robust Service Selection 2 (The Fixed Receiver and Direct Selection)

An operation example 5-2 is an operation example in which, when the components configuring the service and the SCS signaling data are transmitted through a plurality of ROUTE sessions, the service is directly selected in the reception device 20A (FIG. 1) serving as the fixed receiver.

(System Pipe Model)

Figure 17:
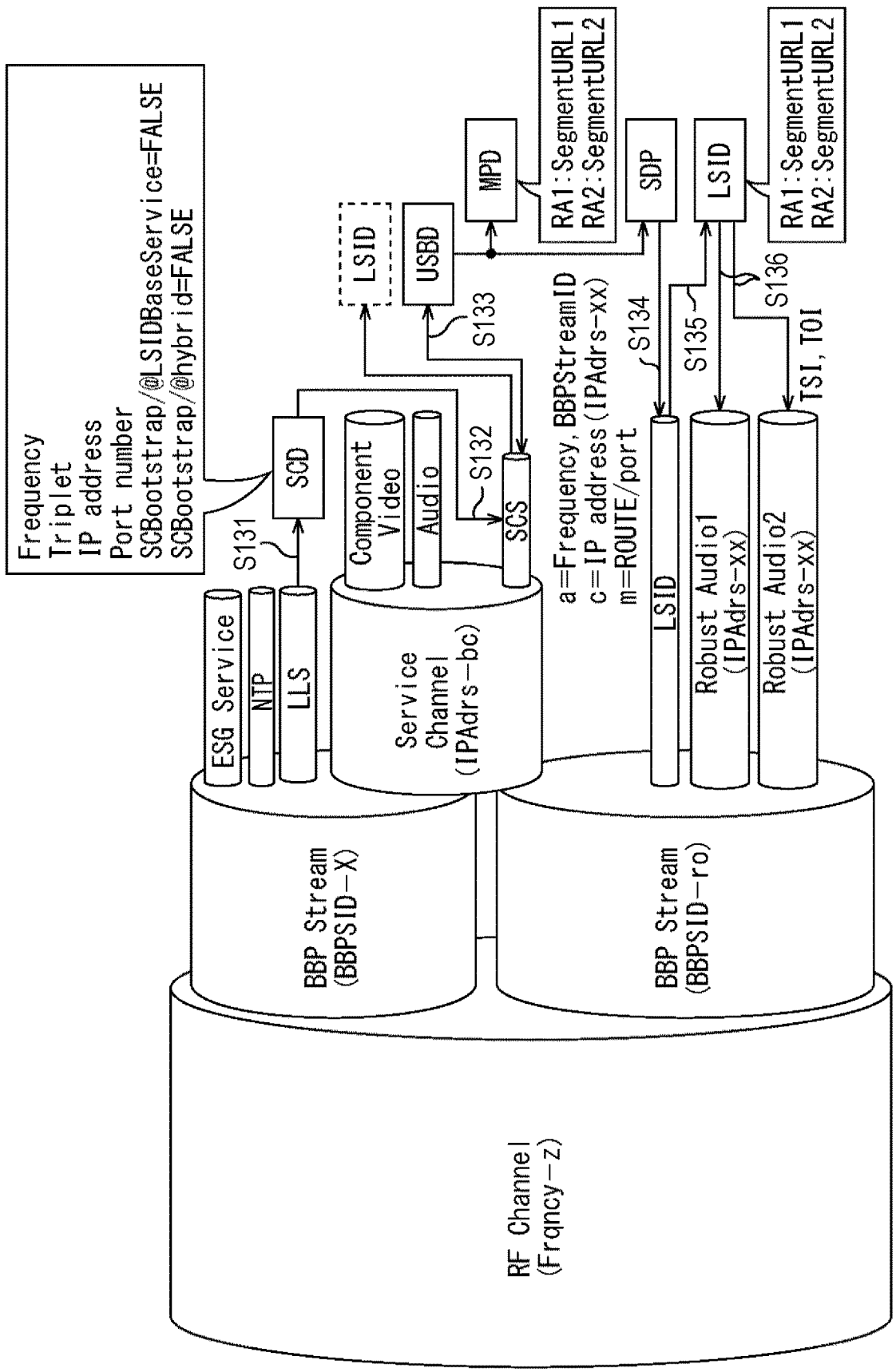
FIG. 17 is a diagram illustrating a system pipe model of an operation example 5-2.

FIG. 17 is a diagram illustrating a system pipe model of the operation example 5-2.

The broadcast wave of the operation example 5-2 of FIG. 17 has the same configuration as the broadcast wave of the operation example 5-1 of FIG. 15, but two BBP streams are transmitted through a physical channel (RF Channel) corresponding a broadcast wave configured with a predetermined frequency band, but the broadcast wave of the operation example 5-2 differs from the broadcast wave of the operation example 5-1 in that the service channel straddles the two BBP streams.

Here, some streams of the ESG service, the NTP, the LLS, and the service channel (service) are transmitted through one BBP stream (the BBP stream ID="X"), and some streams of the LSID, the two robust audios, and the service channel (service) are transmitted through the other BBP stream (the BBP stream ID="ro").

In other words, since the ROUTE session is independent of the BBP stream, and elements configuring one ROUTE session need not be transmitted through the same BBP stream, for example, the components such as the video and the audio and the SCS signaling data may be transmitted through different BBP streams. For example, in FIG. 17, the components of the video and the audio are transmitted through one BBP stream (the BBP stream ID="X"), and the SCS signaling data is transmitted through the other BBP stream (the BBP stream ID="ro").

In this case, the other BBP stream (the BBP stream ID="ro") is a highly robust pipe for transmitting the robust audio and thus can reliably transmit the SCS signaling data while keeping data of the video and the audio at a high definition.

For example, when a viewing environment is bad, and it is hard to view the basic video and audio, an operation of reproducing only the sound of the robust audio is considered, but when the SCS signaling data is hardly acquired, it is hard to reproduce the sound of the robust audio. For this reason, the SCS signaling data is transmitted through the highly robust pipe so that the SCS signaling data can be acquired even in such a viewing environment, and the robust audio is reliably reproduced.

The broadcast wave having the above configuration is transmitted from the transmission device 10 and received by the reception device 20A serving as the fixed receiver.

Further, the reception device 20A performs the process of steps S131 to S136 and accesses the robust audio 1 or the robust audio 2 configuring the directly selected service, but the flow of the process is the same as the process of steps S111 to S116 of FIG. 15, and thus a description thereof is omitted herein.

<3. Configurations of Devices Configuring System>

Next, configurations of the transmission device 10, the reception device 20, and the broadband server 30 will be described as detailed configurations of the respective devices configuring the service provision system 1 of FIG. 1 or the service provision system 2 of FIG. 2 with reference to FIGS. 18 to 21.

(Exemplary Configuration of Transmission Device)

Figure 18:
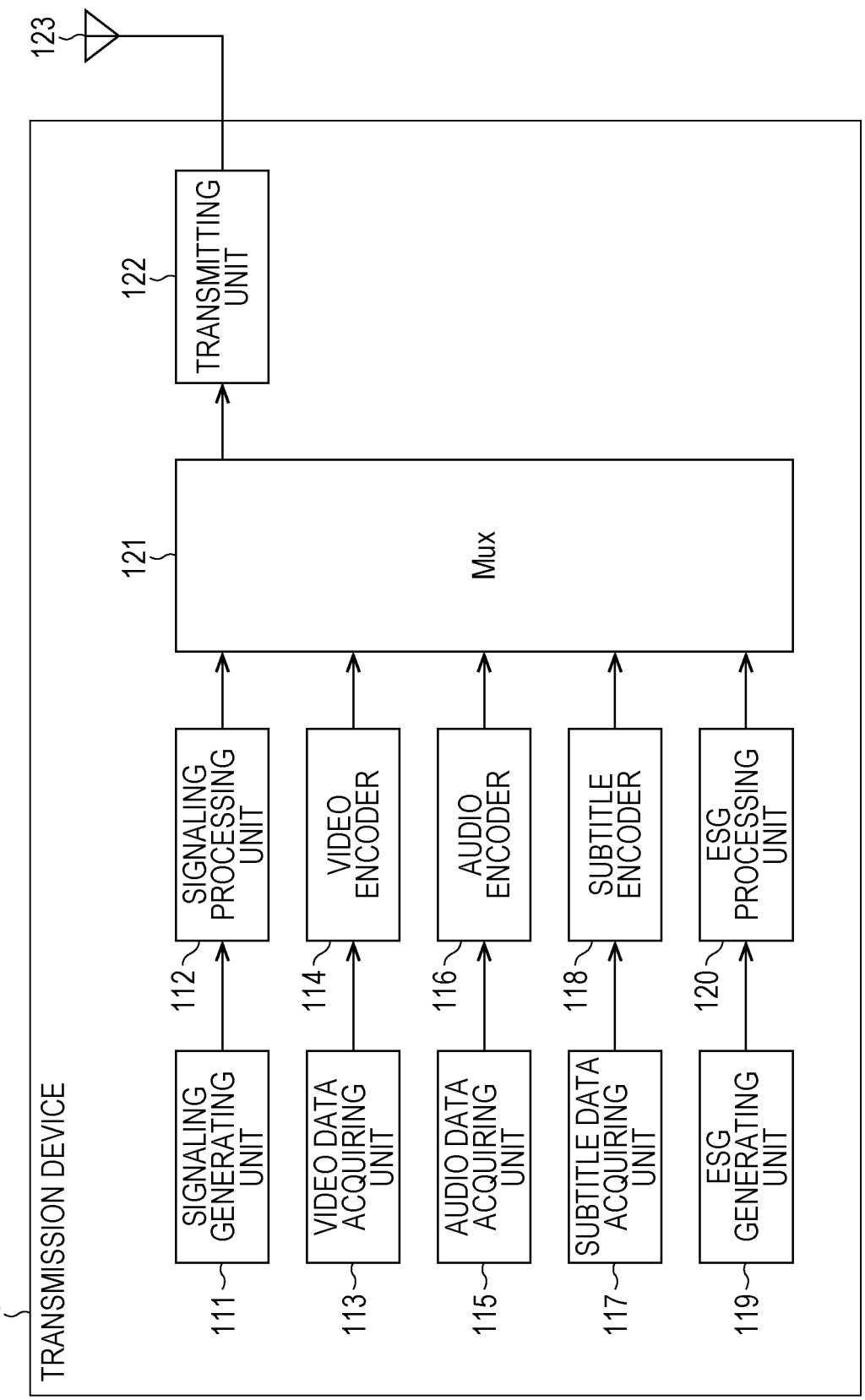
FIG. 18 is a diagram illustrating a configuration of an embodiment of a transmission device to which the present technology is applied.

FIG. 18 is a diagram illustrating a configuration of an embodiment of the transmission device to which the present technology is applied.

The transmission device 10 includes a signaling generating unit 111, a signaling processing unit 112, a video data acquiring unit 113, a video encoder 114, an audio data acquiring unit 115, an audio encoder 116, a subtitle data acquiring unit 117, a subtitle encoder 118, an ESG generating unit 119, an ESG processing unit 120, a Mux 121, and a transmitting unit 122 as illustrated in FIG. 18.

The signaling generating unit 111 acquires original data for generating the signaling data from an external server, an internal storage, or the like. The signaling generating unit 111 generates the signaling data using the original data of the signaling data, and supplies the generated signaling data to the signaling processing unit 112.

The signaling processing unit 112 processes the signaling data supplied from the signaling generating unit 111, and supplies the resulting data to the Mux 121. Here, the LLS signaling data configured with the LLS metadata such as the SCD and the SCS signaling data configured with the SCS metadata such as the USBD and the LSID are generated as the signaling data.

The video data acquiring unit 113 acquires video data supplied from an external server, an internal storage, a video camera, or the like, and supplies the acquired video data to the video encoder 114. The video encoder 114 encodes the video data supplied from the video data acquiring unit 113 according to an encoding scheme such as Moving Picture Experts Group (MPEG), and supplies the encoded video data to the Mux 121.

The audio data acquiring unit 115 acquires audio data supplied from an external server, an internal storage, a microphone, or the like, and supplies the acquired audio data to the audio encoder 116. The audio encoder 116 encodes the audio data supplied from the audio data acquiring unit 115 according to an encoding scheme such as MPEG, and supplies the encoded audio data to the Mux 121.

The subtitle data acquiring unit 117 acquires subtitle data supplied form an external server, an internal storage, or the like, and supplies the acquired subtitle data to the subtitle encoder 118. The subtitle encoder 118 encodes the subtitle data supplied from the subtitle data acquiring unit 117 according to an encoding scheme such as MPEG, and supplies the encoded subtitle data to the Mux 121.

The ESG generating unit 119 acquires original data for generating the ESG data from an external server, an internal storage, or the like. The ESG generating unit 119 generates the ESG data using the original data of the ESG data, and supplies the generated ESG data to the ESG processing unit 120. The ESG processing unit 120 processes the ESG data supplied from the ESG generating unit 119, and supplies the resulting data to the Mux 121.

The Mux 121 generates the BBP stream by multiplexing the stream of the signaling data supplied from the signaling processing unit 112, the stream of the video supplied from the video encoder 114, the stream of the audio supplied from the audio encoder 116, the stream of the subtitles supplied from the subtitle encoder 118, and the stream of the ESG data supplied from the ESG processing unit 120, and supplies the BBP stream to the transmitting unit 122. The transmitting unit 122 transmits the BBP stream supplied from the Mux 121 as the broadcast wave (digital broadcasting signal) of the digital broadcasting using the IP transmission scheme through an antenna 123.

The streams of the components such as the video and the audio and the SCS signaling data are transmitted through the ROUTE session. Further, when the streams of the components such as the video and the audio are transmitted through the ROUTE session, a file of each component is divided into segments according to regulations of ISO BMFF, and segment data obtained as a result is stored in the LCT packet and transmitted.

In the digital broadcasting signal, filtering information can be arranged in an LLS header of an LLS packet storing the LLS signaling data (for example, the LLS metadata such as the SCD) transmitted through the LLS stream or the LCT header of the LCT packet storing the SCS signaling data (for example, the SCS metadata such as the USBD and the LSID) transmitted through the SCS stream. Compression information (Compression Scheme), type information (Fragment Type), extension type information (Type Extension), version information, or the like is arranged as the filtering information.

Here, information indicating the presence or absence of compression of target signaling data is designated in the compression information. Information indicating a type of target signaling data is designated in the type information. Extended filtering information set for each type of signaling data is arbitrarily set to the extension type information. Information indicating a version of target signaling data is designated in the version information. As a result, the reception device 20 can perform a filtering process of the LLS packet or the LCT packet using the filtering information of the LLS header or the LCT header and acquire target signaling data.

(Exemplary Configuration of Reception Device)

Figure 19:
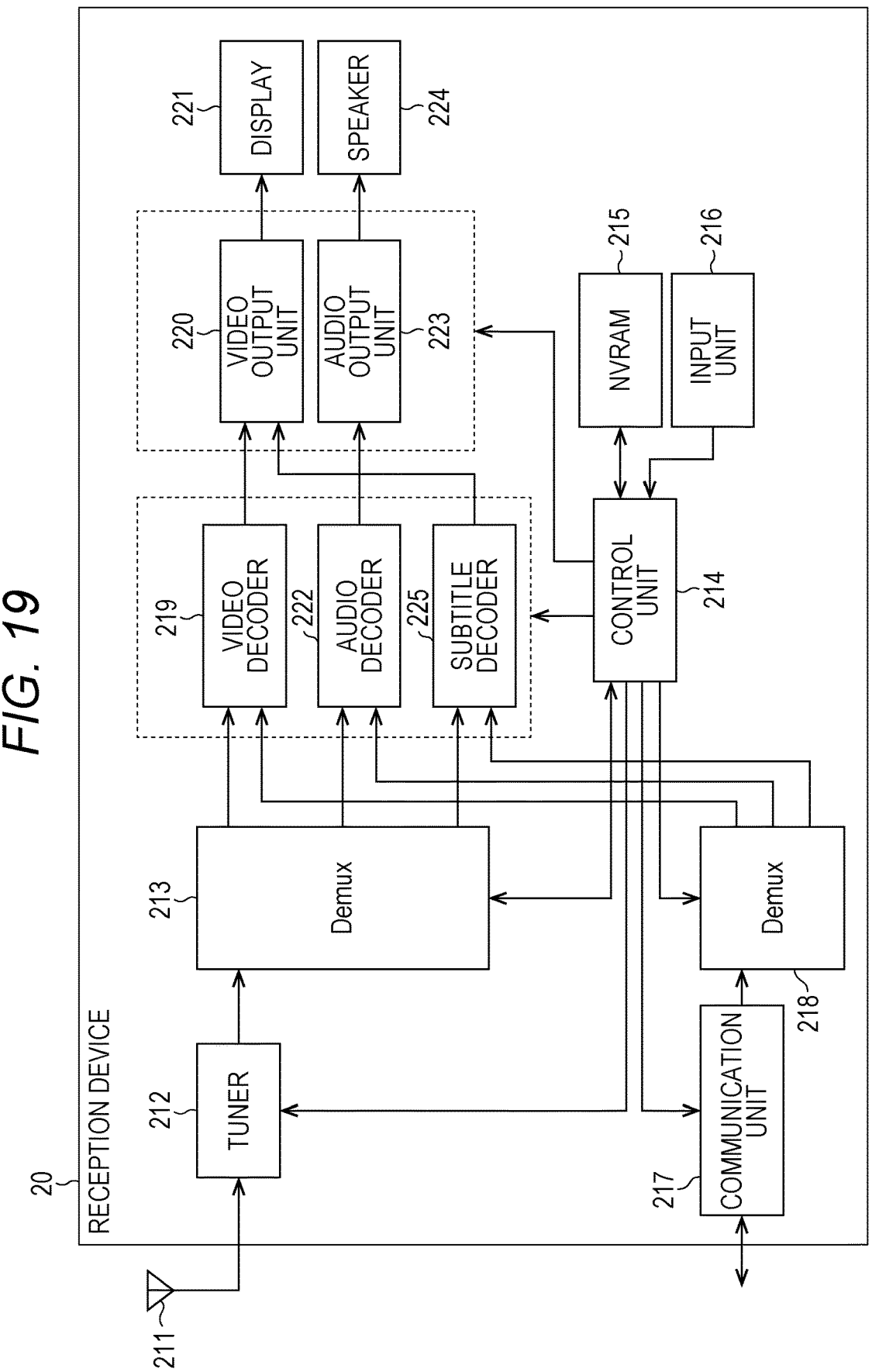
FIG. 19 is a diagram illustrating a configuration of an embodiment of a reception device to which the present technology is applied.

FIG. 19 is a diagram illustrating a configuration of an embodiment of the reception device to which the present technology is applied.

The reception device 20 includes a tuner 212, a Demux 213, a control unit 214, an NVRAM 215, an input unit 216, a communication unit 217, a Demux 218, a video decoder 219, a video output unit 220, a display 221, an audio decoder 222, an audio output unit 223, a speaker 224, and a subtitle decoder 225 as illustrated in FIG. 19.

The tuner 212 extracts and demodulates a digital broadcasting signal according to a selection operation of the user from the broadcast wave (digital broadcasting signal) of the digital broadcasting using the IP transmission scheme which is received through antenna 211 according to control of the control unit 214, and supplies a BBP stream obtained as a result to the Demux 213.

The Demux 213 separates the BBP stream supplied from the tuner 212 into the stream of the videos, the audios, and the subtitles and the signaling data according to the control of the control unit 214. The Demux 213 supplies the video data to the video decoder 219, supplies the audio data to the audio decoder 222, supplies the subtitle data to the subtitle decoder 225, and supplies the signaling data to the control unit 214.

The control unit 214 controls operations of the respective units of the reception device 20. The control unit 214 accesses the streams of the components transmitted by way of broadcasting or communication based on the signaling data supplied from the Demux 213 or the communication unit 217, and controls the operations of the respective units so that reproduction of the components is controlled. A detailed configuration of the control unit 214 will be described later with reference to FIG. 20.

The NVRAM 215 is a non-volatile memory, and records various kinds of data according to the control of the control unit 214. The input unit 216 supplies an operation signal to the control unit 214 according to an operation of the user.

The communication unit 217 accesses the broadband server 30 via the Internet 90 and requests the broadband server 30 to deliver the streams of the components according to the control of the control unit 214. The communication unit 217 receives the streams of the components streaming-delivered from the broadband server 30 via the Internet 90, and supplies the streams of the components to the Demux 218. The communication unit 217 receives the SCS signaling data or the ESG data from the broadband server 30 via the Internet 90 and supplies the SCS signaling data or the ESG data to the control unit 214 according to the control of the control unit 214.

The Demux 218 separates the streams of the components supplied from the communication unit 217 into the video data, the audio data, and the subtitle data according to the control of the control unit 214, and supplies the video data to the video decoder 219, supplies the audio data to the audio decoder 222, and supplies the subtitle data to the subtitle decoder 225.

The video data is supplied from the Demux 213 or the Demux 218 to the video decoder 219. The video decoder 219 decodes the video data according to a decoding scheme such as MPEG and supplies the decoded video data to the video output unit 220 according to the control of the control unit 214. The video output unit 220 outputs the video data supplied from the video decoder 219 to the display 221. As a result, for example, the video of the program is displayed on the display 221.

The audio data is supplied from the Demux 213 or the Demux 218 to the audio decoder 222. The audio decoder 222 decodes the audio data according to a decoding scheme such as MPEG and supplies the decoded audio data to the audio output unit 223 according to the control of the control unit 214. The audio output unit 223 outputs the audio data supplied from the audio decoder 222 to the speaker 224. As a result, for example, the sound corresponding to the video of the program is output from the speaker 224.

The subtitle data is supplied from the Demux 213 or the Demux 218 to the subtitle decoder 225. The subtitle decoder 225 decodes the subtitle data according to a decoding scheme such as MPEG and supplies the decoded subtitle data to the video output unit 220 according to the control of the control unit 214. The video output unit 220 combines the subtitle data supplied from the subtitle decoder 225 with the video data supplied from the video decoder 219, and outputs the combined data to the display 221. As a result, for example, the subtitles superimposed on the video of the program are displayed on the display 221.

Further, when the ESG data is separated from the BBP stream, the Demux 213 supplies the ESG data to the control unit 214. The control unit 214 supplies the ESG data supplied from the Demux 213 or the communication unit 217 to the video output unit 220, and causes the electronic program table to be displayed on the display 221. The reception device 20 may be configured not to have a communication function such as the communication unit 217. Further, when the reception device 20 is a set top box or the like, the reception device 20 may be configured not to include the display 221 or the speaker 224.

(Exemplary Functional Configuration of Control Unit)

Figure 20:
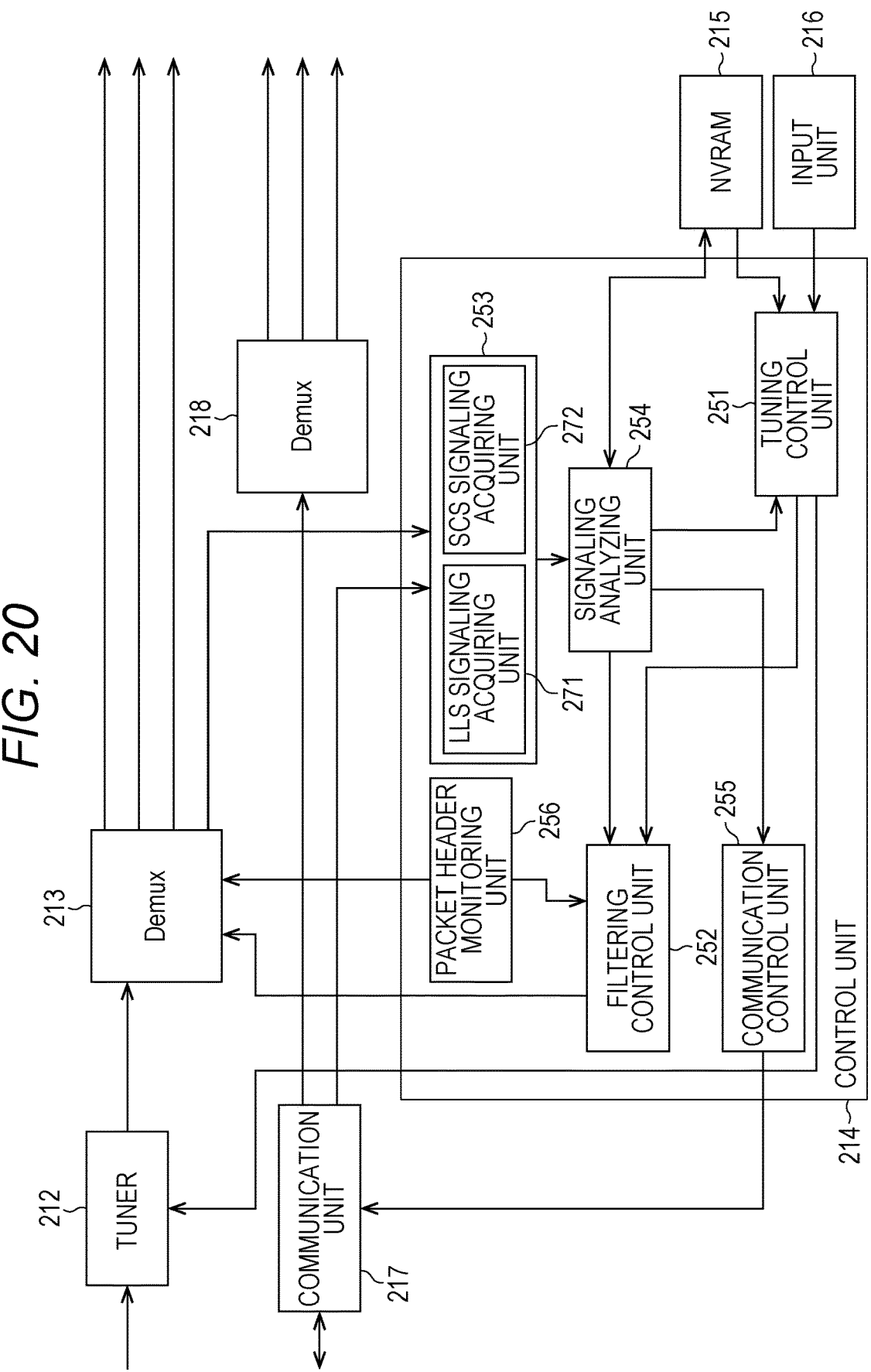
FIG. 20 is a diagram illustrating an exemplary functional configuration of a control unit of FIG. 19.

FIG. 20 is a diagram illustrating an exemplary functional configuration of a portion that controls an initial scan process, a tuning process, a filtering process, and a communication process in the control unit 214 of FIG. 19.

Referring to FIG. 20, the control unit 214 includes a tuning control unit 251, a filtering control unit 252, a signaling acquiring unit 253, a signaling analyzing unit 254, a communication control unit 255, and a packet header monitoring unit 256. The signaling acquiring unit 253 is configured with an LLS signaling acquiring unit 271 and an SCS signaling acquiring unit 272.

The tuning control unit 251 controls the tuning process performed by the tuner 212. The filtering control unit 252 controls the filtering process performed by the Demux 213.

At the time of the initial scan process, the tuning control unit 251 controls the tuner 212, the filtering control unit 252 controls the Demux 213, and the LLS signaling acquiring unit 271 acquires the LLS signaling data transmitted through the LLS stream, and supplies the LLS signaling data to the signaling analyzing unit 254. The signaling analyzing unit 254 records the selection information obtained by analyzing the LLS signaling data (the LLS metadata such as the SCD) supplied from the LLS signaling acquiring unit 271 in the NVRAM 215.

When the user performs the selection operation, the tuning control unit 251 acquires the selection information (the SCD) recorded in the NVRAM 215 according to the operation signal supplied from the input unit 216. The tuning control unit 251 controls the tuning process performed by the tuner 212 based on the acquired selection information. The tuning control unit 251 supplies the SC bootstrap information included in the selection information (the SCD) to the filtering control unit 252.

The filtering control unit 252 controls the filtering process performed by the Demux 213 based on the SC bootstrap information supplied from the tuning control unit 251. As a result, the Demux 213 accesses the SCS stream configuring the selection target service, and extracts the SCS signaling data from the LCT packet when the stream is transmitted through the ROUTE session. The SCS signaling acquiring unit 272 acquires the SCS signaling data (the SCS metadata such as the USBD, the SDP, the MPD, and the LSID), and supplies the SCS signaling data to the signaling analyzing unit 254.

The signaling analyzing unit 254 analyzes the SCS signaling data (the SCS metadata such as the USBD, the SDP, the MPD, and the LSID) supplied from the SCS signaling acquiring unit 272, and supplies the analysis result to the filtering control unit 252 or the communication control unit 255. In other words, when a delivery path of the streams of the components configuring the selection target service is by way of broadcasting, the signaling analyzing unit 254 specifies the IP address, the port number, the TSI, and the TOI for accessing the streams of the components, and supplies the IP address, the port number, the TSI, and the TOI to the filtering control unit 252. Further, when the delivery path of the streams of the components configuring the selection target service is by way of communication, the signaling analyzing unit 254 supplies information (for example, a URL) of the acquisition destination to the communication control unit 255.

The filtering control unit 252 controls the filtering process performed by the Demux 213 based on the IP address, the port number, the TSI, and the TOI supplied from the signaling analyzing unit 254. As a result, the Demux 213 performs the filtering process of the LCT packet, and extracts the segment data from the LCT packet obtained as a result. Then, the video data obtained as a result is supplied to the video decoder 219, and the audio data is supplied to the audio decoder 222. The subtitle data is supplied to the subtitle decoder 225.

The communication control unit 255 controls the communication process performed by the communication unit 217 based on the information (for example, the URL) of the acquisition destination supplied from the signaling analyzing unit 254. As a result, the communication unit 217 receives the streams of the components streaming-delivered from the broadband server 30 via the Internet 90, and supplies the streams of the components to the Demux 218. Then, the Demux 218 supplies the video data obtained from the streams supplied from the communication unit 217 to the video decoder 219, supplies the audio data to the audio decoder 222, and supplies the subtitle data to the subtitle decoder 225. Further, when the SCS signaling data is delivered from the broadband server 30, the SCS signaling data is supplied from the communication unit 217 to the SCS signaling acquiring unit 272.

The packet header monitoring unit 256 monitors the packet transmitted through the BBP stream in the Demux 213, and analyzes a header of a monitoring target packet. The packet header monitoring unit 256 controls the filtering control unit 252 according to the analysis result of the header of the packet such that the LLS metadata or the SCS metadata obtained from the packet satisfying a specific condition is acquired by the signaling acquiring unit 253. In the filtering process, filtering is performed, for example, using at least one of the compression information (Compression Scheme), the type information (Fragment Type), the extension type information (Type Extension), and the version information as the specific condition.

(Exemplary Configuration of Broadband Server)

Figure 21:
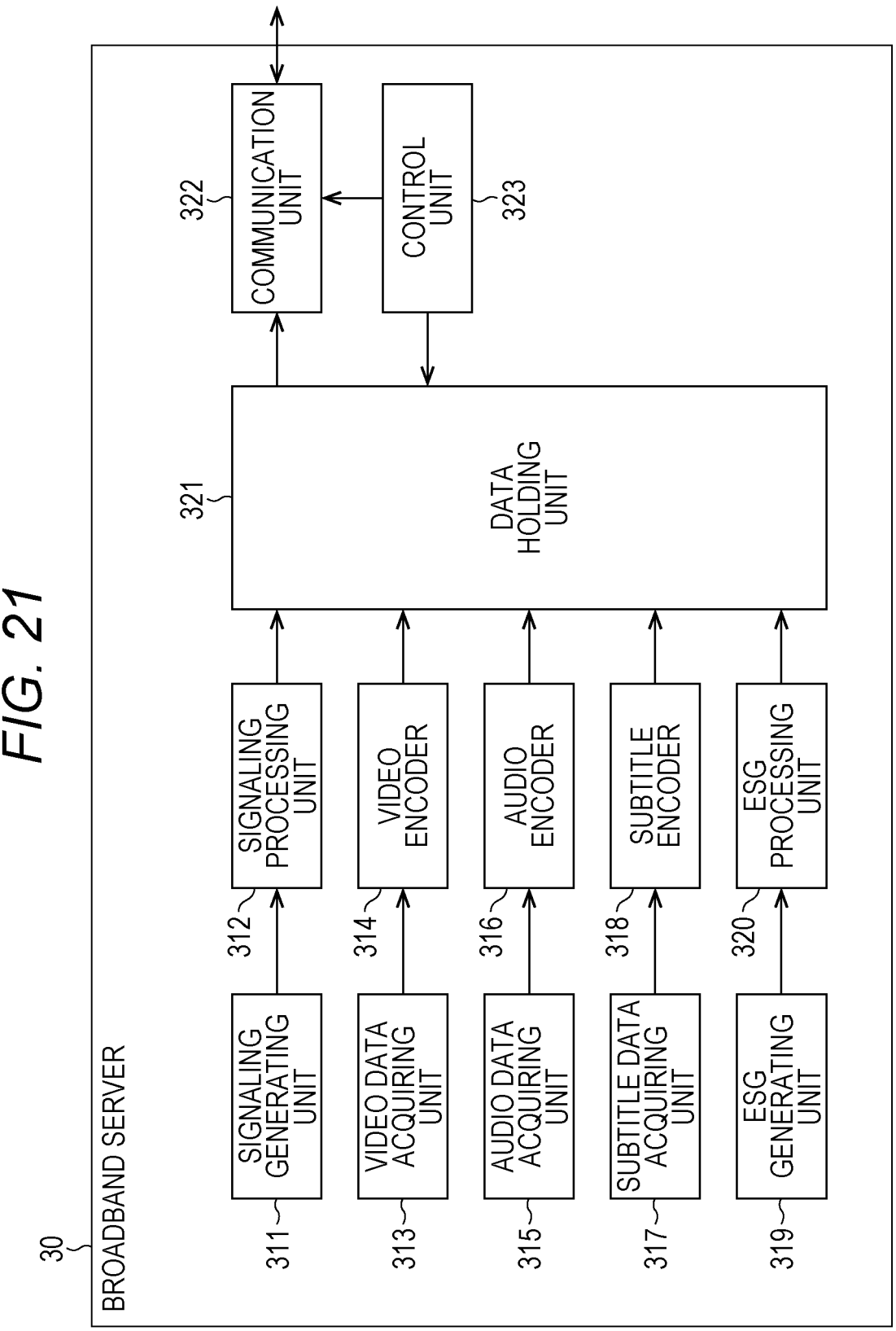
FIG. 21 is a diagram illustrating a configuration of an embodiment of a broadband server to which the present technology is applied.

FIG. 21 is a diagram illustrating a configuration of an embodiment of the broadband server to which the present technology is applied.

The broadband server 30 includes a signaling generating unit 311, a signaling processing unit 312, a video data acquiring unit 313, a video encoder 314, an audio data acquiring unit 315, an audio encoder 316, a subtitle data acquiring unit 317, a subtitle encoder 318, an ESG generating unit 319, an ESG processing unit 320, a data holding unit 321, a communication unit 322, and a control unit 323 as illustrated in FIG. 21.

The signaling generating unit 311 acquires original data for generating the SCS signaling data from an external server, an internal storage, or the like. The signaling generating unit 311 generates the SCS signaling data using the original data of the SCS signaling data, and supplies the generated SCS signaling data to the signaling processing unit 312.

The signaling processing unit 312 processes the SCS signaling data supplied from the signaling generating unit 311, and causes the SCS signaling data to be held in the data holding unit 321. Here, the SCS metadata such as the USBD and the LSID is generated as the SCS signaling data.

The video data acquiring unit 313 acquires the video data supplied from an external server, an internal storage, a video camera, or the like, and supplies the acquired video data to the video encoder 314. The video encoder 314 encodes the video data supplied from the video data acquiring unit 313 according to an encoding scheme such as MPEG, and causes the encoded video data to be held in the data holding unit 321.

The audio data acquiring unit 315 acquires audio data supplied from an external server, an internal storage, a microphone, or the like, and supplies the acquired audio data to the audio encoder 316. The audio encoder 316 encodes the audio data supplied from the audio data acquiring unit 315 according to an encoding scheme such as MPEG, and causes the encoded audio data to be held in the data holding unit 321.

The subtitle data acquiring unit 317 acquires subtitle data supplied form an external server, an internal storage, or the like, and supplies the acquired subtitle data to the subtitle encoder 318. The subtitle encoder 318 encodes the subtitle data supplied from the subtitle data acquiring unit 317 according to an encoding scheme such as MPEG, and causes the encoded subtitle data to be held in the data holding unit 321.

The ESG generating unit 319 acquires original data for generating the ESG data from an external server, an internal storage, or the like. The ESG generating unit 319 generates the ESG data using the original data of the ESG data, and supplies the generated ESG data to the ESG processing unit 320. The ESG processing unit 320 processes the ESG data supplied from the ESG generating unit 319, and causes the resulting data to be held in the data holding unit 321.

The data holding unit 321 holds the SCS signaling data supplied from the signaling processing unit 312, the video data supplied from the video encoder 314, the audio data supplied from the audio encoder 316, the subtitle data supplied from the subtitle encoder 318, and the ESG data supplied from the ESG processing unit 320 according to the control of the control unit 323.

The communication unit 322 performs communication with the reception device 20 via the Internet 90 according to the control of the control unit 323. The communication unit 322 reads the SCS signaling data, the video data, the audio data, the subtitle data, or the ESG data held in the data holding unit 321 and transmits the read data to the reception device 20 of the request source via the Internet 90 according to a request made from the reception device 20.

4. Flow of Processes Performed by Devices

Next, the flow of specific processes performed by the respective devices configuring the service provision system 1 of FIG. 1 or the service provision system 2 of FIG. 2 will be described with reference to FIGS. 22 to 27.

(Transmission Process)

First, the flow of the transmission process performed by the transmission device 10 will be described with reference to a flowchart of FIG. 22.

In step S151, the signaling generating unit 111 generates the signaling data using the original data of the signaling data, and supplies the signaling data to the signaling processing unit 112. In step S152, the signaling processing unit 112 processes the signaling data supplied from the signaling generating unit 111, and supplies the resulting data to the Mux 121.

Here, the LLS metadata such as the SCD and the SCS metadata such as the USBD and the LSID are generated as the signaling data. The signaling data may be generated by an external server. In this case, the signaling generating unit 111 supplies the signaling data supplied from the external server to the signaling processing unit 112 without change.

In step S153, the video data acquiring unit 113, the audio data acquiring unit 115, and the subtitle data acquiring unit 117 acquire the video data, the audio data, and the subtitle data serving as the component from an external server or the like, and supplies the video data, the audio data, and the subtitle data to the video encoder 114, the audio encoder 116, and the subtitle encoder 118.

In step S154, the video encoder 114, the audio encoder 116, and the subtitle encoder 118 encode the video data, the audio data, and the subtitle data serving as the component supplied from the video data acquiring unit 113, the audio data acquiring unit 115, and the subtitle data acquiring unit 117 according to an encoding scheme such as MPEG, and supply the encoded video data, the encoded audio data, and the encoded subtitle data to the Mux 121.

In step S155, the Mux 121 generates the BBP stream by multiplexing the signaling data supplied from the signaling processing unit 112, the stream of the video supplied from the video encoder 114, the stream of the audio supplied from the audio encoder 116, and the stream of the subtitles supplied from the subtitle encoder 118, and supplies the generated BBP stream to the transmitting unit 122.

In step S156, the transmitting unit 122 transmits the BBP stream supplied from the Mux 121 through the antenna 123 as the digital broadcasting signal. When the process of step S116 ends, the transmission process of FIG. 22 ends.

Figure 22:
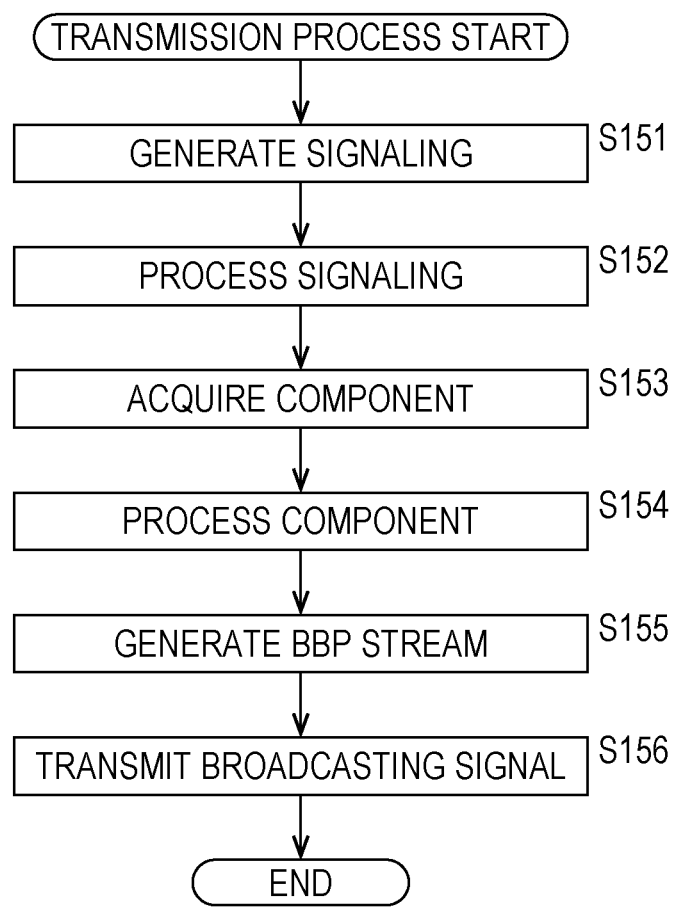
FIG. 22 is a flowchart for describing the flow of a transmission process.

In the transmission process of FIG. 22, when the streams of the components such as the videos, the audios, or the subtitles are transmitted through the ROUTE session, a file of each component is divided into segments according to regulations of ISO BMFF, and segment data obtained as a result is stored in the LCT packet and transmitted.

Further, in the digital broadcasting signal, the filtering information such as the compression information (Compression Scheme), the type information (Fragment Type), the extension type information (Type Extension), and the version information can be arranged in the LLS header of the LLS packet storing the LLS signaling data (for example, the LLS metadata such as the SCD) or the LCT header of the LCT packet storing the SCS signaling data (for example, the metadata such as the USBD and the LSID).

The flow of the transmission process has been described above.

(Initial Scan Process)

Figure 23:
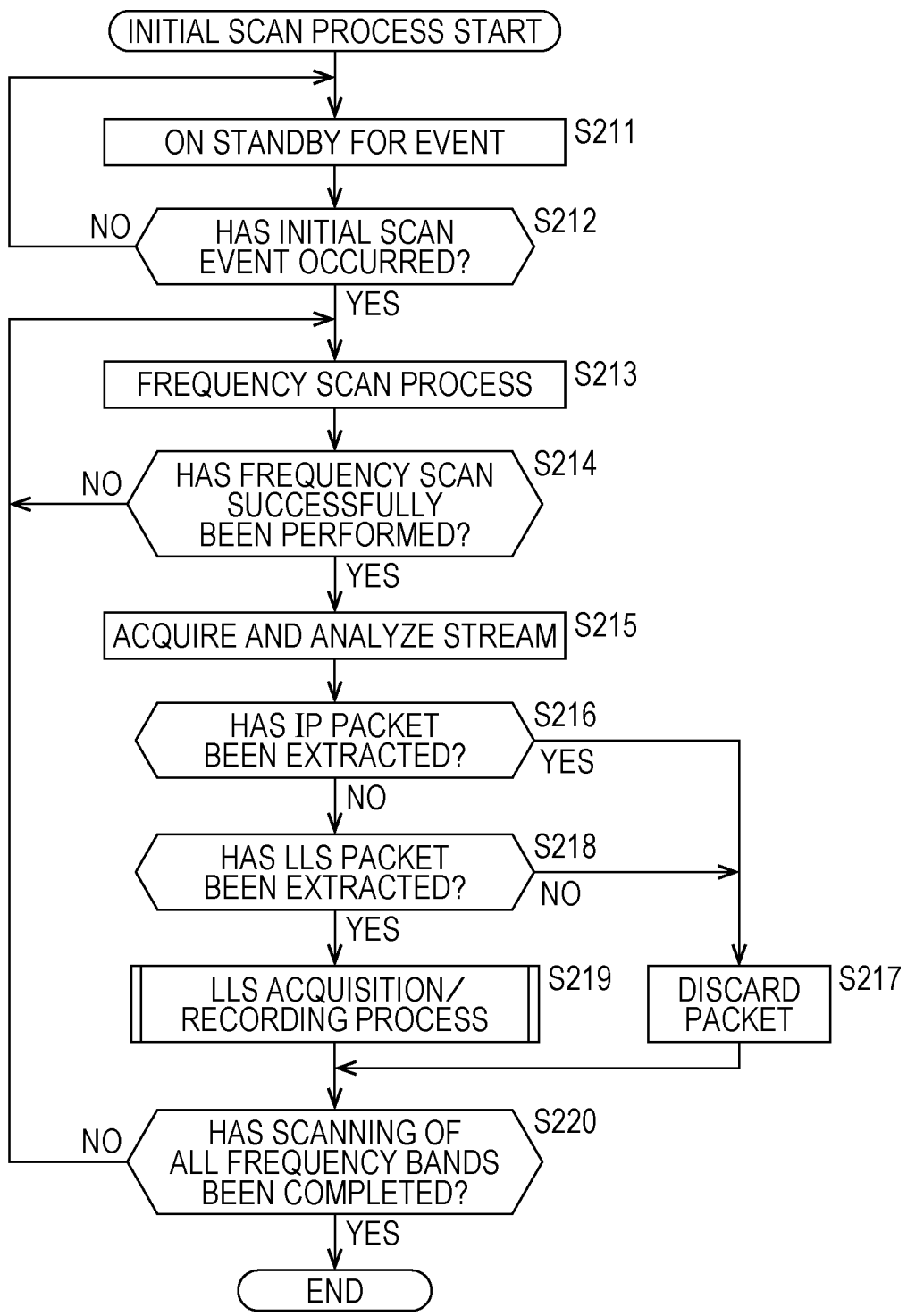
FIG. 23 is a flowchart for describing the flow of an initial scan process.

Next, the flow of the initial scan process performed by the reception device 20 will be described with reference to a flowchart of FIG. 23.

In step S211, the control unit 214 monitors the operation signal received from the input unit 216 or the like and is on standby until an initial scan event occurs. Then, when the initial scan is determined to have occurred in step S212, the process proceeds to step S213.

In step S213, the tuner 212 performs a frequency scan process according to control from the tuning control unit 251. In step S214, it is determined whether or not the frequency scan has successfully been performed by the frequency scan process of step S213, When the frequency scan is determined to have failed in step S214, the process returns to step S213, and the frequency scan process is performed again. On the other hand, in step S214, when the frequency scan process is determined to have successfully been performed, the process proceeds to step S215.

In step S215, the Demux 213 acquires and analyzes the BBP stream supplied from the tuner 212 according to the control of the filtering control unit 252. In step S216, it is determined whether or not an IP packet has been extracted from the BBP stream according to the analysis result of step S215.

When the IP packet is determined to have been extracted in step S216, the process proceeds to step S217. In step S217, the Demux 213 discards the extracted IP packet. On the other hand, when a packet other than the IP packet is determined to have been extracted in step S216, the process proceeds to step S218.

In step S218, it is determined whether or not the LLS packet has been extracted from the BBP stream according to the analysis result of step S215.

When a packet other than the LLS packet is determined to have been extracted in step S218, the process proceeds to step S217. In step S217, the Demux 213 discards the extracted packet other than the LLS packet. On the other hand, when the LLS packet is determined to have been extracted in step S218, the process proceeds to step S219.

In step S219, the Demux 213 and the control unit 214 perform an LLS acquisition/recording process. In the LLS acquisition/recording process, the filtering process is performed based on the filtering information of the LLS header added to the LLS packet, and the LLS signaling data (the LLS metadata such as the SCD) acquired by the filtering process is recorded in the NVRAM 215 as the selection information. The details of the LLS acquisition/recording process will be described with reference to a flowchart of FIG. 24.

When the process of step S217 or step S219 ends, the process proceeds to step S220. In step S220, it is determined whether or not scanning of all frequency bands has been completed.

When the scanning of all frequency bands is determined to have not been completed in step S220, the process returns to step S213, and the process of step S213 and steps subsequent thereto is repeated. As a result, the scan process of the respective frequency bands is performed, and the selection information is recorded. When the scanning of all frequency bands is determined to have been completed in step S220, the initial scan process of FIG. 23 ends.

The flow of the initial scan process has been described above.

(LLS Acquisition/Recording Process)

Figure 24:
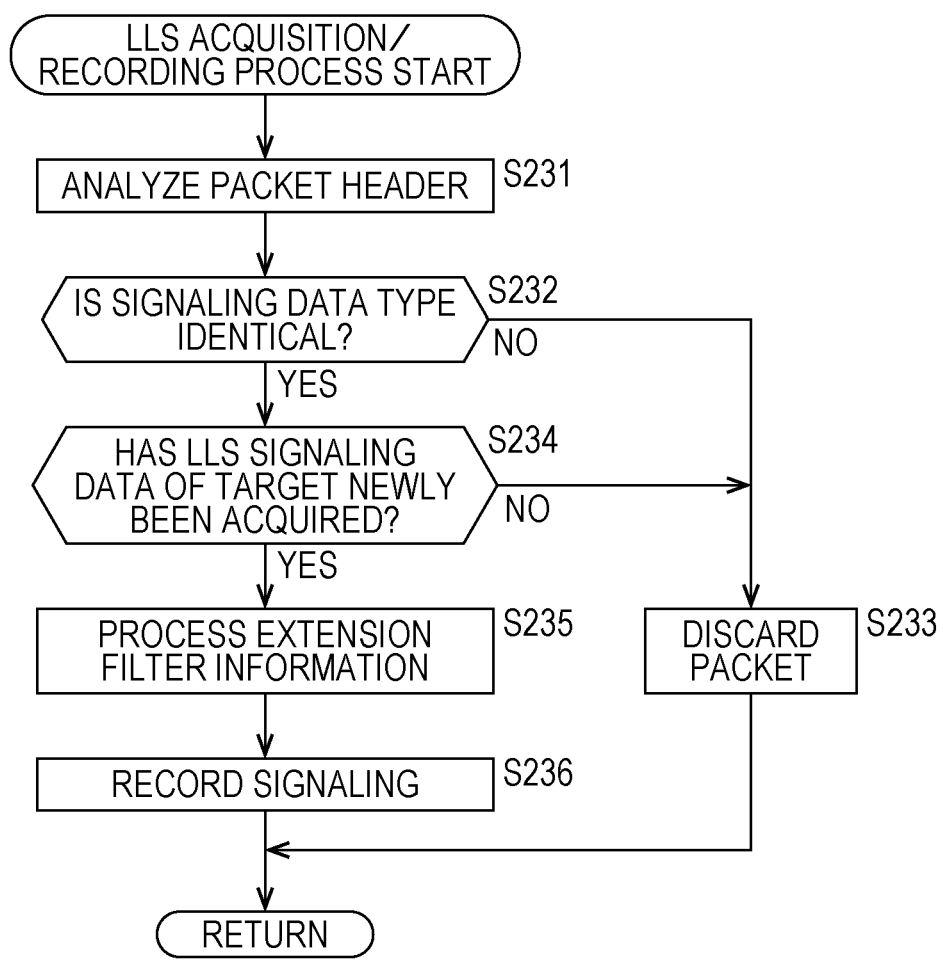
FIG. 24 is a flowchart for describing the flow of an LLS acquisition/recording process.

Next, the details of the LLS acquisition/recording process corresponding to the process of step S219 of FIG. 23 will be described with reference to a flowchart of FIG. 24.

In step S231, the packet header monitoring unit 256 constantly monitors the LLS packet transmitted through the BBP stream in the Demux 213, and analyzes the LLS header of the LLS packet of the monitoring target.

In step S232, the packet header monitoring unit 256 determines whether or not the type of the signaling data (the LLS metadata) is identical according to the analysis result of step S231. In other words, since the type information (Fragment Type) is arranged in the LLS header of the LLS packet, the packet header monitoring unit 256 determines whether or not the LLS packet including the LLS header in which the type information of, for example, Type="000000" is arranged has been extracted.

A value according to the type of the LLS metadata is designated in the type information (Fragment Type) of the LLS header. For example, "000000" is designated in the SCD, "000001" is designated in the EAD, "000010" is designated in the RRD, and "000011" is designated in the DCD.

In step S232, when the type of the signaling data (the LLS metadata) is determined to be different in step S232, the process proceeds to step S233. In step S233, the Demux 213 discards the extracted LLS packet. On the other hand, when the type of the signaling data (the LLS metadata) is determined to be identical in step S232, the process proceeds to step S234.

In step S234, the packet header monitoring unit 256 determines whether or not the LLS signaling data (the LLS metadata) of the target has newly been acquired according to the analysis result of step S231. In other words, since the version information is arranged in the LLS header of the LLS packet, the packet header monitoring unit 256 determines whether or not the LLS packet including the LLS header in which the version information of the latest version is arranged has been extracted.

When the LLS signaling data (the LLS metadata) of the target is determined to have been acquired in step S234, the process proceeds to step S233. In step S233, the Demux 213 discards the extracted LLS packet. On the other hand, when the LLS signaling data (the LLS metadata) of the target is determined to have newly been acquired in step S234, the process proceeds to step S235.

In step S235, the packet header monitoring unit 256 processes extension filter information (Filter Extension) according to the analysis result of step S231. In other words, since the extension type information is arranged in the LLS header of the LLS packet, in the processing of the extension filter information, for example, it is determined whether or not the LLS packet including the LLS header in which the extension filter information satisfying a predetermined specific condition such as a target region or a degree of emergency is arranged has been extracted.

The filtering control unit 252 controls the Demux 213 according to the control of the packet header monitoring unit 256 such that the filtering process of the LLS packet of the monitoring target is performed, and the LLS signaling data obtained from the LLS packet satisfying the specific condition among the LLS packets of the monitoring target is acquired by the LLS signaling acquiring unit 271.

In step S236, the signaling analyzing unit 254 records the LLS signaling data (the LLS metadata such as the SCD) acquired by the LLS signaling acquiring unit 271 in the NVRAM 215. As a result, the selection information obtained from the LLS signaling data (the LLS metadata such as the SCD) is recorded in the NVRAM 215. When the process of step S233 or step S236 ends, the process returns to step S219 of FIG. 23, and the process of step S219 and steps subsequent thereto is performed.

The flow of the LLS acquisition/recording process has been described above.

(Pre-Tuning Process)

Next, the flow of a pre-tuning process performed by the reception device 20 will be described with reference to a flowchart of FIG. 25.

In step S251, the tuning control unit 251 monitors the operation signal received from the input unit 216 or the like and is on standby until a service selection event occurs. Then, when the selection event is determined to have occurred in step S252, the process proceeds to step S253.

In step S253, the tuning control unit 251 acquires a service ID (a channel number) corresponding to the selected service. In step S254, the tuning control unit 251 determines whether or not the selection information (the SCD) has been recorded and acquired with reference to the NVRAM 215.

When the selection information is determined to have been acquired in step S254, the process proceeds to step S255. In step S255, the tuning control unit 251 reads and acquires the selection information (the SCD) recorded in the NVRAM 215.

On the other hand, when the selection information is determined to have not been acquired in step S254, the process proceeds to step S256. In step S256, the Demux 213 and the control unit 214 perform the same LLS acquisition/recording process of FIG. 24, and acquire the LLS signaling data (the LLS metadata such as the SCD) from the LLS stream. As a result, the control unit 214 acquires the selection information (the SCD) (S255).

In step S257, the tuner 212, the Demux 213, the control unit 214, or the like perform the tuning process based on the selection information acquired in the process of step S255. The details of the tuning process will be described later with reference to flowcharts of FIGS. 26 and 27.

The flow of the pre-tuning process has been described above.

(Tuning Process)

Next, the details of the tuning process corresponding to the process of step S257 of FIG. 25 will be described with reference to the flowchart of FIG. 26.

In step S271, the control unit 214 determines whether or not the reception device 20 can receive only a broadcast by checking whether or not the reception device 20 has a communication function. In step S271, for example, if the reception device 20 does not have the communication function such as the communication unit 217 and can receive only a broadcast, the process proceeds to step S272.

In step S272, the signaling analyzing unit 254 determines whether or not "TRUE" is designated as the basic service flag (an LSIDBaseService element) of the SC bootstrap information of the selected service with reference to the selection information (the SCD) recorded in the NVRAM 215.

When "TRUE" is determined to be designated as the basic service flag (the LSIDBaseService element) in step S272, the process proceeds to step S273. In step S273, the SCS signaling acquiring unit 272 acquires the LSID transmitted through the ROUTE session according to the result of the filtering process performed by the Demux 213. The LSID acquired in the process of step S273 is analyzed by the signaling analyzing unit 254, and the analysis result is supplied to the filtering control unit 252.

In step S274, the filtering control unit 252 controls the filtering process performed by the Demux 213 based on the analysis result (the IP address, the port number, the TSI, and the TOI) supplied from the signaling analyzing unit 254.

As a result, the Demux 213 performs the filtering process of the LCT packet, extracts the segment data from the LCT packet obtained as a result, and acquires (captures) the components configuring the selected service. Further, in step S275, it is determined whether or not all the components to be acquired have been captured, and the process of step S274 is repeated until all the components are captured, and thus, for example, the video data and the audio data configuring the selected service are acquired (captured).

Figure 25:
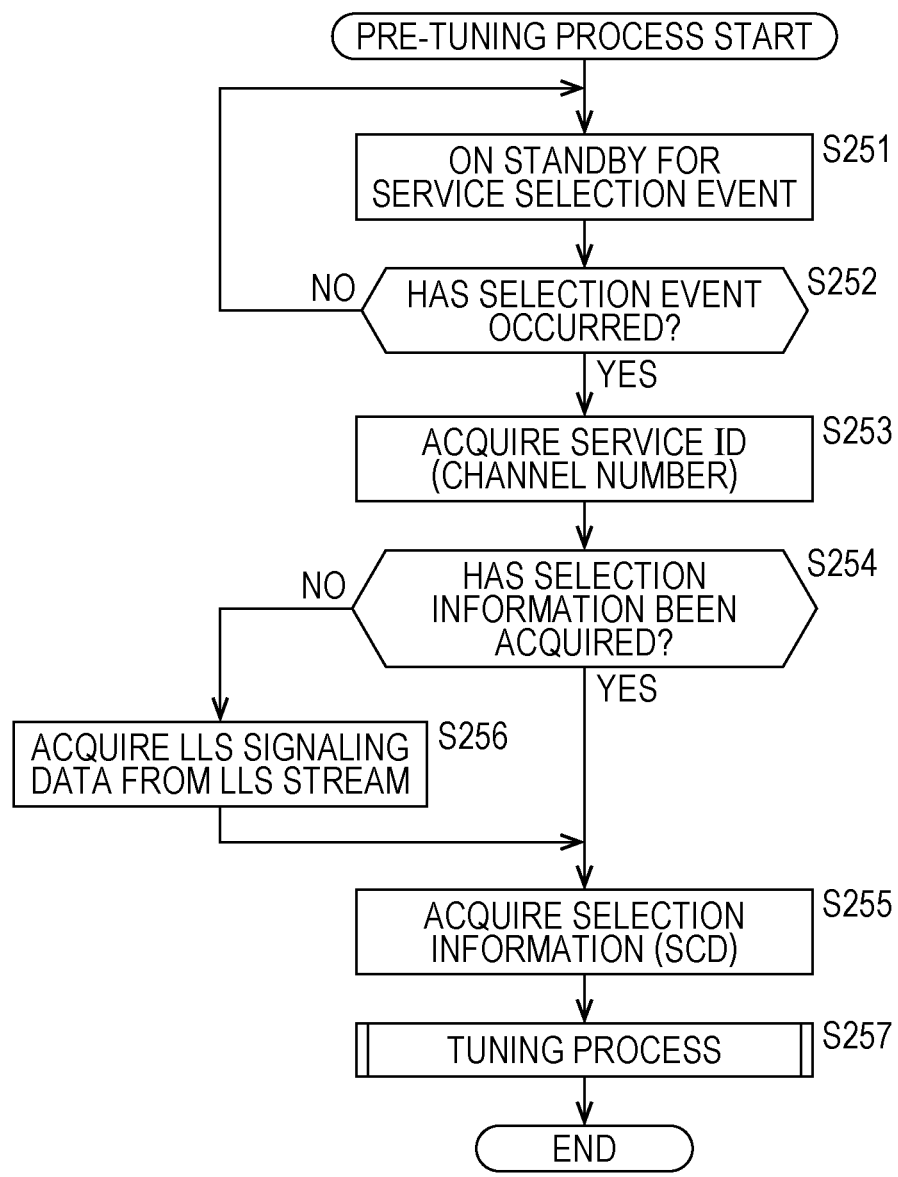
FIG. 25 is a flowchart for describing the flow of a pre-tuning process.

Then, for example, the video data and the audio data acquired in the process of step S274 are decoded, and the rendering process and the like are performed, and thus the video and the sound of the program corresponding to the service selected in the process of step S252 of FIG. 25 are reproduced, and the service starts to be viewed (S280).

As described above, when "TRUE" is designated as the basic service flag (the LSIDBaseService element) of the SC bootstrap information, it is possible to acquire a desired component using only the LSID even without reference to all the SCS metadata.

On the other hand, when "FALSE" is determined to be designated as the basic service flag (the LSIDBaseService element) in step S272, the process proceeds to step S276. In step S276, the SCS signaling acquiring unit 272 acquires the SCS signaling data such as the USBD, the MPD, and the SDP transmitted through the ROUTE session according to the result of the filtering process performed by the Demux 213. The SDP acquired in the process of step S276 is analyzed by the signaling analyzing unit 254, and the analysis result is supplied to the filtering control unit 252.

In step S277, the SCS signaling acquiring unit 272 acquires the LSID transmitted through the ROUTE session according to the result of the filtering process performed by the Demux 213. The LSID acquired in the process of step S277 is analyzed by the signaling analyzing unit 254, and the analysis result is supplied to the filtering control unit 252.

In step S278, the filtering control unit 252 controls the filtering process performed by the Demux 213 based on the analysis result (the IP address, the port number, the TSI, and the TOI) supplied from the signaling analyzing unit 254.

As a result, the Demux 213 performs the filtering process of the LCT packet, extracts the segment data from the LCT packet obtained as a result, and acquires (captures) the components configuring the selected service. Further, in step S279, it is determined whether or not all the components to be acquired have been captured, and the process of step S278 is repeated until all the components are captured, and thus, for example, the video data and the audio data configuring the selected service are acquired (captured).

Then, for example, the video data and the audio data acquired in the process of step S279 are decoded, and the rendering process and the like are performed, and thus the video and the sound of the program corresponding to the service selected in the process of step S252 of FIG. 25 are reproduced, and the service starts to be viewed (S280).

As described above, when "FALSE" is designated as the basic service flag (the LSIDBaseService element) of the SC bootstrap information, it is hard to specify the acquisition destination of the components based on only content described in the LSID, and thus a desired component is acquired with reference to other SCS metadata such as the USBD, the MPD, and the SDP in addition to the LSID. When the process of step S280 ends, the process returns to step S257 of FIG. 25, and the process of step S257 and steps subsequent thereto is performed.

When the reception device 20 is determined to support the hybrid of broadcasting and communication in step S271, the process proceeds to step S281. In step S281, the tuning process corresponding to the hybrid of broadcasting and communication is performed. The details of the tuning process corresponding to the hybrid will be described later with reference to the flowchart of FIG. 27.

The flow of the tuning process has been described above.

(Tuning Process Corresponding to Hybrid)

Next, the details of the tuning process corresponding to the hybrid corresponding to the process of step S281 of FIG. 26 will be described with reference to the flowchart of FIG. 27.

In step S291, the signaling analyzing unit 254 determines whether or not the SCS broadband location information (the SignalingOverInternet element) is described in the selected service with reference to the selection information (the SCD) recorded in the NVRAM 215.

Figure 26:
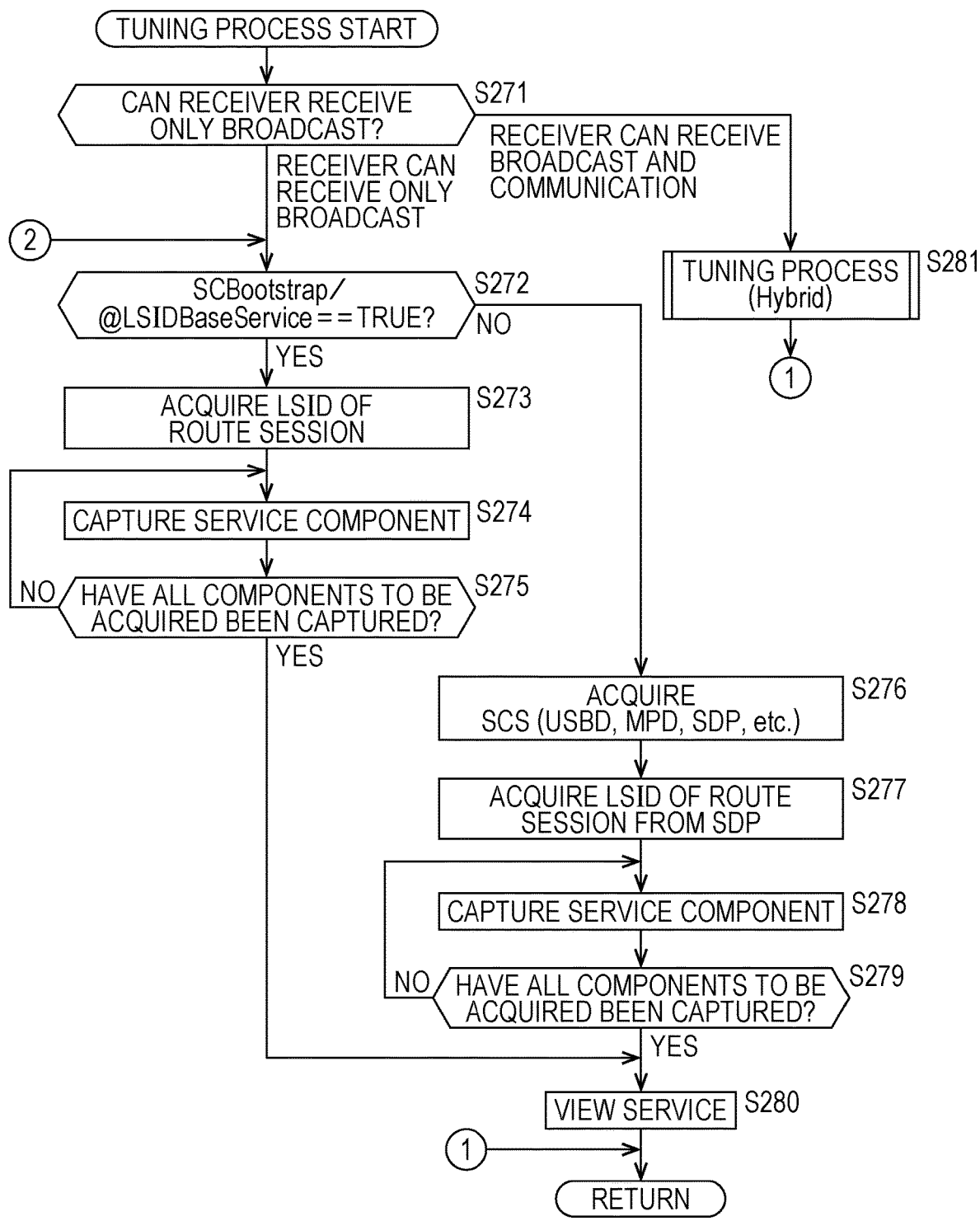
FIG. 26 is a flowchart for describing the details of a tuning process.
Figure 27:
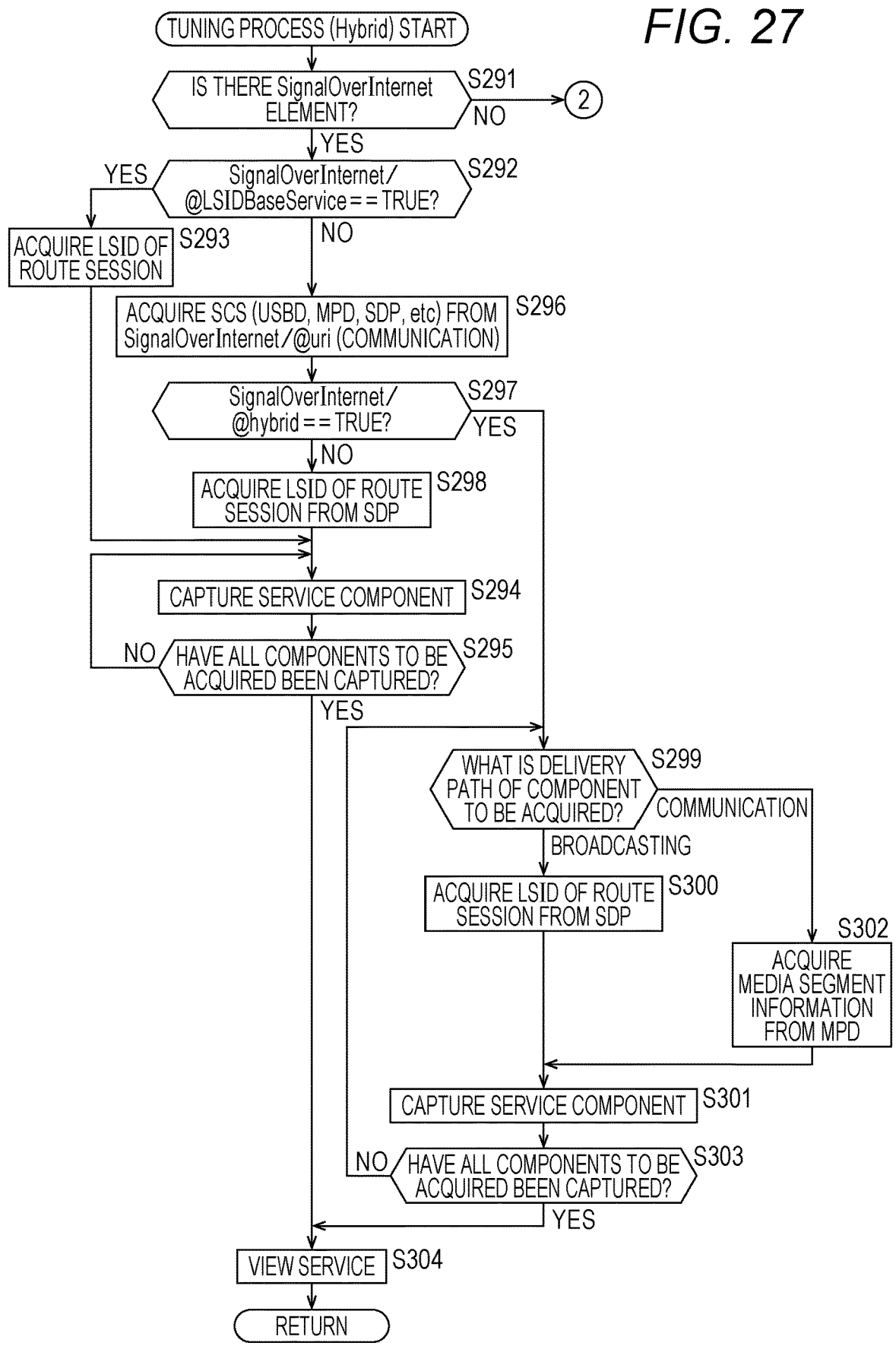
FIG. 27 is a flowchart for describing the details of a tuning process corresponding to a hybrid.

When the SCS broadband location information (the SignalingOverInternet element) is determined to be not described in the selected service in step S291, the process proceeds to step S272 of FIG. 26, and the process of step S272 and steps subsequent thereto is performed. In other words, in this case, since it means that the SCS signaling data is provided only through broadcasting, the SCS signaling data is acquired using the SC bootstrap information.

Further, when the SCS broadband location information (the SignalingOverInternet element) is determined to be described in the selected service in step S291, the process proceeds to step S292. In step S292, the signaling analyzing unit 254 determines whether or not "TRUE" is designated as the basic service flag (the LSIDBaseService element) of the SCS broadband location information (the SignalingOverInternet element).

When "TRUE" is determined to be designated as the basic service flag (the LSIDBaseService element) in step S292, the process proceeds to step S293. In step S293, the SCS signaling acquiring unit 272 acquires the LSID transmitted through the ROUTE session according to the result of the filtering process performed by the Demux 213. The LSID acquired in the process of step S293 is analyzed by the signaling analyzing unit 254, and the analysis result is supplied to the filtering control unit 252.

In step S294, the filtering control unit 252 controls the filtering process performed by the Demux 213 based on the analysis result (the IP address, the port number, the TSI, and the TOI) supplied from the signaling analyzing unit 254.

As a result, the Demux 213 performs the filtering process of the LCT packet, extracts the segment data from the LCT packet obtained as a result, and acquires (captures) the components configuring the selected service. Further, in step S295, it is determined whether or not all the components to be acquired have been captured, and the process of step S294 is repeated until all the components are captured, and thus, for example, the video data and the audio data configuring the selected service are acquired (captured).

Then, for example, the video data and the audio data acquired in the process of step S294 are decoded, and the rendering process and the like are performed, and thus the video and the sound of the program corresponding to the service selected in the process of step S252 of FIG. 25 are reproduced, and the service starts to be viewed (S304).

On the other hand, when "FALSE" is determined to be designated as the basic service flag (the LSIDBaseService element) in step S292, the process proceeds to step S296. In step S296, the communication control unit 255 controls the communication unit 217 according to the analysis result (the uri attribute of the SignalingOverInternet element) of the signaling analyzing unit 254 such that the broadband server 30 is accessed via the Internet 90, and the SCS signaling data such as the USBD, the MPD, and the SDP is acquired.

In step S297, the signaling analyzing unit 254 determines whether or not "TRUE" is designated as the hybrid flag (the hybrid attribute) of the SCS broadband location information (the SignalingOverInternet element).

When "FALSE" is determined to be designated as the hybrid flag (the hybrid attribute) in step S297, the process proceeds to step S298. In this case, the SDP acquired in the process of step S296 is analyzed by the signaling analyzing unit 254, and the analysis result is supplied to the filtering control unit 252.

Then, in step S298, the SCS signaling acquiring unit 272 acquires the LSID transmitted through the ROUTE session according to the result of the filtering process performed by the Demux 213. The LSID acquired in the process of step S298 is analyzed by the signaling analyzing unit 254, and the analysis result is supplied to the filtering control unit 252. When the process of step S298 ends, the process proceeds to step S294.

In step S294, the filtering control unit 252 controls the filtering process performed by the Demux 213 based on the analysis result (the IP address, the port number, the TSI, and the TOI) supplied from the signaling analyzing unit 254.

As a result, the Demux 213 performs the filtering process of the LCT packet, extracts the segment data from the LCT packet obtained as a result, and acquires (captures) the components configuring the selected service. Further, in step S295, it is determined whether or not all the components to be acquired have been captured, and the process of step S294 is repeated until all the components are captured, and thus, for example, the video data and the audio data configuring the selected service are acquired (captured).

Then, for example, the video data and the audio data acquired in the process of step S294 are decoded, and the rendering process and the like are performed, and thus the video and the sound of the program corresponding to the service selected in the process of step S252 of FIG. 25 are reproduced, and the service starts to be viewed (S304).

Further, when "TRUE" is determined to be designated as the hybrid flag (the hybrid attribute) in step S297, the process proceeds to step S299. In step S299, the signaling analyzing unit 254 analyzes, for example, the USBD and the MPD acquired in process of step S296 and determines whether or not the delivery path of the component to be acquired is by way of broadcasting or communication.

When the delivery path of the component is determined to be by way of broadcasting in step S299, the process proceeds to step S300. In this case, the SDP acquired in the process of step S296 is analyzed by the signaling analyzing unit 254, and the analysis result is supplied to the filtering control unit 252.

Then, in step S300, the signaling acquiring unit 253 acquires the LSID transmitted through the ROUTE session according to the result of the filtering process performed by the Demux 213. The LSID acquired in the process of S300 is analyzed by the signaling analyzing unit 254, and the analysis result is supplied to the filtering control unit 252.

In step S301, the filtering control unit 252 controls the filtering process performed by the Demux 213 based on the analysis result (the IP address, the port number, the TSI, and the TOI) supplied from the signaling analyzing unit 254. As a result, the Demux 213 performs the filtering process of the LCT packet, extracts the segment data from the LCT packet obtained as a result, and acquires (captures) the components configuring the selected service.

On the other hand, when the delivery path of the component is determined to be by way of communication in step S299, the process proceeds to step S302. In step S302, the signaling analyzing unit 254 analyzes the MPD acquired in the process of step S296, and supplies media segment information (a segment URL) obtained as a result of the analysis to the communication control unit 255. As a result, the communication control unit 255 acquires the media segment information (the segment URL) from the signaling analyzing unit 254.

Then, in step S301, the communication control unit 255 controls the communication unit 217 according to the media segment information (the segment URL) received from the signaling analyzing unit 254 such that the broadband server 30 is accessed via the Internet 90, and the components configuring the selected service are acquired (captured).

When the process of step S301 ends, the process proceeds to step S303. In step S303, it is determined whether or not all the components to be acquired have been captured. When all the components are determined to have not been captured in step S303, the process returns to step S299, and the process of step S299 and steps subsequent thereto is repeated.

In other words, as the process of steps S299 to S303 is repeated, the components are acquired by way of broadcasting or communication, and when all the components are determined to have been captured in step S303, the process proceeds to step S304. In step S304, for example, the video data and the audio data acquired in the process of step S300 or S302 are decoded, and the rendering process and the like are performed, and thus the video and the sound of the program corresponding to the service selected in the process of step S252 of FIG. 25 are reproduced, and the service starts to be viewed (S304).

When the process of step S304 ends, the process returns to step S281 of FIG. 26, and the process of step S281 and steps subsequent thereto is performed.

The flow of the tuning process corresponding to the hybrid has been described above.

5. Examples of Syntaxes (1) LLS Signaling Data
(Structure of LLS Packet)
FIG. 28 is a diagram illustrating a structure of the LLS packet.

Figure 28:
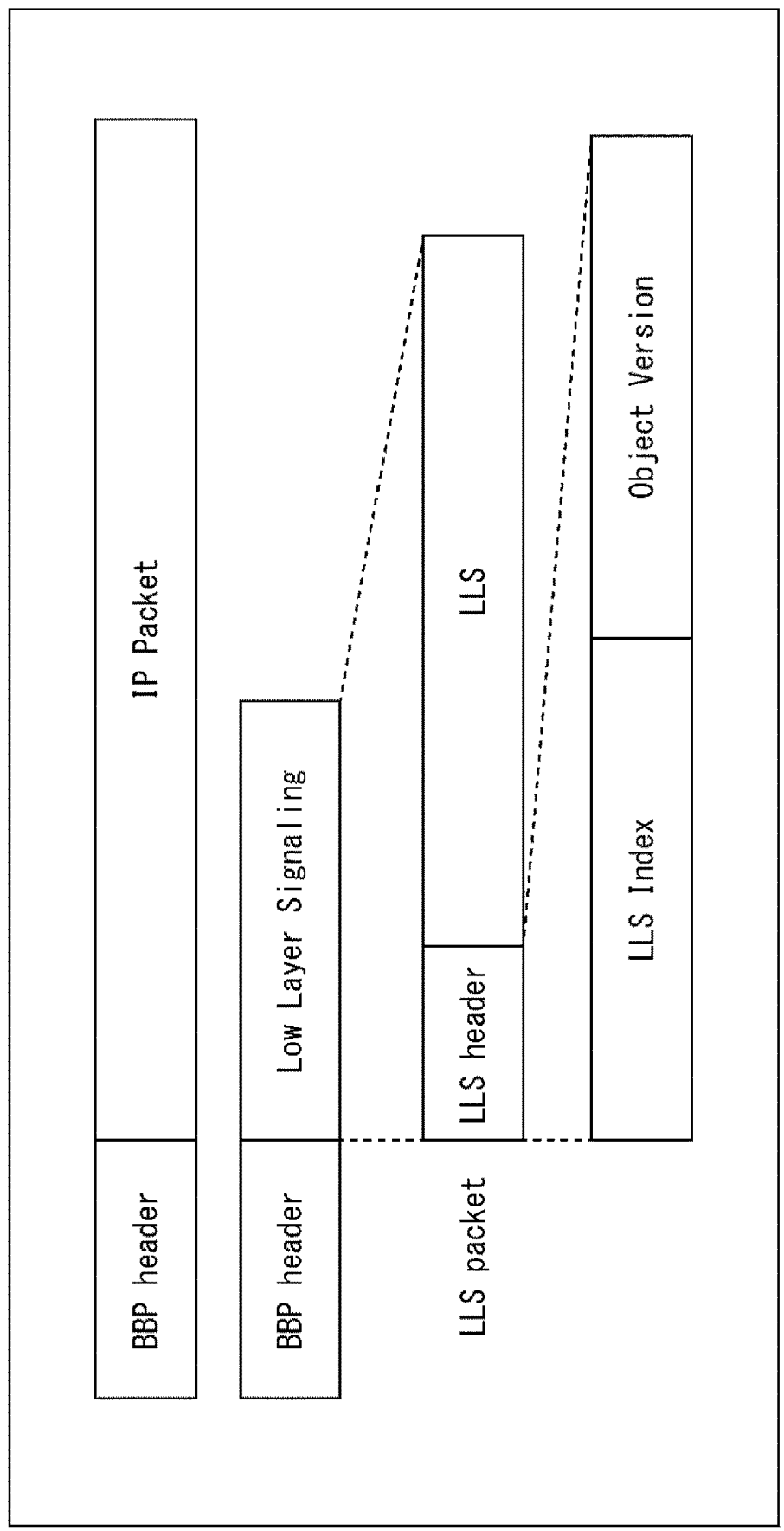
FIG. 28 is a diagram illustrating a structure of an LLS packet.

A BBP packet is configured with a BBP header and a payload as illustrated in FIG. 28. When the IP packet is transmitted through the BBP stream, the portion of the payload is the IP packet. When the LLS signaling data is transmitted through the BBP stream, the LLS signaling data is arranged next to the BBP header. For example, the LLS metadata such as the SCD described in the XML format is arranged as the LLS signaling data.

2-bit type information is included in the BBP header, and it is possible to distinguish whether the BBP packet is the IP packet or the LLS based on the type information. The LLS header is configured with an LLS index and an object version information (version information).

Figure 29:
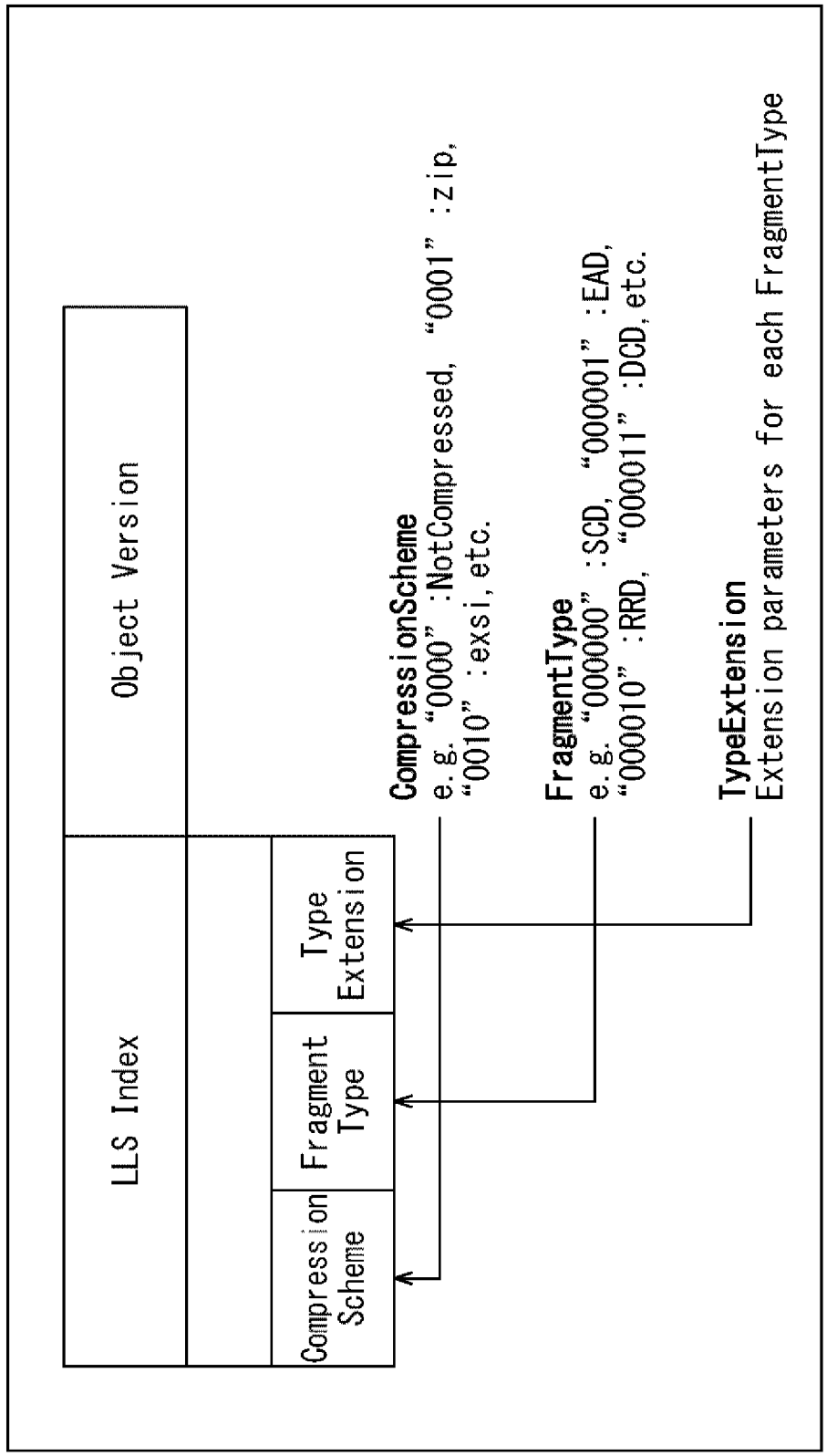
FIG. 29 is a diagram illustrating an example of an LLS index of an LLS header.

FIG. 29 is a diagram illustrating an example of the LLS index of the LLS header.

Compression information (Compression Scheme), type information (Fragment Type), and extension type information (Type Extension) are arranged in the LLS index. Information indicating the presence or absence of compression of target LLS signaling data is designated in the compression information. For example, when "0000" is designated, it indicates non compression, and when "0001" is designated, it indicates compression of a zip format.

Information indicating the type of the LLS signaling data is designated in the type information (Fragment Type). For example, "000000" is designated in the SCD, "000001" is designated in the EAD, "000010" is designated in the RRD, and "000011" is designated in the DCD. An extension parameter can be designated in the extension type information for each type.

(Syntax of SCD)
FIG. 30 is a diagram illustrating a syntax of an SCD of the XML format. In FIG. 30, among elements and attributes, "@" is attached to attributes. Further, indented elements and attributes are those designated in upper-level elements. This relation is the same in other syntaxes which will be described later.

An SCD element serving as the root element is an upper-level element of a majorProtocolversion attribute, a minorProtocolversion attribute, an RFAllocationId attribute, a name attribute, a Tuning RF element, and a BBPStream element as illustrated in FIG. 30.

Version information of a protocol is designated in the majorProtocolversion attribute and the minorProtocolversion attribute. An RF allocation ID of a broadcasting station of a physical channel unit is designated in the RFAllocationId attribute. A name of a broadcasting station of a physical channel unit is designated in the name attribute.

Information related to tuning is designated in the Tuning_RF element. The Tuning_RF element is an upper-level element of a frequency attribute and a Preamble attribute. A frequency when a predetermined band is selected is designated in the frequency attribute. Control information of a physical layer is designated in the Preamble attribute.

Information related to one or more BBP streams is designated in the BBPStream element. The BBPStream element is an upper-level element of a bbpStreamId attribute, a payloadType attribute, a name attribute, an ESGBootstrap element, a ClockReferenceInformation element, and a Service element.

The BBP stream ID is designated in the bbpStreamId attribute. When a plurality of BBP streams are arranged, the BBP streams are identified by the BBP stream IDs. The payload type of the BBP stream is designated in the payloadType attribute. For example, "ipv4," "ipv6," or the like is designated as the payload type. "ipv4" indicates Internet Protocol version 4 (IPv4). "ipv6" indicates Internet Protocol Version 6 (IPv6). A name of the BBP stream is designated in the name attribute.

The ESG bootstrap information is designated in the ESGBootstrap element. It is possible to access the ESG based on the ESG bootstrap information. The ESGBootstrap element is an upper-level element of an ESGProvider element. Information related to the ESG is designated in the ESGProvider element for each provider of the ESG. The ESGProvider element is an upper-level element of a providerName attribute, an ESGBroadcastLocation element, and an ESGBroadbandLocation element.

A name of the provider of the ESG is designated in the providerName attribute. The ESGBroadcastLocation element designates the ESG service through the RF allocation ID, the BBP stream ID, and the service ID (the triplet) designated by the RFAllocationId attribute, the BBPStreamId attribute, and the ESGServiceId attribute when the ESG is transmitted by way of broadcasting. The ESGBroadbandLocation element designates a URI for accessing a file of the ESG through the ESGUri attribute when the ESG is transmitted by way of communication.

Information related to time information (for example, the NTP) is designated in the ClockReferenceInformation element. The ClockReferenceInformation element is an upper-level element of a sourceIPAddress attribute, a destinationIPAddress attribute, and a portNum attribute. IP addresses of a transmission source (source) that transmits the time information and a destination (destination) are designated in the sourceIPAddress attribute and the destinationIPAddress attribute. A port number that transmits the time information is designated in the portNum attribute.

Information related to one or more services is designated in the Service element. The Service element is an upper-level element of a serviceId attribute, a globalUniqueServiceId attribute, a serviceType attribute, a hidden attribute, a hiddenGuide attribute, a shortName attribute, a longName attribute, an accesControl attribute, a SourceOrigin element, an SCBootstrap element, a SignalingOverInternet element, and an AssociationService element.

The service ID is designated in the serviceId attribute. When a plurality of services are arranged, the services are identified by the service IDs. The global unique service ID is designated in the globalUniqueServiceId attribute. For example, the ESG-selected service may be linked with the USBD by the global unique service ID.

The type information of the service is designated in the serviceType attribute. For example, "continued" or "scripted" is designated as the type information. "continued" indicates a service of a video or an audio, and "scripted" indicates a non-real time (NRT) service.

Information indicating whether or not a service identified by the service ID is a hidden service is designated in the hidden attribute and the hiddenGuide attribute. For example, when "on" is designated as values of the attributes, the service is not displayed. Further, when "off" is designated as the values of the attributes, the service is displayed. For example, when "on" is designated as the hidden attribute, the service is set to be not selected by an operation of a remote controller. Further, for example, when "on" is designated as the hiddenGuide attribute, the service is not displayed in the ESG.

A name of the service identified by the service ID is designated in the shortName attribute and the longName attribute. In the shortName attribute, for example, a name of a name of a service has to be designated within 7 characters. Information indicating whether or not the service identified by the service ID is encrypted is designated in the accesControl attribute. For example, when "on" is designated as the accesControl attribute, it indicates that the service is encrypted, and when "off" is designated as the accesControl attribute, it indicates that the service is not encrypted.

Information identifying a service is designated in the SourceOrigin element. The SourceOrigin element is an upper-level element of a country attribute, an originalRFAllocationId attribute, a bbpStreamId attribute, and a serviceId attribute. A country code is designated in the country attribute. An original RF allocation ID is designated in the originalRFAllocationId attribute. The original RF allocation ID is an ID identifying a broadcasting network, and the same value is used even when retransmission of the service is performed. The BBP stream ID is designated in the bbpStreamId attribute. The service ID is designated in the serviceId attribute. In other words, a unique ID may be allocated to each service based on the country code, the original RF allocation ID, the BBP stream ID, and the service ID.

The SC bootstrap information is designated in the SCBootstrap element. Based on the SC bootstrap information, it is possible to access the service channel and acquire the SCS signaling data. The SCBootstrap element is an upper-level element of an LSIDBaseService attribute, a hybrid attribute, a sourceIPAddress attribute, a destinationIPAddress attribute, a portNum attribute, and a tsi attribute.

Information that corresponds to the basic service flag and indicates whether or not it is possible to acquire the streams of the components configuring the service based on only the LSID is designated in the LSIDBaseService attribute. Further, information that corresponds to the hybrid flag and indicates whether or not there is a stream of a component delivered by way of communication is designated in the hybrid attribute.

IP addresses of a transmission source (source) that transmits a service and a destination (destination) are designated in the sourceIPAddress attribute and the destinationIPAddress attribute. A port number that transmits an SCS is designated in the portNum attribute. The TSI in the ROUTE session that transmits the SCS is designated in the tsi attribute.

The SCS broadband location information is designated in the SignalingOverInternet element. Information related to the SCS signaling data transmitted by way of communication is designated by the SCS broadband location information. The SignalingOverInternet element is an upper-level element of an LSIDBaseService attribute, a hybrid attribute, and a uri attribute.

Information that corresponds to the basic service flag and indicates whether or not it is possible to acquire the streams of the components configuring the service based on only the LSID is designated in the LSIDBaseService attribute. Further, information that corresponds to the hybrid flag and indicates whether or not there is a stream of a component delivered by way of communication is designated in the hybrid attribute. A URI indicating an acquisition destination of the SCS signaling data is designated in the uri attribute.

Information related to a relevant dependent service is designated in the AssociationService element. The AssociationService element is an upper-level element of an RFAllocationId attribute, a bbpStreamId attribute, and a serviceId attribute. The relevant dependent service is designated by the RF allocation ID, the BBP stream ID, and the service ID (the triplet) designated by the RFAllocationId attribute, the bbpStreamId attribute, and the serviceId attribute.

When "1" is designated as the number of appearances (Cardinality), one element or one attribute is necessarily designated, and when "0 . . . 1" is designated as the number of appearances (Cardinality), it is arbitrary whether or not a corresponding element or a corresponding attribute is designated. Further, when "1 . . . n" is designated, one or more elements or attributes are designated, and when "0 . . . n" is designated, it is arbitrary whether or not one or more elements or attributes are designated. The meaning of the number of appearances is the same in other syntaxes which will be described later.

(Syntax of EAD)

FIG. 31 is a diagram illustrating a syntax of an EAD of the XML format.

An EAD element serving as the root element is an upper-level element of an AutomaticTuningService element and an EAMessage element as illustrated in FIG. 31. The AutomaticTuningService element is to designate an automatic tuning service at the time of waking-up. The AutomaticTuningService element is an upper-level element of an RFAllocationId attribute, a bbpStreamId attribute, and a serviceId attribute.

A network ID of the automatic tuning service is designated in the RFAllocationId attribute. A BBP stream ID of the automatic tuning service is designated in the BBPStreamId attribute. The service ID of the automatic tuning service is designated in the serviceId attribute. In other words, when the AutomaticTuningService element appears, a service designated by the triplet indicated by the attributes is selected. Among the triplet, the RFAllocationId attribute and the BBPStreamId attribute are not essential, and, for example, when the same BBP stream as the EAD is designated, it is desirable to designate only the serviceId attribute.

A message of the emergency alert information (emergency information) is designated in the EAMessage element. The EAMessage element is an upper-level element of an eaMessageId attribute, an eaPriority attribute, an EAMessageData element, an EAApplication element, an EAService element, and an EAWww element.

An ID of the emergency alert information (emergency information) is designated in the eaMessageId attribute. A priority of the emergency alert information (emergency information) is designated in the eaPriority attribute. Subtitle information of the emergency alert information (emergency information) is designated in the EAMessageData element.

Information related to an emergency alert application is designated in the EAApplication element. The EAApplication element is an upper-level element of an applicationId attribute. An application ID is designated in the applicationId attribute.

Information related to an emergency alert NRT service is designated in the EAService element. The EAService element is an upper-level element of a serviceId attribute and a serviceType attribute. The service ID is designated in the serviceId attribute. Service type information is designated in the serviceType attribute. For example, "nrt" is designated as the service type information. "nrt" indicates an NRT service.

Information related to an emergency information site is designated in the EAWww element. The EAWww element is an upper-level element of a uri attribute. A URI of the emergency information site is designated in the uri attribute.

(Display Example of Emergency Alert Information)

Figure 32:
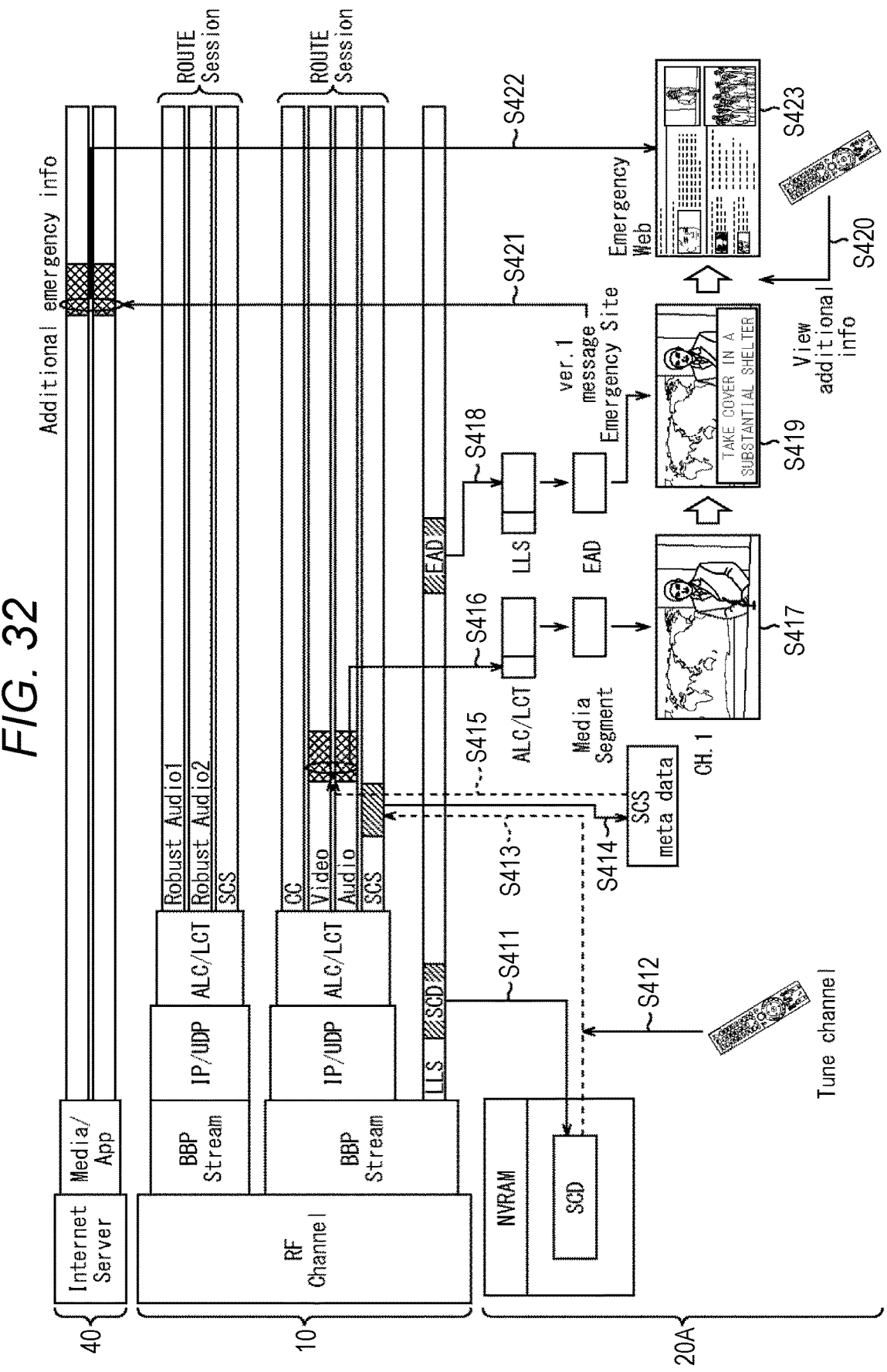
FIG. 32 is a diagram illustrating a display example of emergency alert information based on an EAD.

FIG. 32 is a diagram illustrating a display example of the emergency alert information based on the EAD. In FIG. 32, an upper portion indicates the flow of data transmitted from the transmission device 10 and the Internet server 40, and a lower portion indicates the flow of a process of processing the data in the reception device 20A. In FIG. 32, a time direction is a direction from the left to the right.

In FIG. 32, the transmission device 10 transmits the broadcast wave (RF Channel) of the digital broadcasting using the IP transmission scheme. In the broadcast wave, the components configuring the service (for example, the program), the SCS signaling data, and the LLS signaling data are transmitted through one BBP stream (hereinafter, referred to as a "BBP stream 1"). The streams of the two robust audios and the SCS are transmitted through the other BBP stream (hereinafter, referred to as a "BBP stream 2").

The Internet server 40 provides the emergency information site, and delivers detailed emergency alert information via the Internet 90.

As illustrated in FIG. 32, in the reception device 20A serving as the fixed receiver, the SCD transmitted through the LLS stream of the BBP stream 1 is acquired through the initial scan process or the like and recorded in the NVRAM (S411). In addition to the frequency serving as the physical parameter and the triplet, the SC bootstrap information is described in the SCD for each service.

When the user selects a service (S412), the reception device 20A reads the SC bootstrap information of the service from the NVRAM, and accesses the SCS stream of the BBP stream 1 transmitted from the transmission device 10 through the broadcast wave according to the SC bootstrap information (S413). As a result, the reception device 20A can acquire the SCS signaling data transmitted through the ROUTE session 1 (S414).

The reception device 20A accesses the streams of the videos and the audios of the BBP stream 1 transmitted from the transmission device 10 through the broadcast wave according to the SCS signaling data acquired in the process of step S414 (S415). As a result, the reception device 20A can acquire the video data and the audio data transmitted through the ROUTE session 1 (S416). Then, the reception device 20A performs the buffering process by temporarily storing the video data and the audio data acquired from the ROUTE session 1 in the buffer, and further performs the rendering process to reproduce the video and the sound of the program corresponding to the selected service (S417).

Thereafter, when the EAD transmitted through the LLS stream of the BBP stream 1 is acquired (S418), the reception device 20A causes (the subtitle information of) the emergency alert information corresponding to (the EAMessageData element of the EAMessage element of) the EAD to be superimposedly displayed on the video of the program being reproduced (S419).

Further, when the user gives an instruction to display the detailed emergency alert information (S420), the reception device 20A accesses the Internet server 40 via the Internet 90 according to the URI of the emergency information site designated in (the uri attribute of the EAWww element of the EAMessage element of) the EAD (S421), and acquires the detailed emergency alert information (S422). As a result, the detailed emergency alert information acquired from the emergency information site is displayed on the reception device 20A (S423).

(Syntax of RRD)

FIG. 33 is a diagram illustrating a syntax of an RRD of the XML format.

As illustrated in FIG. 33, an RRD element serving as the root element is an upper-level element of a RatingRegionName element, a RatingRegion element, a TableVersion element, and a Dimension element. A name of a rating region is designated in the RatingRegionName element. A code of a rating region is designated in the RatingRegion element. For example, "us," "canada," "mexico," or the like is designated as the code. The version information of the RRD is designated in the TableVersion element.

The Dimension element is an upper-level element of a RatingDimensionName element, a RatingDimension element, a GraduatedScale element, and a DimensionValue element. A name of a rating dimension is designated in the RatingDimensionName element. A code of a rating dimension is designated in the RatingDimension element. A scale is designated in the GraduatedScale element.

A value of a dimension is designated in the DimensionValue element. The DimensionValue element is an upper-level element of a RatingValueText element, an AbbrevValueText element, a RatingValue element, and a RatingTag element. For example, rating information such as an age limit classification method is designated based on the attributes.

(Syntax of DCD)

FIG. 34 is a diagram illustrating an example of a syntax of a DCD of the XML format.

In FIG. 34, a DCD element serving as the root element is an upper-level element of a Service element. The Service element is an upper-level element of a serviceID attribute, a serviceStatus attribute, a video element, and an audio element. A service ID is designated in the serviceID attribute. Information related to a status of the service identified by the service ID is designated in the serviceStatus attribute.

Information for accessing a stream of a video serving as a minimal service is designated in the video element. The video element is an upper-level element of a mime_type attribute, a port number attribute, and a TSI attribute. A MIME type is designated in the mime_type attribute. A port number is designated in the port number attribute. A TSI is designated in the TSI attribute.

Information accessing a stream of an audio serving as a minimal service is designated in the audio element. The audio element is an upper-level element of a mime_type attribute, a port number attribute, and a TSI attribute. A MIME type is designated in the mime_type attribute. A port number is designated in the port_number attribute. A TSI is designated in the TSI attribute.

The syntaxes of the SCD, the EAD, the RRD, and the DCD described above with reference to FIGS. 30 to 34 are examples, and other syntaxes may be employed.

(2) SCS Signaling Data (Structure of LCT Packet)

Figure 35:
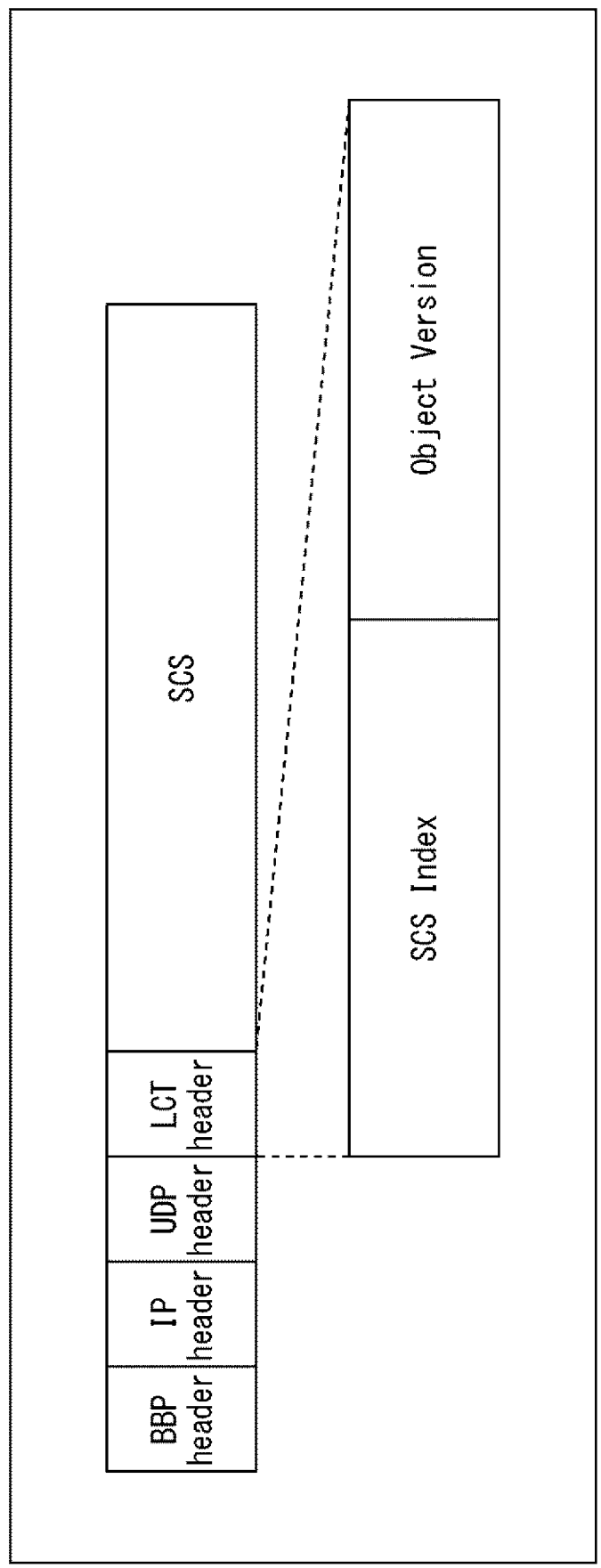
FIG. 35 is a diagram illustrating a structure of an LCT packet.

FIG. 35 is a diagram illustrating a structure of the LCT packet.

As illustrated in FIG. 35, when the LCT packet is transmitted through the BBP stream, a payload is added to each of BBP, IP, UDP, and LCT headers. When the SCS signaling data is transmitted through the ROUTE session, the SCS signaling data is arranged in the payload arranged next to the LCT header. For example, the SCS metadata such as the USBD and the LSID of the XML format is arranged as the SCS signaling data.

The LCT header is configured with an SCS index (Signaling Index) and object version information (version information).

Figure 36:
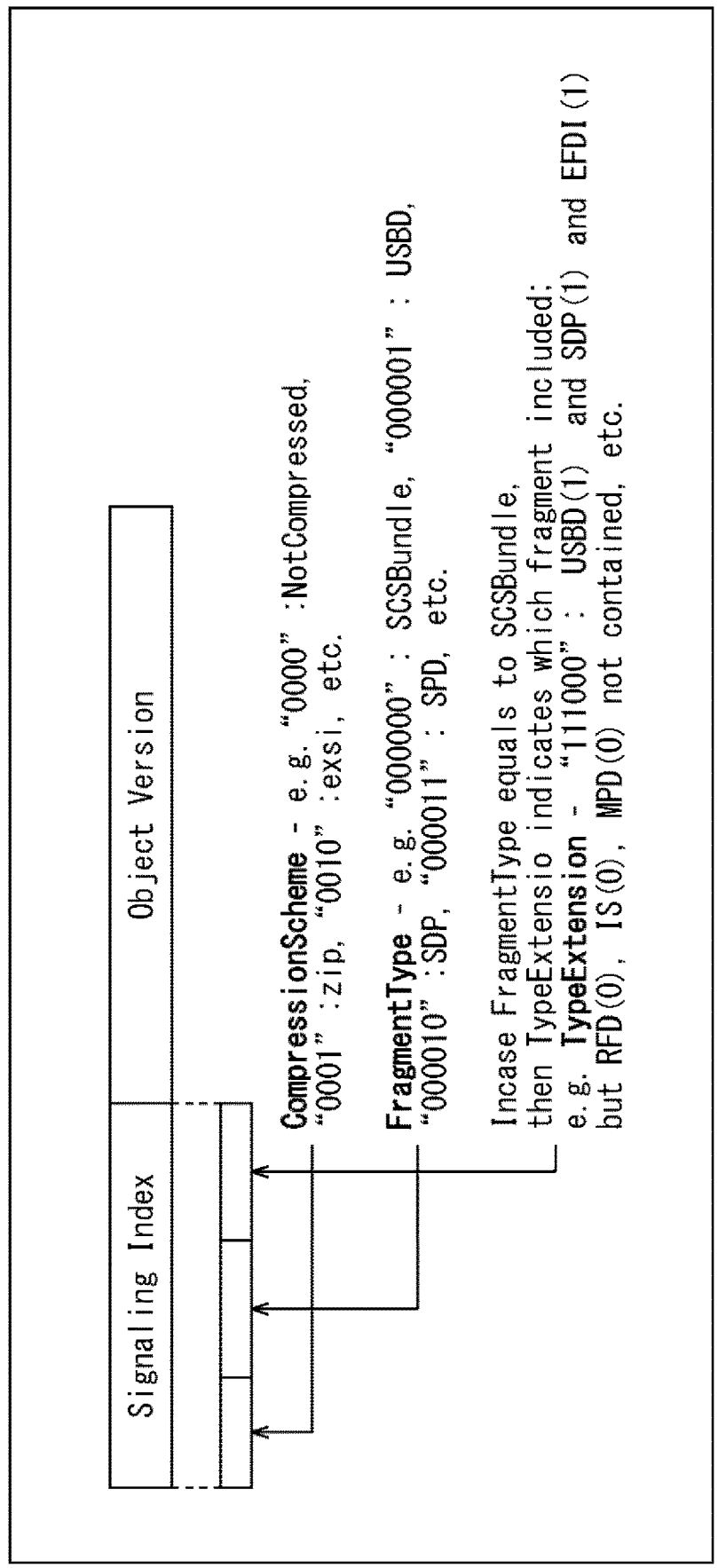
FIG. 36 is a diagram illustrating an example of an SCS index of an LCT header.

FIG. 36 is a diagram illustrating an example of the SCS index of the LCT header.

Compression information (Compression Scheme), type information (Fragment Type), and extension type information (Type Extension) are arranged in the SCS index (Signaling Index). Information indicating the presence or absence of compression of target SCS signaling data is designated in the compression information. For example, when "0000" is designated, it indicates non compression, and when "0001" is designated, it indicates compression of a zip format.

Information indicating the type of the SCS signaling data is designated in the type information (Fragment Type). For example, "000000" is designated in an SCS bundle, "000001" is designated in the USBD, "000010" is designated in the SDP, and "000011" is designated in the SPD. An extension parameter can be designated in the extension type information for each type.

(Syntax of LSID)

FIG. 37 is a diagram illustrating an example of a syntax of an LSID of the XML format.

As illustrated in FIG. 37, the LSID element serving as the root element is an upper-level element of a version attribute, a validFrom attribute, an expiration attribute, and a TransportSession element. The version information of the LSID is designated in the version attribute. A start date and time of an expiration period of the LSID is designated in the validFrom attribute. An expiration date and time of the LSID is designated in the expiration attribute.

Session information of an LCT transport is designated in the TransportSession element. The TransportSession element is an upper-level element of a tsi attribute, a SourceFlow element, and a RepairFlow element. A TSI is designated in the tsi attribute. Source flow information is designated in the SourceFlow element. A detailed configuration of the SourceFlow element will be described later with reference to FIG. 38. Repair flow information is designated in the RepairFlow element. A detailed configuration of the RepairFlow element will be described later with reference to FIG. 40.

(Syntax of SourceFlow Element)

FIG. 38 is a diagram illustrating an example of a syntax of the SourceFlow element of FIG. 37.

The source flow information is designated in the SourceFlow element. As illustrated in FIG. 38, the SourceFlow element serving as the root element is an upper-level element of an EFDT element, an idRef attribute, a realtime attribute, a minBufferSize attribute, an ApplicationIdentifier element, and a PayloadFormat element.

The EFDT element is an abbreviation of an Extended FDT, and information related to an extended FDT is designated therein. A detailed configuration of the EFDT element will be described later with reference to FIG. 39. An EFDT ID is designated in the idRef attribute.

"TRUE" or "FALSE" is designated in the realtime attribute, and when "TRUE" is designated, an NTP time stamp is included in an LCT extension header. A default value of the realtime attribute is set to "FALSE." A minimum buffer size required in the reception device 20 is designated in the minBufferSize attribute. An ID mapped with an application is designated in the ApplicationIdentifier element.

Payload format of the source flow information is designated in the PayloadFormat element. The PayloadFormat element is an upper-level element of a codePoint attribute, a deliveryObjectFormat attribute, a fragmentation attribute, a deliveryOrder attribute, a sourceFECPayloadID attribute, and an FECParameters element.

A code point value is designated in the codePoint attribute. A default value of the code point value is set to "0." A payload format is designated in the deliveryObjectFormat attribute. Information related to fragmentation is designated in the fragmentation attribute. Information related to delivery order is designated in the deliveryOrder attribute. A payload ID of a source FEC is designated in the sourceFECPayloadID attribute. An FEC parameter is designated in the FECParameters element.

(Syntax of EFDT Element)

FIG. 39 is a diagram illustrating an example of a syntax of the EFDT element of FIG. 38.

Information related to an extended FDT is designated in the EFDT element. As illustrated in FIG. 39, the EFDT element serving as the root element is an upper-level element of a route:idRef attribute, a route:version attribute, a route:maxExpiresDelta attribute, a route:maxTransportSize attribute, and a FileTemplate element.

An EFDT ID is designated in the route:idRef attribute. The version information of the EFDT is designated in the route:version attribute. A period of time until an expiration after transmission of an object is designated in the route:maxExpiresDelta attribute. A maximum transport size is designated in the route:maxTransportSize attribute. Information related to a file template is designated in the FileTemplate element.

(Syntax of RepairFlow Element)

FIG. 40 is a diagram illustrating an example of a syntax of the RepairFlow element of FIG. 37.

The repair flow information is designated in the RepairFlow element. As illustrated in FIG. 40, the RepairFlow element serving as the root element is an upper-level element of an FECParameters element in which an FEC parameter is designated. The FECParameters element is an upper-level element of a fecEncodingId attribute, a maximumDelay attribute, an overhead attribute, a minBufferSize attribute, an FECOTI element, and a ProtectedObject element.

An ID of an FEC scheme is designated in the fecEncodingId attribute. A maximum delay time of the source flow information and the repair flow information is designated in the maximumDelay attribute. An overhead value is designated in the overhead attribute. A minimum buffer size required in the reception device 20 is designated in the minBufferSize attribute. Transmission information of an FEC object is designated in the FECOTI element. Information related to the source flow information to be protected is designated in the ProtectedObject element. A detailed configuration of the ProtectedObject element will be described later with reference to FIG. 41.

(Syntax of ProtectedObject Element)

FIG. 41 is a diagram illustrating an example of a syntax of the ProtectedObject element of FIG. 40.

Information related to the source flow information to be protected is designated in the ProtectedObject element. As illustrated in FIG. 41, the ProtectedObject element serving as the root element is an upper-level element of a sessionDescription attribute, a tsi attribute, a sourceTOI attribute, and a fecTransportObjectSize attribute.

Session information of the source flow information is designated in the sessionDescription attribute. A TSI of the source flow information is designated in the tsi attribute. A TOI of a delivery object identical to the TOI of the repair flow information is designated in the sourceTOI attribute. A default size of an FEC transport object is designated in the fecTransportObjectSize attribute.

(Syntax of SPD)

FIG. 42 is a diagram illustrating an example of a syntax of an SPD of the XML format.

As illustrated in FIG. 42, the SPD element serving as the root element is an upper-level element of a serviceId attribute, a spindicator attribute, an AlternativeService element, a HybridSignalLocationDescription element, a ContentAdvisoryDescription element, and an NRTServiceDescription element.

A service ID is designated in the serviceId attribute. It is designated in the spindicator attribute whether or not each service identified by the service ID has been encrypted. When "on" is designated as the spindicator attribute, it indicates that the service has been encrypted, and when "off" is designated as the spindicator attribute, it indicates that the service has not been encrypted.

Information related to an alternative service is designated in the AlternativeService element. The AlternativeService element is an upper-level element of a globalUniqueServiceId attribute. A global unique service ID is designated in the globalUniqueServiceId attribute.

Information related to signaling data transmitted by way of communication is designated in the HybridSignalLocationDescription element. A detailed configuration of the HybridSignalLocationDescription element will be described later with reference to FIG. 43.

Information related to the rating region is designated in the ContentAdvisoryDescription element. A detailed configuration of the ContentAdvisoryDescription element will be described later with reference to FIG. 44.

Information related to the NRT service is designated in the NRTServiceDescription element. A detailed configuration of the NRTServiceDescription element will be described later with reference to FIG. 45.

(Syntax of HybridSignalLocationDescription Element)

FIG. 43 is a diagram illustrating an example of a syntax of the HybridSignalLocationDescription element of FIG. 42.

Information related to signaling data transmitted by way of communication is designated in the HybridSignalLocationDescription element. As illustrated in FIG. 43, the HybridSignalLocationDescription element serving as the root element is an upper-level element of a version attribute, a url attribute, and a hybrid attribute.

The version information of the signaling data is designated in the version attribute. A URL indicating the acquisition destination of the signaling data is designated in the url attribute. Information indicating whether or not it is the signaling data corresponds to the hybrid service is designated in the hybrid attribute. For example, when "TRUE" is designated as the hybrid attribute, it indicates that the signaling data corresponds to the hybrid service. Further, for example, when "FALSE" is designated as the hybrid attribute, it indicates that the signaling data corresponds to a basic broadcasting service.

(Syntax of Content Advisory Description Element)

FIG. 44 is a diagram illustrating an example of a syntax of the ContentAdvisoryDescription element of FIG. 42.

Information related to the rating region is designated in the ContentAdvisoryDescription element. As illustrated in FIG. 44, the Content Advisory Description element serving as the root element is an upper-level element of a version attribute and a RatingRegion element. The version information of the RRD is designated in the version attribute.

The RatingRegion element is an upper-level element of a ratingRegionId attribute and a RatingDimension element. A rating region ID is designated in the ratingRegionId attribute. The RatingDimension element is an upper-level element of a dimensionIndex attribute, a ratingValue attribute, and a ratingTag attribute. The rating information such as the age limit classification method is designated based on the attributes.

(Syntax of NRTServiceDescription Element)

FIG. 45 is a diagram illustrating an example of a syntax of the NRTServiceDescription element of FIG. 42.

Information related to the NRT service is designated in the NRTServiceDescription element. As illustrated in FIG. 45, the NRTServiceDescription element serving as the root element is an upper-level element of a ConsumptionModel attribute, an autoUpdate attribute, a storageReservarion attribute, a defaultContentSize attribute, a ProtocolVersionDescription element, a CapabilityDescription element, an IconDescription element, an ISO639LanguageDescription element, and a ReceiverTargetingDescription element.

A transmission mode of the NRT service is designated in the ConsumptionModel attribute. For example, "B&D," "push," "portal," or "triggered" is designated as the transmission mode. "B&D" is an abbreviation of Browse and Download, and indicates a mode in which file data of NRT content selected by the user is downloaded. "push" indicates a mode in which a contracted NRT service is provided in a push manner. "portal" indicates a mode in which a file of an HTML format or the like is transmitted and displayed immediately. "triggered" indicates a mode in which an application is provided.

It is designated in the autoUpdate attribute whether or not the NRT service is automatically updated. When "on" is designated as the autoUpdate attribute, it indicates that the NRT service is automatically updated, and when "off" is designated as the autoUpdate attribute, it indicates that the NRT service is not automatically updated. A necessary storage capacity is designated in the storageReservarion attribute. A size per NRT content is designated in the defaultContentSize attribute.

Information indicating a data service is designated in the ProtocolVersionDescription element. Information related to a function (capability) required in the reception device 20 that is provided with the NRT service is designated in the CapabilityDescription element.

Information indicating an acquisition destination of an icon used in the NRT service is designated in the IconDescription element. A language code of the NRT service is designated in the ISO639LanguageDescription element. Target information of the NRT service is designated in the ReceiverTargetingDescription element.

(Syntax of ProtocolVersionDescription Element)

FIG. 46 is a diagram illustrating an example of a syntax of the ProtocolVersionDescription element of FIG. 45.

Information indicating a data service is designated in the ProtocolVersionDescription element. As illustrated in FIG. 46, the ProtocolVersionDescription element serving as the root element is an upper-level element of a protocolIdentifier attribute, a majorProtocolVersion attribute, and a minorProtocolVersion attribute.

Type information of a format of a data service is designated in the protocolIdentifier attribute. For example, "A/90" or "NRT" is designated as the type information. "A/90" indicates a scheme in which general-purpose data is transmitted. "NRT" indicates a non-real time (NRT) transmission scheme.

A version of a data service is designated in the majorProtocolVersion attribute and the minorProtocolVersion attribute. A major version is designated in the majorProtocolVersion attribute, and a minor version is designated in the minorProtocolVersion attribute.

(Syntax of CapabilityDescription Element)

FIG. 47 is a diagram illustrating an example of a syntax of the CapabilityDescription element of FIG. 45.

Information related to a function (capability) required in the reception device 20 that is provided with the NRT service is designated in the CapabilityDescription element. As illustrated in FIG. 47, the CapabilityDescription element serving as the root element is an upper-level element of an IndivisualCapabilityCodes element, an IndivisualCapabilityString element, and a CapabilityOrSets element.

The IndivisualCapabilityCodes element is an upper-level element of an essentialIndicator attribute, a capabilityCode attribute, and a formatIdentifier attribute. Information indicating whether or not a capability is essential is designated in the essentialIndicator attribute. A code of a predetermined capability is designated in the capabilityCode attribute. In other words, it is designated whether or not a capability designated by a capability code is essential by the essentialIndicator attribute and the capabilityCode attribute. A function (capability) to be evaluated when a capability code is arbitrarily designated is designated in the formatIdentifier attribute.

The IndivisualCapabilityString element is an upper-level element of an essentialIndicator attribute, a capabilityCategoryCode attribute, and a capabilityString attribute. Information indicating whether or not a capability is essential is designated in the essentialIndicator attribute. A code of each capability category is designated in the capabilityCategoryCode attribute. In other words, it is designated whether or not a capability designated by a code of each capability category is essential by the essentialIndicator attribute and the capabilityCategoryCode attribute. A function (capability) to be evaluated is designated in the capabilityString attribute for each capability category.

The CapabilityOrSets element is designated when an evaluation of each capability code by the IndivisualCapabilityCodes element and an evaluation of each capability category by the IndivisualCapabilityString element are designated by an OR condition. Thus, the CapabilityOrSets element is an upper-level element of an essentialIndicator attribute, a CapabilityCodesInSets element, and a CapabilityStringsInSets element, and the essentialIndicator attribute corresponds to the essentialIndicator attribute.

The capabilityCode attribute and the formatIdentifier attribute in the CapabilityCodesInSets element correspond to the capabilityCode attribute and the formatIdentifier attribute in the IndivisualCapabilityCodes element. The capabilityCategoryCode attribute and the capabilityString attribute in the CapabilityStringsInSets element correspond to the capabilityCategoryCode attribute and the capabilityString attribute in the IndivisualCapabilityString element.

(Syntax of IconDescription Element)

FIG. 48 is a diagram illustrating an example of a syntax of the IconDescription element of FIG. 45.

Information indicating an acquisition destination of an icon used in the NRT service is designated in the IconDescription element. As illustrated in FIG. 48, the IconDescription element serving as the root element is an upper-level element of a content linkage attribute. A URL indicating an acquisition destination of an icon is designated in the content linkage attribute.

(Syntax of ISO-639LanguageDescription Element)

FIG. 49 is a diagram illustrating an example of a syntax of the ISO-639LanguageDescription element of FIG. 45.

A language code of the NRT service is designated in the ISO639LanguageDescription element. As illustrated in FIG. 49, the ISO639LanguageDescription element serving as the root element is an upper-level element of a languageCode attribute. A language code specified in ISO 639 is designated in the languageCode attribute.

(Syntax of ReceiverTargetingDescription Element)

FIG. 50 is a diagram illustrating an example of a syntax of the ReceiverTargetingDescription element of FIG. 45.

Target information of the NRT service is designated in the ReceiverTargetingDescription element. As illustrated in FIG. 50, the ReceiverTargetingDescription element serving as the root element is an upper-level element of a TargetEntry element. The TargetEntry element is an upper-level element of a geoLocation attribute, a postalCode attribute, and a demographic category attribute.

A geographical position serving as a target of the NRT service is designated in the geoLocation attribute. A postal code of a region serving as a target of the NRT service is designated in the postalCode attribute. A category of users serving as a target of the NRT service is designated in the demographic category attribute. For example, "males,"

"females," or "Ages 12-17" is designated as the category. "males" indicates that the target of the NRT service is men. "females" indicates that the target of the NRT service is women. "Ages 12-17" indicates that the target of the NRT service is persons at the ages of 12 to 17.

The syntaxes of the Description elements of the LSID, the SPD, and the SPD described above with reference to FIGS. 37 to 50 are examples, and other syntaxes may be employed.

6. Modified Example

In the above description, since the digital broadcasting using the IP transmission scheme is expected to be employed in ATSC 3.0 that is the next generation broadcasting standard of the USA which is currently being established, the ATSC employed in the USA and the like has been described as the digital terrestrial television broadcasting standard, but the present technology can be applied to Integrated Services Digital Broadcasting (ISDB) employed in Japan and the like, Digital Video Broadcasting (DVB) employed in some European countries, or the like. The present technology is not limited to digital terrestrial television broadcasting and may be employed in digital satellite television broadcasting, digital cable television broadcasting, or the like.

In the above description, "D" that is an abbreviation of Description is used as a name of the signaling data, but there are cases in which "T" that is an abbreviation of Table may be used. For example, there are cases in which the SCD is described as a Service Configuration Table (SCT). Further, for example, there are cases in which the SPD is described as a Service Parameter Table (SPT). A difference between the names is a formal difference between "Description" and "Table" and does not means that substantive content of the respective signaling data is different.

In the above description, the elements and the attributes have been described when the signaling data is described in a markup language such as the XML, but the names of the elements or the attributes are example, and other names may be employed. For example, the RF allocation ID specified in the SCD or the like may be called a network ID or an RF channel ID. Further, for example, the LSIDBaseService attribute of the SCBootstrap element of the SCD may be described as the LSIDBasicService attribute or the like. A difference in the name is a formal difference, and does not mean that substantive content of the element or the attribute is different.

7. Configuration of Computer

Figure 51:
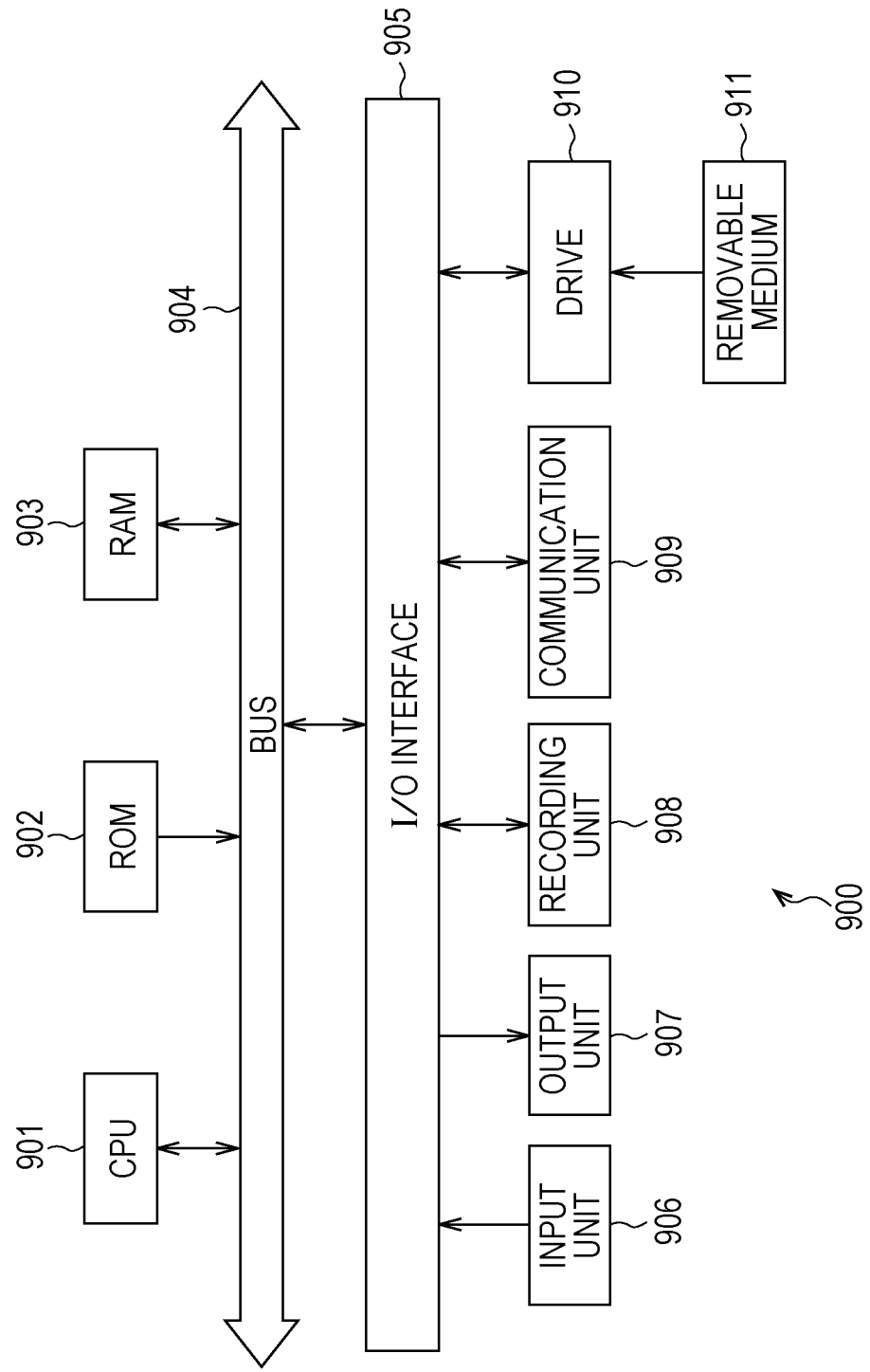
FIG. 51 is a diagram illustrating an exemplary configuration of a computer.

The above-described series of processes may be executed by hardware or may be executed by software. When the series of processes are executed by software, a program configuring the software is installed in a computer. FIG. 51 is a diagram illustrating an exemplary configuration of hardware of a computer that executes the above-described series of processes through a program.

In a computer 900, a central processing unit (CPU) 901, a read only memory (ROM) 902, and a random access memory (RAM) 903 are connected with one another via a bus 904. An input/output (I/O) interface 905 is further connected to the bus 904. An input unit 906, an output unit 907, a recording unit 908, a communication unit 909, and a drive 910 are connected to the I/O interface 905.

The input unit 906 includes a keyboard, a mouse, a microphone, or the like. The output unit 907 includes a display, a speaker, or the like. The recording unit 908 includes a hard disk, a non-volatile memory, or the like. The communication unit 909 includes a network interface or the like. The drive 910 drives a removable medium 911 such as a magnetic disk, an optical disk, a magneto optical disk, or a semiconductor memory.

In the computer 900 having the above configuration, the above-described series of processes are performed, for example, such that the CPU 901 loads the program recorded in the ROM 902 or the recording unit 908 onto the RAM 903 via the I/O interface 905 and the bus 904 and executes the program.

The program executed by the computer 900 (the CPU 901) may be recorded in the removable medium 911 as a package medium and provided. The program may be provided via a wired or wireless transmission medium such as a local area network (LAN), the Internet, or digital satellite broadcasting.

In the computer 900, the removable medium 911 may be mounted in the drive 910, and then the program may be installed in the recording unit 908 through the I/O interface 905. Further, the program may be received through the communication unit 909 via a wired or wireless transmission medium and then installed in the recording unit 908. Furthermore, the program may be installed in the ROM 902 or the recording unit 908 in advance.

Here, in this specification, the processes performed by the computer according to the program need not be necessarily chronologically performed according to the order described as a flowchart. In other words, the processes performed by the computer according to the program include processes (for example, a parallel process or a process by an object) that are executed in parallel or individually.

Further, the program may be processed by a single computer or may be distributedly processed by a plurality of computers.

Further, an embodiment of the present technology is not limited to the above embodiments, and various changes can be made within the scope not departing from the gist of the present technology.

The present technology may have the following configuration.

(1)

A reception device, including:

a first acquiring unit that acquires second metadata including first and second flags, the first flag indicating whether or not it is possible to acquire components configuring a service through only first metadata, the second flag indicating whether or not there is a stream of a component transmitted from a server on the Internet by way of communication among the streams of the components configuring the service, the first metadata including information related to a stream of a component transmitted by way of broadcasting through a broadcast wave of digital broadcasting using an Internet Protocol (IP) transmission scheme;

a second acquiring unit that acquires the first metadata based on the second metadata; and a control unit that accesses the stream of the component transmitted by way of the broadcasting based on the first metadata, and controls reproduction of the component.

(2)

The reception device according to (1), wherein, when the first flag indicates that it is possible to acquire the components configuring the service through only the first metadata, and the second flag indicates that there is no stream of the component transmitted by way of the communication, the control unit accesses the stream of the component transmitted by way of the broadcasting and controls the reproduction of the component based on the first metadata.

(3)

The reception device according to (1), wherein, when the second flag indicates that there is the stream of the component transmitted by way of the communication, the second acquiring unit acquires third metadata for managing reproduction of the stream of the component transmitted by way of the communication, and the control unit accesses the stream of the component transmitted by way of the broadcasting and the stream of the component transmitted by way of the communication and controls reproduction of the components based on the first metadata and the third metadata.

(4)

The reception device according to any of (1) to (3), wherein the first metadata is first signaling data transmitted through a layer higher than an IP layer in a protocol stack of the IP transmission scheme, and the second metadata is second signaling data transmitted through a layer lower than the IP layer in the protocol stack of the IP transmission scheme.

(5)

The reception device according to (4), wherein the component transmitted by way of the broadcasting and a stream of the first signaling data are transmitted through a Real-time Object Delivery over Unidirectional Transport (ROUTE) session extended from a File Delivery over Unidirectional Transport (FLUTE).

(6)

The reception device according to (5), wherein the service is configured with the component transmitted by way of broadcasting and the first signaling data to which a common IP address is allocated, and the component transmitted by way of the broadcasting and the first signaling data are transmitted through different Base Band Packet (BBP) streams.

(7)

The reception device according to any of (4) to (6), wherein the second acquiring unit acquires the first signaling data transmitted by way of the broadcasting or by way of the communication.

(8)

The reception device according to any of (1) to (7), wherein the component is a video, an audio, or subtitles, and the service is a program.

(9)

The reception device according to any of (1) to (8), wherein the first metadata is an LCT Session Instance Description (LSID), and the second metadata is a Service Configuration Description (SCD).

(10)

A reception method of a reception device, including the steps of:

acquiring, by the reception device, second metadata including first and second flags, the first flag indicating whether or not it is possible to acquire components configuring a service through only first metadata, the second flag indicating whether or not there is a stream of a component transmitted from a server on the Internet by way of communication among the streams of the components configuring the service, the first metadata including information related to a stream of a component transmitted by way of broadcasting through a broadcast wave of digital broadcasting using an Internet Protocol (IP) transmission scheme;

acquiring, by the reception device, the first metadata based on the second metadata; and accessing, by the reception device, the stream of the component transmitted by way of the broadcasting based on the first metadata, and controlling reproduction of the component.

(11)

A transmission device, including:

a generating unit that generates second metadata including first and second flags, the first flag indicating whether or not it is possible to acquire components configuring a service through only first metadata, the second flag indicating whether or not there is a stream of a component transmitted from a server on the Internet by way of communication among the streams of the components configuring the service, the first metadata including information related to a stream of a component transmitted by way of broadcasting through a broadcast wave of digital broadcasting using an Internet Protocol (IP) transmission scheme; and a transmitting unit that transmits the generated second metadata.

(12)

The transmission device according to (11), wherein the first metadata is first signaling data transmitted through a layer higher than an IP layer in a protocol stack of the IP transmission scheme, and the second metadata is second signaling data transmitted through a layer lower than the IP layer in the protocol stack of the IP transmission scheme.

(13)

The transmission device according to (12), wherein the component transmitted by way of the broadcasting and a stream of the first signaling data are transmitted through a Real-time Object Delivery over Unidirectional Transport (ROUTE) session extended from a File Delivery over Unidirectional Transport (FLUTE).

(14)

The transmission device according to (13), wherein the service is configured with the component transmitted by way of broadcasting and the first signaling data to which a common IP address is allocated, and the component transmitted by way of the broadcasting and the first signaling data are transmitted through different Base Band Packet (BBP) streams.

(15)

A transmission method of a transmission device, including the steps of:

generating, by the transmission device, second metadata including first and second flags, the first flag indicating whether or not it is possible to acquire components configuring a service through only first metadata, the second flag indicating whether or not there is a stream of a component transmitted from a server on the Internet by way of communication among the streams of the components configuring the service, the first metadata including information related to a stream of a component transmitted by way of broadcasting through a broadcast wave of digital broadcasting using an Internet Protocol (IP) transmission scheme; and transmitting, by the transmission device, the generated second metadata.

REFERENCE SIGNS LIST

1, 2 Service provision system
10 Transmission device 20A, 20B, 20 Reception device
30 Broadband server
40 Internet server
50 Relay station
60 Access point
90 Internet
111 Signaling generating unit
113 Video data acquiring unit
115 Audio data acquiring unit
117 Subtitle data acquiring unit
122 Transmitting unit
212 Tuner
214 Control unit
217 Communication unit
251 Tuning control unit
252 Filtering control unit
253 Signaling acquiring unit
254 Signaling analyzing unit
255 Communication control unit
256 Packet header monitoring unit
271 LLS signaling acquiring unit
272 SCS signaling acquiring unit
311 Signaling generating unit
313 Video data acquiring unit
315 Audio data acquiring unit
317 Subtitle data acquiring unit
322 Communication unit
900 Computer
901 CPU

The invention claimed is:

1. A reception device, comprising:
circuitry configured to
acquire second metadata including first information, the first information indicating that there is a component stream transmitted from a server via the Internet, the component stream transmitted from the server including secondary audio data for a service;
acquire first metadata based on the second metadata, the first metadata including second information related to a component stream for the service transmitted in a broadcast signal using an Internet Protocol (IP) transmission scheme; and
access the component stream transmitted in the broadcast signal based on the first metadata, and control reproduction of the component stream transmitted in the broadcast signal.

2. The reception device according to claim 1, wherein the circuitry is further configured to access the component stream transmitted from the server and to control reproduction of the component stream transmitted from the server together with the component stream transmitted in the broadcast signal.

3. The reception device according to claim 1,
wherein the circuitry is configured to acquire third metadata for managing reproduction of the component stream transmitted from the server via the Internet, and
the circuitry accesses the component stream transmitted in the broadcast signal and the component stream transmitted from the server via the Internet and controls reproduction of the component stream transmitted in the broadcast signal and the component stream tranmsitted from the server based on the first metadata and the third metadata, respectively.

4. The reception device according to claim 1,
wherein the first metadata is first signaling data transmitted through a layer higher than an IP layer in a protocol stack of the IP transmission scheme, and
the second metadata is second signaling data transmitted through a layer lower than the IP layer in the protocol stack of the IP transmission scheme.

5. The reception device according to claim 4,
wherein the component stream transmitted in the broadcast signal and a stream of the first signaling data are transmitted through a Real-time Object Delivery over Unidirectional Transport (ROUTE) session extended from a File Delivery over Unidirectional Transport (FLUTE).

6. The reception device according to claim 5,
wherein the service includes the component stream transmitted in the broadcast signal and the first signaling data to which a common IP address is allocated, and
the component stream transmitted in the broadcast signal and the first signaling data are transmitted through different Base Band Packet (BBP) streams.

7. The reception device according to claim 4,
wherein the circuitry is configured to acquire the first signaling data transmitted in the broadcast signal or via the Internet.

8. The reception device according to claim 1,
wherein the component stream transmitted in the broadcast signal is a video stream, an audio stream, or subtitles stream, and
the service is a program.

9. The reception device according to claim 1,
wherein the first metadata is an LCT Session Instance Description (LSID), and
the second metadata is a Service Configuration Description (SCD).

10. A reception method, comprising:
acquiring second metadata including first information, the first information indicating that there is a component stream transmitted from a server via the Internet, the component stream transmitted from the server including secondary audio data for a service;
acquiring first metadata based on the second metadata, the first metadata including second information related to a component stream for the service transmitted in a broadcast signal using an Internet Protocol (IP) transmission scheme; and
accessing the component stream transmitted in the broadcast signal based on the first metadata, and control reproduction of the component stream transmitted in the broadcast signal.

11. The reception method according to claim 10, further comprising accessing the component stream transmitted from the server and controlling reproduction of the component stream transmitted from the server together with the component stream transmitted in the broadcast signal.

12. The reception method according to claim 10, further comprising
acquiring third metadata for managing reproduction of the component stream transmitted from the server via the Internet, and
accessing the component stream transmitted in the broadcast signal and the component stream transmitted from the server via the Internet and controlling reproduction of the component streams transmitted in the broadcast signal and from the server based on the first metadata and the third metadata, respectively.

13. The reception method according to claim 10,
wherein the first metadata is first signaling data transmitted through a layer higher than an IP layer in a protocol stack of the IP transmission scheme, and the second metadata is second signaling data transmitted through a layer lower than the IP layer in the protocol stack of the IP transmission scheme.

14. The reception method according to claim 13, wherein the component stream transmitted in the broadcast signal and a stream of the first signaling data are transmitted through a Real-time Object Delivery over Unidirectional Transport (ROUTE) session extended from a File Delivery over Unidirectional Transport (FLUTE).

15. The reception method according to claim 14, wherein the service includes the component stream transmitted in the broadcast signal and the first signaling data to which a common IP address is allocated, and the component stream transmitted in the broadcast signal and the first signaling data are transmitted through different Base Band Packet (BBP) streams.

16. The reception method according to claim 13, further comprising acquiring the first signaling data transmitted in the broadcast signal or via the Internet.

17. The reception method according to claim 10, wherein the component stream transmitted in the broadcast signal is a video stream, an audio stream, or subtitles stream, and
the service is a program.

18. The reception method according to claim 10, wherein the first metadata is an LCT Session Instance Description (LSID), and
the second metadata is a Service Configuration Description (SCD).

\* \* \* \* \*